US012633007B2

(12) United States Patent
Wegner et al.

(10) Patent No.: US 12,633,007 B2
(45) Date of Patent: May 19, 2026

(54) METHOD AND SYSTEM FOR PREDICTING THE APPEARANCE OF OBJECTS BEING COATED WITH AT LEAST ONE COLORED COATING LAYER UNDER DIFFERENT ILLUMINATION CONDITIONS

(71) Applicant: BASF COATINGS, Muenster (DE)

(72) Inventors: Jens Wegner, Muenster (DE); Florina Trost, Muenster (DE); Mark Gutjahr, Muenster (DE); Michaela Finkenzeller, Muenster (DE); Benjamin Lanfer, Muenster (DE); Andreas Pflug, Ludwigshafen (DE); Julius Steinhauser, Berlin (DE); Matthias Winckelmann, Berlin (DE); Alexander Walker, Berlin (DE); Henrik Mauler, Berlin (DE); Helge Kiehl, Berlin (DE)

(73) Assignee: BASF COATINGS GMBH, Muenster (DE)

( * ) Notice: Subject to any disclaimer, the term of this patent is extended or adjusted under 35 U.S.C. 154(b) by 181 days.

(21) Appl. No.: 18/577,603

(22) PCT Filed: Jul. 21, 2022

(86) PCT No.: PCT/EP2022/070490
§ 371 (c)(1),
(2) Date: Jan. 8, 2024

(87) PCT Pub. No.: WO2023/006572
PCT Pub. Date: Feb. 2, 2023

(65) Prior Publication Data
US 2024/0371051 A1     Nov. 7, 2024

(30) Foreign Application Priority Data

Jul. 30, 2021    (EP) ..................................... 21188658

(51) Int. Cl.
*G06T 11/10*     (2026.01)
*G06T 15/50*     (2011.01)
(Continued)

(52) U.S. Cl.
CPC .......... *G06T 11/10* (2026.01); *G06T 2200/24* (2013.01)

(58) Field of Classification Search
CPC ..... G06T 11/001; G06T 15/50; G06T 15/506; G06T 15/60; G06T 15/80; G06T 2200/24;
(Continued)

(56) References Cited

U.S. PATENT DOCUMENTS 8,514,243 B2 * 8/2013 Kaasila ................. G06F 3/0481
                                                         345/613
12,380,536 B2 * 8/2025 Parra ......................... G06T 5/40
(Continued)

FOREIGN PATENT DOCUMENTS

WO     2020200982 A1   10/2020

OTHER PUBLICATIONS

International Search Report and Written Opinion for corresponding PCT/EP22/70490, mailed Dec. 23, 2022, 18 pages.
(Continued)

*Primary Examiner* — Wesner Sajous
(74) *Attorney, Agent, or Firm* — Armstrong Teasdale LLP

(57) ABSTRACT

Described herein are methods and systems for predicting the appearance of an object being coated with at least one colored coating layer under different illumination conditions. The methods and systems relate to displaying the appearance of a coated object using a display device by predicting the appearance of a coated object under an illumination condition selected by the user and displaying the predicted appearance of the coated object.

20 Claims, 12 Drawing Sheets

(51) Int. Cl.

| | |
|---|---|
| *G09G 5/02* | (2006.01) |
| *G09G 5/06* | (2006.01) |
| *G09G 5/10* | (2006.01) |
| *G09G 5/30* | (2006.01) |
| *H04N 1/58* | (2006.01) |
| *H04N 1/60* | (2006.01) |
| *H04N 5/57* | (2006.01) |
| *H04N 9/64* | (2023.01) |
| *H04N 9/73* | (2023.01) |

(58) Field of Classification Search

CPC ....... G06T 2207/00; G06T 2207/10024; G06T 2207/20208; G09G 5/02; G09G 5/028; G09G 5/04; G09G 5/06; G09G 5/10; G09G 5/30; G09G 2320/00; G09G 2320/02; G09G 2320/0233; G09G 2320/0242; G09G 2320/0271; G09G 2320/0276; G09G 2320/0285; G09G 2320/04; G09G 2320/06; G09G 2320/062; G09G 2320/0626; G09G 2320/066; G09G 2320/0666; G09G 2320/0673; G09G 2320/0693; G09G 2340/06; H04N 1/58; H04N 1/60; H04N 1/62; H04N 1/6019; H04N 1/6025; H04N 1/6027; H04N 1/6041; H04N 1/6058; H04N 1/6075; H04N 1/6077; H04N 1/6086; H04N 1/6088; H04N 1/6091; H04N 5/2002; H04N 5/57–58; H04N 9/64–78

See application file for complete search history.

(56) References Cited

U.S. PATENT DOCUMENTS

| | | | | |
|---|---|---|---|---|
| 12,380,673 | B2 * | 8/2025 | Parra | G06V 10/44 |
| 12,392,662 | B2 * | 8/2025 | Verdú | G01J 3/463 |
| 2002/0184167 | A1 | 12/2002 | McClanahan | |
| 2005/0248299 | A1 * | 11/2005 | Chemel | H05B 47/155 |
| | | | | 315/312 |
| 2007/0176944 | A1 * | 8/2007 | Brown | G06F 3/0481 |
| | | | | 345/592 |
| 2014/0285508 | A1 * | 9/2014 | Tjissen | G01J 3/52 |
| | | | | 345/589 |
| 2016/0259532 | A1 * | 9/2016 | Chen | G06T 11/60 |
| 2017/0110089 | A1 * | 4/2017 | Douglas | G06F 3/04897 |
| 2019/0078936 | A1 | 3/2019 | Bischoff et al. | |
| 2020/0027744 | A1 * | 1/2020 | Aarabi | G03F 7/70008 |
| 2022/0163393 | A1 * | 5/2022 | Lanfer | G01J 3/504 |

OTHER PUBLICATIONS

Hosek et al., "An Analytic model for full spectral sky-dome radiance," ACM Transactions on Graphics, 31(4), Jul. 2012, 9 pages.

Preetham et al., "A Practical Analytical Model for Daylight," Computer Graphics Proceedings, Jul. 1999, 10 pages.

Golla et al., "Interactive Interpolation of Metallic Effect Car Paints," Modeling and Visualization, Oct. 2018, 10 pages.

Dana et al., "Reflectance and Texture of Real-World Surfaces", ACM Transactions on Graphics, vol. 18, No. 1, pp. 1-34 (1999).

Debevec, "Image-Based Lighting", IEEE Computer Graphics and Applications, pp. 26-33 (2002).

Golla et al., "An Efficient Statistical Data Representation for Real-Time Rendering of Metallic Effect Car Paints", International Conference on Virtual Reality and Augmented Reality, vol. 10700, pp. 51-68 (2017).

Hatka et al., "BTF Rendering in Blender", Proceedings of the 10th International Conference on Virtual Reality Continuum and Its Applications in Industry, pp. 265-272 (2011).

Hold-Geoffroy et al., "Deep Outdoor Illumination Estimation", IEEE Conference on Computer Vision and Pattern Recongnition, pp. 2373-2382 (2017).

Lee et al., "Scattered Data Interpolation with Multilevel B-Splines", IEEE Transaction on Visualization and Computer Graphics, vol. 3, No. 3, pp. 228-244 (1997).

LeGendre et al., "DeepLight: Learning Illumination for Unconstrained Mobile Mixed Reality", IEEE/CVF Conference on Computer Vision and Pattern Recognition (CVPR), pp. 5911-5921 (2019).

Nguyen et al., "Machine Learning and Deep Learning frameworks and libraries for large-scale data mining: a survey", Artificial Intelligence Review, vol. 52, pp. 72-124 (2019).

Sloan, "Stupid Spherical Harmonics (SH) Tricks", Game Developers Conference, vol. 9, 42 pages (2008).

"UTIA BTF Database", UTIA, Material Appearance Modelling (MAM) 2014, 1 page (2014) URL: http://btf.utia.cas.cz/?btf_mam2014.

Von Stosch et al., "Hybrid semi-parametric modeling in process systems engineering: Past, present and future", Computers and Chemical Engineering, vol. 6., pp. 86-101 (2014).

Yang et al., "Inertial Sensors Aided Image Alignment and Stitching for Panorama on Mobile Phones", Proceedings of the 1st International Workshop on Mobile Location-Based Service, pp. 21-30 (2011).

Zhang et al., "All-Weather Deep Outdoor Lighting Estimation", IEEE/CVF Conference on Computer Vision and Pattern Recognition (CVPR), pp. 10150-10158 (2019).

* cited by examiner

METHOD AND SYSTEM FOR PREDICTING THE APPEARANCE OF OBJECTS BEING COATED WITH AT LEAST ONE COLORED COATING LAYER UNDER DIFFERENT ILLUMINATION CONDITIONS

CROSS-REFERENCE TO RELATED APPLICATIONS

This application is a U.S. National Phase Application of International Patent Application No. PCT/EP22/70490, filed Jul. 21, 2022, which claims priority to EP Patent Application No. 21188658.5, filed Jul. 30, 2021, each of which is hereby incorporated by reference herein.

FIELD

Aspects described herein generally relate to methods and systems for predicting the appearance of an object being coated with at least one colored coating layer under different illumination conditions. More specifically, aspects described herein relate to displaying the appearance of a coated object using a display device by predicting the appearance of a coated object under an illumination condition selected by the user and displaying the predicted appearance of the coated object.

BACKGROUND

Surfaces provide an object with an appearance since the surface reflects an incident light into eyes of an observer causing a visual impression of the object depending on the reflection and absorption properties of the surface. A surface that reflects back all of the rays of light, for example, appears white to the observer, while a surface that absorbs all of the rays appears black. All other colors perceived by humans are due to a combination of light rays being absorbed and reflected by the surface of the object.

The visual impression of the object can be modified, for example, by applying a colored coating layer to the surface of the object. In this case, the visual impression is determined by the colored coating layer. Vehicles, in particular land vehicles such as automobile, motorcycle and truck bodies, are normally treated with multiple layers of coatings to enhance the appearance of the vehicle and to provide protection from corrosion, scratch, chipping, ultraviolet light, acid rain and other environmental conditions.

Said coatings are typically composite coating systems requiring the application of a multiple coating layers to achieve the aforementioned effects. In case of metallic substrates, an electrocoat is typically applied on the substrate and cured. This electrocoat is then coated with a cured primer coating or an uncured colored first basecoat before a further colored basecoat and a clearcoat or tinted clearcoat is applied over the noncured or "wet" first and/or further colored basecoat. In case of plastic substrates, a primer coating is applied on the substrate and cured before at least one further colored basecoat coating and a clearcoat or untinted clearcoat is applied over the noncured or "wet" colored basecoat coating(s). The applied basecoat and clearcoat coating(s) are then jointly cured. Thus, such systems are often described as "wet on wet", "two-coat/one bake" or "three-coat/one bake". Drying processes that fall short of complete cure may be used between the application of the coatings. The visual appearance in terms of color is normally achieved by the colored basecoat coating comprising colored and/or effect pigments.

However, the visual impression of a colored object, such as an object being coated with at least one colored coating layer, may vary under different illumination conditions. This is due to the fact that the spectral power distribution of a light source, i.e. the relative powers of various wavelengths of a light source, may change and so does the way light is reflected into the eye of the human observer. This, however, affects the visual impression and therefore the color of the coated automotive the human observer perceives. In addition, the power of the light source can also affect the perceived colors of objects it illuminates Thus, colors are perceived differently depending on the light source and the power of the light source used to illuminate the colored object. For example, natural light may vary greatly depending on the weather, the season, the time of day, the position of the sun in the sky, the location of the object, the surroundings of the object etc. The color of a colored object perceived under sunny conditions may therefore differ from the color of the same colored object perceived under cloudy conditions.

Since the overall visual impression of an automobile is, among other factors, an important criteria for consumers during a purchase decision, automotive designers and automotive sellers normally make the visual impression more attractive by using specially designed illumination conditions, such as artificial light sources having a defined power and wavelength spectrum, for example fluorescent and incandescent light bulbs, halogen bulbs, and LED lighting. However, the degree of variation in color perception depending on the illumination conditions is highly dependent on the color, thus selecting appropriate illumination conditions may be associated with numerous trials of different illumination conditions in order to find the best solution. Moreover, automotive having various colors are normally presented in a showroom such that the illumination conditions of the showroom must be chosen such that each of the presented colors is looking attractive. Therefore, selecting the appropriate illumination conditions may be a time consuming and cost intensive task. Additionally, there is an increasing request from customers to view the automotive under real life illumination conditions, i.e. outdoor or inside the garage, to determine whether the visual impression is matching the expectations. This, however, is not always possible because the automotive seller may not always have demonstration cars available in the desired color.

It would therefore be desirable to provide computer-based methods and systems which would allow a user, such as an automotive color designer or automotive seller, to simulate or predict the visual impression of colors, in particular automotive colors, under various illumination conditions without having to physically install different illumination conditions to determine the optimal illumination condition. Moreover, it would be desirable to provide computer-based methods and systems which would allow a customer to determine whether the object, in particular the colored automotive, the customer would like to buy has the desired visual impression under real life conditions, i.e. natural lighting at the location of the customer, thus ensuring that the customer is not disappointed after the purchase by the visual impression of the object, in particular the colored automotive, under real lighting conditions. Finally, it would be desirable to provide computer-based methods and systems which reduce the number of colored object, in particular lar of a colored automotive, which need to be exhibited by the seller in order to provide an overview of available colors to the customer prior to sale.

Definitions

"Appearance" refers to the visual impression of the coated object to the eye of an observer and includes the perception in which the spectral and geometric aspects of a surface is integrated with its illuminating and viewing environment. In general, appearance includes color, visual texture such as coarseness caused by effect pigments, sparkle, or other visual effects of a surface, especially when viewed from varying viewing angles and/or with varying illumination angles.

"Digital representation" may refer to a representation of a colored coating layer and illumination conditions in a computer readable form. In particular, the digital representation of the colored coating layer comprises an optimized bi-directional texture function (BTF) obtained by optimizing an initial BTF using captured spectral reflectance data as described later on. The digital representation of the colored coating layer may comprise further data, for example data on the formulation of the coating material used to prepare the colored coating layer, color code data, color name data or a combination thereof. Data on the formulation of the coating material used to prepare the colored coating layer may include data on the type and amount of at least part of the ingredients being present in the coating material. The digital representation of illumination conditions may, e.g. comprise data being indicative of a data, a time, a position, a degree of haze of the sky, data acquired from at least one illumination and/or orientation and/or vantage point sensor, at least one high dynamic range (HDR) environment map, and combinations thereof. The environment map(s) may be pre-defined HDR environment map(s) which are, for example, stored in a database.

"Display device" refers to an output device for presentation of information in visual or tactile form (the latter may be used in tactile electronic displays for blind people). "Screen of the display device" refers to physical screens of display devices and projection regions of projection display devices alike.

"Interaction element" may refer to an element configured to receive a user input.

"Communication interface" may refer to a software and/or hardware interface for establishing communication such as transfer or exchange or signals or data. Software interfaces may be e. g. function calls, APIs. Communication interfaces may comprise transceivers and/or receivers. The communication may either be wired, or it may be wireless. Communication interface may be based on or it supports one or more communication protocols. The communication protocol may a wireless protocol, for example: short distance communication protocol such as Bluetooth®, or WiFi, or long distance communication protocol such as cellular or mobile network, for example, second-generation cellular network ("2G"), 3G, 4G, Long-Term Evolution ("LTE"), or 5G. Alternatively, or in addition, the communication interface may even be based on a proprietary short distance or long distance protocol. The communication interface may support any one or more standards and/or proprietary protocols.

"Computer processor" refers to an arbitrary logic circuitry configured to perform basic operations of a computer or system, and/or, generally, to a device which is configured for performing calculations or logic operations. In particular, the processing means, or computer processor may be configured for processing basic instructions that drive the computer or system. As an example, the processing means or computer processor may comprise at least one arithmetic logic unit ("ALU"), at least one floating-point unit ("FPU)", such as a math coprocessor or a numeric coprocessor, a plurality of registers, specifically registers configured for supplying operands to the ALU and storing results of operations, and a memory, such as an L1 and L2 cache memory. In particular, the processing means, or computer processor may be a multicore processor. Specifically, the processing means, or computer processor may be or may comprise a Central Processing Unit ("CPU"). The processing means or computer processor may be a ("CISC") Complex Instruction Set Computing microprocessor, Reduced Instruction Set Computing ("RISC") microprocessor, Very Long Instruction Word ("VLIW") microprocessor, or a processor implementing other instruction sets or processors implementing a combination of instruction sets. The processing means may also be one or more special-purpose processing devices such as an Application-Specific Integrated Circuit ("ASIC"), a Field Programmable Gate Array ("FPGA"), a Complex Programmable Logic Device ("CPLD"), a Digital Signal Processor ("DSP"), a network processor, or the like. The methods, systems and devices described herein may be implemented as software in a DSP, in a micro-controller, or in any other side-processor or as hardware circuit within an ASIC, CPLD, or FPGA. It is to be understood that the term processing means or processor may also refer to one or more processing devices, such as a distributed system of processing devices located across multiple computer systems (e.g., cloud computing), and is not limited to a single device unless otherwise specified.

SUMMARY

To address the above-mentioned problems in a perspective, the following is proposed: a computer-implemented method for predicting the appearance of an object being coated with at least one colored coating layer and displaying the predicted appearance on a display device, said method comprising the steps of:

(i) providing to a computer processor via a communication interface a digital representation of a colored coating layer, (ii) providing a digital representation of illumination conditions by displaying a graphical user interface comprising a plurality of illumination conditions on the display device;

detecting with the computer processor a user input being indicative of selecting an illumination condition from the plurality of displayed illumination conditions, and in response to the detected user input, retrieving with the computer processor via the communication interface the digital representation of illumination conditions associated with the detected user input;

(iii) optionally providing to the computer processor via the communication interface a model derived from historic illumination conditions and/or at least one model derived from historic environmental conditions;

(iv) generating with the computer processor color data of the colored coating layer based on the provided digital representation of the colored coating layer, the provided digital representation of the illumination condition and optionally the provided model(s); and (v) displaying on the display device the generated color data received from the computer processor.

To further address the above-mentioned problems in a perspective, the following is proposed:

a method for predicting the appearance of an object being coated with at least one colored coating layer and displaying the predicted appearance on a display device, said method comprising the steps of:

(i) providing to a computer processor via a communication interface a digital representation of a colored coating layer, wherein the digital representation of the colored coating layer comprises an optimized bi-directional texture function (BTF) which is obtained by the following steps:

determining an initial BTF for the colored coating layer using a camera-based measurement device, capturing spectral reflectance data for the colored coating layer for a pre-given number, i.e. a limited number, of different measurement geometries using a spectrophotometer, and adapting the initial BTF to the captured spectral reflectance data to obtain an optimized BTF by segmenting the initial BTF of formula (1)

$$f(x, \bar{\imath}, \bar{o}) = \chi(\bar{\imath}, \bar{o})\left(\frac{a}{\pi} + \sum_{k=1}^{3} f_{S_k,a_k,F_{0,k}}^{CT}(\bar{\imath}, \bar{o})\right) + \Xi(x, \bar{\imath}, \bar{o}) \qquad (1)$$

in which x: surface coordinates of the sample/object $\bar{\imath}, \bar{o}$: illumination and observation/viewing directions at the basecoat of the sample $\chi(\bar{\imath}, \bar{o})$: color table depending on illumination and observation direction a: Albedo or diffuse reflectivity $$f_{S_k,a_k,F_{0,k}}^{CT}(\bar{\imath}, \bar{o}):$$

the k-th Cook-Torrance lobe, corresponding to a Bi-directional Reflectance Distribution Function (BRDF) that describes the glossiness of a microfacet surface $S_k$: weight for the k-th Cook-Torrance lobe $a_k$: parameter for the Beckmann distribution of the k-th Cook-Torrance lobe $F_{0,k}$: Fresnel reflectivity for the k-th Cook-Torrance lobe $\Xi(x, \bar{\imath}, \bar{o})$: table of spatial texture images depending on illumination and observation direction into a term $$\chi(\bar{\imath}, \bar{o})\left(\frac{a}{\pi} + \sum_{k=1}^{3} f_{S_k,a_k,F_{0,k}}^{CT}(\bar{\imath}, \bar{o})\right)$$

(F1) and a term $\Xi(x, \bar{\imath}, \bar{o})$ (F2), further dividing the first term (F1) into a first sub-term corresponding to a color table depending on illumination and observation direction $\chi(\bar{\imath}, \bar{o})$ and a second sub-term corresponding to an intensity function $$\left(\frac{a}{\pi} + \sum_{k=1}^{3} f_{S_k,a_k,F_{0,k}}^{CT}(\bar{\imath}, \bar{o})\right)$$

and minimizing a color difference between the captured spectral reflectance data and the initial BTF by optimizing in a first optimization step the parameters of the first sub-term while the parameters of the second sub-term are kept constant, and by optimizing in a second optimization step the parameters of the second sub-term while the parameters of the first sub-term are kept constant;

(ii) providing a digital representation of illumination conditions by displaying a user interface comprising a plurality of illumination conditions on the display device;

detecting with the computer processor a user input being indicative of selecting an illumination condition from the plurality of displayed illumination conditions, and in response to the detected user input, retrieving with the computer processor via the communication interface the digital representation of illumination conditions associated with the detected user input;

(iii) optionally providing to the computer processor via the communication interface a model derived from historic illumination conditions and/or at least one model derived from historic environmental conditions;

(iv) generating with the computer processor color data of the colored coating layer based on the provided digital representation of the colored coating layer, the provided digital representation of the illumination condition and optionally the provided model(s); and (v) displaying on the display device the generated color data received from the computer processor.

It is an essential advantage of the methods and systems according to the present invention that they allows to predict the visual impression of an object, in particular an automotive body, being coated with at least one colored coating layer under different illumination conditions, thus allowing light designers to rapidly choose the illumination conditions necessary to increase the attractiveness of the colored coating object without having to physically install and optimize various light sources. Moreover, the methods and systems allow a customer to rapidly check whether the colored object, in particular the colored automotive, has the desired visual impression under real life conditions, such as outdoors or inside a room, e.g. a garage etc., prior to purchase, thus reducing potential disappointments after the purchase. Finally, the methods and systems render it superfluous for the seller to provide objects in various colors such that the customers can view the available colors and select the desired color prior to the purchase, thus reducing the exhibition space and costs associated with the exhibition space.

Further disclosed is—according to a first embodiment—a system for predicting the appearance of an object being coated with at least one colored coating layer, said system comprising:

optionally a communication interface for providing a model derived from historic illumination conditions and/or at least one model derived from historic environmental conditions to a computer processor;

at least one communication interface for providing a digital representation of a colored coating layer and a digital representation of illumination conditions to the computer processor;

a display device comprising a screen;

an interaction element for detecting a user input;

optionally a least one illumination sensor and/or at least one orientation sensor adapted to sense the orientation of the display device and/or at least one vantage point sensor adapted to sense the vantage point of a user holding the display device;

a processor in communication with the communication interfaces, the display device and optionally the at least one illumination and/or orientation and/or vantage point sensor, the processor programmed to:

receive via the communication interface the digital representation of the colored coating layer;

generate a user interface presentation comprising a plurality of illumination conditions, detect a user input being indicative of selecting an illumination condition from the plurality of displayed illumination conditions and retrieve the digital representation of illumination conditions associated with the detected user input in response to the detected user input;

optionally calculate an ambient illumination condition surrounding the display device from the retrieved digital representation of the illumination conditions and the received model(s); and generate color data of the colored coating layer based on the received digital representation of the colored coating layer and the received digital representation of the illumination condition or the calculated ambient illumination condition surrounding the display device, wherein the display device receives the generated user interface presentation and the generated color data of the colored coating layer from the processor and displays the generated user interface presentation and color data and wherein the digital representation of the colored coating layer comprises an optimized bi-directional texture function (BTF) which is obtained by the steps described in connection with step (i) of the inventive method above.

The processor may be the processor of the display device, i.e. the processor may be present within an enclosure of the display device housing the screen, or the processor may be present outside the display device, for example in a further computing device, such as a cloud computing device. This may be preferred if the computing power of the processor of the display device is not high enough to generate the color data and optionally calculate the ambient illumination conditions prior to generation of color data.

Further disclosed is—according to an alternative embodiment— a system for predicting the appearance of an object being coated with at least one colored coating layer, said system comprising:

optionally a communication interface for providing a model derived from historic illumination conditions and/or at least one model derived from historic environmental conditions to a computer processor;

at least one communication interface for providing a digital representation of a colored coating layer and a digital representation of illumination conditions to the computer processors;

a display device comprising a screen;

an interaction element for detecting a user input;

optionally a least one illumination sensor and/or at least one orientation sensor adapted to sense the orientation of the display device and/or at least one vantage point sensor adapted to sense the vantage point of a user holding the display device;

a first processor in communication with the communication interfaces, the display device and optionally the at least one illumination and/or orientation and/or vantage point sensor, the processor programmed to:

generate a user interface presentation comprising a plurality of illumination conditions, detect a user input being indicative of selecting an illumination condition from the plurality of displayed illumination conditions and retrieve the digital representation of illumination conditions associated with the detected user input in response to the detected user input;

optionally calculate an ambient illumination condition surrounding the display device from the retrieved digital representation of the illumination conditions and the received model(s); and a second processor in communication with the communication interfaces and the first processor, the second processor programmed to:

receive via the communication interface the digital representation of the colored coating layer and the digital representation of illumination conditions or the ambient illumination conditions calculated with the first processor;

generate color data of the colored coating layer based on the received digital representation of the colored coating layer and the received digital representation of illumination conditions or the calculated ambient illumination conditions received from the first processor, wherein the display device receives the generated color data of the colored coating layer from the processor and displays the generated color data and wherein the digital representation of the colored coating layer comprises an optimized bi-directional texture function (BTF) which is obtained by the steps described in connection with step (i) of the inventive method above.

Further disclosed is—according to yet an alternative embodiment— a system for predicting the appearance of an object being coated with at least one colored coating layer, said system comprising: a display; one or more computing nodes; and one or more computer-readable media having thereon computer-executable instructions that are structured such that, when executed by the one or more computing nodes, cause the system to perform the inventive method described herein.

Further disclosed is:

A non-transitory computer-readable storage medium, the computer-readable storage medium including instructions that when executed by a computer, cause the computer to perform the steps according to the computer-implemented method described herein.

The disclosure applies to the systems, methods, computer programs, computer readable non-transitory media, computer program products disclosed herein alike. Therefore, no differentiation is made between systems, methods, computer programs, computer readable non-volatile storage media or computer program products. All features disclosed in connection with the methods are equally disclosed with respect to systems, computer programs, computer readable non-transitory storage media, and computer program products disclosed herein.

Further disclosed is the use of the method disclosed herein or a system disclosed herein for predicting the appearance of an object being coated with at least one colored coating layer.

Further disclosed is an object being coated with at least one coating layer, wherein the color of at least one coating layer was predicted according to the method disclosed herein.

EMBODIMENTS

Embodiments of the Inventive Method

The at least one colored coating layer may be present on at least part of the surface of the object. The presence of the colored coating layer on at least part of the surface of the object is understood as follows: the colored coating layer is arranged on at least part of the surface of the object. However, a direct contact with at least part of the surface of the object is not necessary. Thus, other coating layers, such as cured electrocoats or primer layers as previously described can be present between the colored coating layer and the object.

The at least one colored coating layer may be a basecoat layer or a tinted clearcoat layer. "Basecoat layer" may refer to a cured color-imparting intermediate coating layer commonly used in automotive painting and general industrial painting. The basecoat material used to prepare the basecoat layer may be formulated as a solid color (straight shade) or effect color coating. "Effect color coatings" generally contain at least one effect pigment and optionally other colored pigments or spheres which give the desired color and effect. "Straight shade" or "solid color coatings" primarily contain colored pigments and exhibit no visible flop or two-tone metallic effect. The basecoat layer is formed by applying the basecoat material to a metal or plastic substrate optionally comprising at least one cured coating layer, drying the applied basecoat material, and curing the formed basecoat film. "Tinted clearcoat layer" may refer to a cured coating layer which is neither completely transparent and colorless as a clear coating nor completely opaque as a typical pigmented basecoat. A tinted clearcoat layer is therefore transparent and colored or semi-transparent and colored. The color can be achieved by adding small amounts of pigments commonly used in basecoat coating materials. The tined clearcoat layer is formed by applying the tinted clearcoat material to a substrate commonly comprising at least one coating layer, such as a colored basecoat layer, drying the applied tinted clearcoat material and curing the formed tinted clearcoat film.

The object may be an automotive or a part thereof. The term "automotive" refers to an automobile such as a car, a van, a minivan, a bus, a SUV (sports utility vehicle); a truck; a semitruck; a tractor; a motorcycle; a trailer; an ATV (all-terrain vehicle); a pickup truck; a heavy duty mover, such as bulldozer, mobile crane and earth mover; an airplanes; boats; ships; and other modes of transport that are commonly coated with at least one coating layer.

In an aspect, the display device comprises an enclosure housing the computer processor used in steps (i) to (v) and the screen. The display device therefore comprises the computer processor and the screen. The enclosure may be made of plastic, metal, glass, or a combination thereof.

In an alternative aspect, the display device and the computer processor performing steps (i) to (iv) or steps (ii) to (iv) or step (iv) are configured as separate components. According to this aspect, the display device comprises an enclosure housing the screen but not the computer processor performing steps (i) to (iv) or steps (ii) to (iv) or step (iv) of the inventive method. The computer processor performing steps (i) to (iv) or steps (ii) to (iv) or step (iv) of the inventive method is thus present separately from the display device, for example in a further computing device. The computer processor of the display device and the further computer processor are connected via a communication interface to allow data exchange. Use of a further computer processor being present outside of the display device allows to use higher computing power than provided by the processor of the display device, thus reducing the computing time necessary to perform these steps and thus the overall time until the generated color data is displayed on the screen of the display device. This allows to display a change in the appearance of the colored object upon modification of illumination conditions in real-time or near real-time, thus resulting in a user intuitive and efficient selection of the desired appearance, in particular color, and/or illumination conditions resulting in the desired appearance. The further computer processor can be located on a server, such that steps (i) to (iv) or steps (ii) to (iv) or step (iv) of the inventive method is/are performed in a cloud computing environment. In this case, the display device functions as client device and is connected to the server via a network, such as the Internet. "Client device" may refer to a computer or a program that, as part of its operation, relies on sending a request to another program or a computer hardware or software that accesses a service made available by a server. Preferably, the server may be an HTTP server and is accessed via conventional Internet web-based technology. The internet-based system is in particular useful, if the service of designing the color of a colored coating layer being produced from a colored coating material is provided to customer.

The display device may be a mobile or a stationary display device, preferably a mobile display device. Stationary display devices include computer monitors, television screens, projectors etc. Mobile display devices include laptops or handheld devices, such as smartphones and tablets.

The screen of the display device may be constructed according to any emissive or reflective display technology with a suitable resolution and color gamut. Suitable resolutions are, for example, resolutions of 72 dots per inch (dpi) or higher, such as 300 dpi, 600 dpi, 1200 dpi, 2400 dpi, or higher. This guarantees that the generated color data can displayed in a high quality. A suitably wide color gamut is that of standard Red Green Blue (sRGB) or greater. In various embodiments, the screen may be chosen with a color gamut similar to the gamut perceptible by human sight. In an aspect, the screen of the display device is constructed according to liquid crystal display (LCD) technology, in particular according to liquid crystal display (LCD) technology further comprising a touch screen panel. The LCD may be backlit by any suitable illumination source. The color gamut of an LCD screen, however, may be widened or otherwise improved by selecting a light emitting diode (LED) backlight or backlights. In another aspect, the screen of the display device is constructed according to emissive polymeric or organic light emitting diode (OLED) technology. In yet another aspect, the screen of the display device may be constructed according to a reflective display technology, such as electronic paper or ink. Known makers of electronic ink/paper displays include E INK and XEROX. Preferably, the screen of the display device also has a suitably wide field of view that allows it to generate an image that does not wash out or change severely as the user views the screen from different angles. Because LCD screens operate by polarizing light, some models exhibit a high degree of viewing angle dependence. Various LCD constructions, however, have comparatively wider fields of view and may be preferable for that reason. For example, LCD screens constructed according to thin film transistor (TFT) technology may have a suitably wide field of view. Also, screens constructed according to electronic paper/ink and OLED technologies may have fields of view wider than many LCD screens and may be selected for this reason.

In yet another alternative aspect, the display device is a projection display device configured to project, e.g. display, the digital representation of the provided colored coating layer and/or the digital representation of illumination conditions and/or the generated color data on a projection region. In this case, the projection region is corresponding to the screen of the display device as previously outlined. The projection surface used for projection of the digital representation(s) and/or generated color data may be a 2D or a 3D surface, such as a flat wall or desk, an automotive or a part thereof or a defined 3D space. In one example, the generated color data may be projected onto a 3D surface in the form of an automotive or part thereof. The 3D surface may be colored, semi-transparent or transparent. In another example, the generated color data may be displayed by the projection device using 3D hologram techniques in which the colored 3D object, such as an automotive or a part thereof being obtained by rendering processes described below is projected freely in a predefined space and can be viewed without 3D glasses etc. Use of a projection surface corresponding to the shape of the object for which the appearance is to be designed or use of a colored hologram allows to enhance the visualization of the generated appearance because the user can directly compare the appearance of the colored object with the desired visual appearance of the object. The user input on the projection surface may be detected with the projection display device via an image detection system. Suitable projection display devices used to project images and/or to project images and to detect interaction of a user with these images, are well known in the state of the art.

In yet a further aspect, the display device comprising an enclosure housing the screen and a projection display device as previously described may be used in combination. In one example, the display device comprising the enclosure housing the screen may be used for steps (i) to (iv), while the projection display device may be used to display the generated color data in step (v). In another example, the projection display device may be used for steps (i) to (iv) while the display device comprising an enclosure housing the screen may be used to display the generated color data in step (v).

The display device may comprise an interaction element to facilitate user interaction with the display device. In one example, the interaction element may be a physical interaction element, such as an input device or input/output device, in particular a mouse, a keyboard, a trackball, a touch screen or a combination thereof. In another example, the interaction element may be the projection area in which a user input in the form of a gesture, such as a finger gesture or motion of the hand, is received.

In an aspect, steps (iv) and (v) are performed simultaneously. "Simultaneously" refers to the time it takes the computer processor to perform step (iv) and the display device to display the generated color data. Preferably, the time is small enough such that the user can instantly see the effect of a change in illumination conditions on the displayed appearance of the colored object within a reasonable time, such as up to a couple of seconds, in particular up to a second, thus allowing to change the illumination conditions interactively and resulting in a fast and precise selection of the desired appearance and/or illumination conditions.

Step (i):

In step (i) of the inventive method, a digital representation of a colored coating layer is provided via the communication interface to the computer processor. According to a first embodiment of the inventive method, the digital representation of the colored coating layer preferably comprises color space data, gloss data, appearance data, texture characteristics or a combination thereof. One example of color space data are defined by L*a*b*, where L* represents luminous intensity, a* represents a red/green appearance, b* represents a yellow/blue appearance. Another example of color space data is defined by L*, C*, h, where L* represents lightness, C* represents chroma, and h represents hue. Appearance data may include, for example, longwave values, shortwave values, DOI (Distinctness of Image values). The longwave and shortwave values indicate the degree of orange peel while the DOI indicates the degree of brilliance and gloss. The term "texture characteristics" refers to the coarseness characteristics and/or sparkle characteristics of an effect coating. The coarseness characteristics and the sparkle characteristics of effect coatings can, for example, be determined from texture images acquired by multi-angle spectrophotometers as known in the state of the art. Texture images can be black-and-white images or can be color images.

According to an alternative embodiment of the inventive method, the digital representation of the colored coating layer comprises an optimized bi-directional texture function (BTF), which is obtained by the following steps:

determining an initial BTF for the colored coating layer using a camera-based measurement device, capturing spectral reflectance data for the colored coating layer for a pre-given number, i.e. a limited number, of different measurement geometries using a spectrophotometer, and adapting the initial BTF to the captured spectral reflectance data to obtain an optimized BTF by segmenting the initial BTF of formula (1)

$$f(x, \vec{i}, \vec{o}) = \chi(\vec{i}, \vec{o})\left(\frac{a}{\pi} + \sum_{k=1}^{3} f_{S_k, a_k, F_{0,k}}^{CT}(\vec{i}, \vec{o})\right) + \Xi(x, \vec{i}, \vec{o}) \quad (1)$$

in which x: surface coordinates of the sample/object $\vec{i}, \vec{o}$: illumination and observation/viewing directions at the basecoat of the sample $\chi(\vec{i}, \vec{o})$: color table depending on illumination and observation direction a: Albedo or diffuse reflectivity $$f_{S_k, a_k, F_{0,k}}^{CT}(\vec{i}, \vec{o}):$$

the k-th Cook-Torrance lobe, corresponding to a Bi-directional Reflectance Distribution Function (BRDF) that describes the glossiness of a microfacet surface $S_k$: weight for the k-th Cook-Torrance lobe $a_k$: parameter for the Beckmann distribution of the k-th Cook-Torrance lobe $F_{0,k}$: Fresnel reflectivity for the k-th Cook-Torrance lobe $\Xi(x, \vec{i}, \vec{o})$: table of spatial texture images depending on illumination and observation direction into a term $$\chi(\vec{i}, \vec{o})\left(\frac{a}{\pi} + \sum_{k=1}^{3} f_{S_k, a_k, F_{0,k}}^{CT}(\vec{i}, \vec{o})\right)$$

(F1) and a term $\Xi(x, \bar{\imath}, \bar{o})$ (F2), further dividing the first term (F1) into a first sub-term corresponding to a color table depending on illumination and observation direction $\chi(\bar{\imath}, \bar{o})$ and a second sub-term corresponding to an intensity function $$\left(\frac{a}{\pi} + \sum_{k=1}^{3} f_{S_k,a_k,F_{0,k}}^{CT}(\bar{\imath}, \bar{o})\right)$$

and minimizing a color difference between the captured spectral reflectance data and the initial BTF by optimizing in a first optimization step the parameters of the first sub-term while the parameters of the second sub-term are kept constant, and by optimizing in a second optimization step the parameters of the second sub-term while the parameters of the first sub-term are kept constant.

In the first step, the camera-based measurement device creates a plurality of images (photos) of the sample at different viewing angles, at different illumination angles, at different illumination colors and/or for different exposure times, thus providing a plurality of measurement data considering a plurality of combinations of illumination angle, viewing angle, illumination color and/or exposure time. Suitable camera-based measurement devices are commercially available, such as, for example, the X-Rite TAC7® measurement device. As sample, a small flat panel coated with a cured colored coating layer or a cured multilayer coating comprising a colored coating layer coated with a clearcoat layer is used. The images obtained from the measurement device are post-processed to obtain the initial BTF. Post-processing may include creating images with high dynamic range from images being taken under a constant illumination and viewing angle but varying illumination color and exposure time, respectively. Post-processing may also include correcting the perspective of the photos relative to the sample and extraction of color and texture data from the photos. On the basis of the data gained by the post-processing, the parameters of the initial BTF are determined. The bidirectional texture function (BTF) is a 6-dimensional function depending on planar texture coordinates (x,y) as well as on view and illumination spherical angles, thus the BTF is a representation of the appearance of texture as a function of viewing and illumination direction, i.e. viewing and illumination angle. It is an image-based representation since the geometry of the surface of the object to be considered is unknown and not measured. The BTF is typically captured by imaging the surface at a sampling of the hemisphere of possible viewing and illumination directions, such that BTF measurements are typically collections of images (see Dana, Kristin J. et al., "Reflectance and Texture of Real-5 World Surfaces", ACM Transactions on Graphics, vol 18, 1999, pages 1 to 34).

In the second step, spectral reflectance curves are acquired only for a limited number of measurement geometries. Each measurement geometry is defined by a specific illumination angle/direction and a specific viewing angle/direction. The spectral reflectance measurements are performed, for example, by a hand-held spectrophotometer, such as, for example, a Byk-Mac I® with six measurement geometries (i.e. a fixed illumination angle and viewing/measurement angles of −15°, 15°, 25°, 45°, 75°, 110°), an X-Rite MAT12 ® with twelve measurement geometries (two illumination angles and six measurement angles), or an X-Rite MA 98® (two illumination angles and up to eleven measurement angles). The spectral reflectance data obtained from these measurement devices is more accurate than the color information obtained from the camera-based measurement device used in the first step.

In the third step, the initial BTF is segmented (divided) into two main terms (F1) and (F2). The first term (F1) is a homogeneous bi-directional reflectance distribution function $$f_\chi(\bar{\imath}, \bar{o})\left(\frac{a}{\pi} + \sum_{k=1}^{3} f_{S_k,a_k,F_{0,k}}^{CT}(\bar{\imath}, \bar{o})\right)$$

(BRDF) which describes reflectance properties of the sample depending only on the measurement geometry. This BRDF is a function of four real variables that defines how light is reflected at an opaque surface. The function takes an incoming light direction $\bar{\imath}$ and an outgoing direction $\bar{o}$ and returns the ratio of reflected radiance exiting along $\bar{o}$ to the irradiance incident on the surface from direction $\bar{\imath}$. Generally, the BRDF consists of three color coordinates as a function of scattering geometry, thus the specific illuminant and the color system (for example CIELAB) must be specified and included with any data when dealing with the BRDF. The BRDF is a collection of photometric data of any material (herein meaning the sample) that will describe photometric reflective light scattering characteristics of the material (the sample) as a function of illumination angle and reflective scattering angle. The BRDF describes the spectral and spatial reflective scattering properties of the material (the sample), particularly of a gonioapparent material comprised by the sample, and provides a description of the appearance of the material. Thus, many other appearance attributes, such as gloss, haze, and color, can be easily derived from the BRDF.

The second term (F2) is a texture function which accounts for a spatially varying appearance of the sample $\Xi(x, \bar{\imath}, \bar{o})$, i.e. which adds a view and illumination dependent texture image. When viewed from afar, the overall color impression of the sample is not determined by the color at a single point but by the average color of a larger area. The view and illumination dependent texture images have the property that the sum of the intensities in each of the RGB channels is zero when averaged across all pixels. Due to this property, it is assumed that the average color across a larger region of the texture image is zero or close to zero, allowing to overlay the texture image without changing the overall color and to ignore the texture images and thus term (F2) when optimizing the initial BTF. Therefore, only term (F1) is optimized when optimizing the initial BTF.

The first term (F1), i.e. the BRDF, is then further segmented into a first sub-term corresponding to a color table depending on illumination and observation direction $\chi(\bar{\imath}, \bar{o})$ and a second sub-term corresponding to an intensity function $$\left(\frac{a}{\pi} + \sum_{k=1}^{3} f_{S_k,a_k,F_{0,k}}^{CT}(\bar{\imath}, \bar{o})\right)$$

Afterwards, a color difference between the captured spectral reflectance data and the initial BTF is minimized by optimizing in a first optimization step the parameters of the first sub-term while the parameters of the second sub-term are kept constant, and by optimizing in a second optimization step the parameters of the second sub-term while the parameters of the first sub-term are kept constant.

Optimizing in a first optimization step the parameters of the first sub-term for each spectral measurement geometry may include the following:

computing first CIEL*a*b* values from the captured spectral reflectance data, computing second CIEL*a*b* values from the initial BTF of formula (1), computing correction vectors in a* and b* coordinates by subtracting the second CIEL a*b* values from the first CIEL a*b* values, component-wise interpolating and extrapolating the correction vectors for the complete range of viewing and illumination angles stored in the first sub-term, applying the interpolated correction vectors to the second CIEL*a*b* values for each spectral measurement geometry stored in the first sub-term to obtain corrected BTF CIEL*a*b* values, transforming the corrected BTF CIEL*a*b* values to linear sRGB coordinates and normalizing the linear sRGB coordinates and storing the normalized sRGB coordinates in the first sub-term.

A multilevel B-Spline interpolation algorithm (see Lee, Seungyong, et al, "Scattered data interpolation with multilevel B30 splines", IEEE transactions on visualization and computer graphics, Vol. 3, 1997, pages 228 to 244) may be used for the component-wise interpolation and extrapolation of the correction vectors.

Optimizing in a second optimization step the parameters of the second sub-term may include the following:

defining a cost function based on the sum of the color differences across all spectral reflectance measurements geometries, computing first CIEL*a*b* values from the captured spectral reflectance data, computing second CIEL*a*b* values from the initial BTF of formula (1) at different spectral reflectance geometries, comparing the second CIEL*a*b* values to the first CIEL*a*b* values using a weighted color difference formula, and optimizing the parameters of the second sub-term using a non-linear optimization method such that the cost function is minimized.

The cost function $C(\alpha, S, F_0, a)$ may be defined across all reflectance measurement geometries according to equation (2):

$$C(\alpha, S, F_0, a) = \qquad\qquad\qquad\qquad\qquad (2)$$

$$\sum_{g \in G} \Delta E\big(f(x, \vec{i}, \vec{o}) \cdot F_{CC}(i, o), f_{Ref}(\vec{i}, \vec{o})\big) + P(\alpha, S, F_0, a)$$

with

G: the set of measurement geometries for which spectral reflectance data is available g: one out of the set of measurement geometries $\Delta E(f_{Test}, f_{Ref})$: a weighted color difference formula measuring the difference between the colors $f_{Test}$ and $f_{Ref}$ $f_{Ref}(\vec{i}, \vec{o})$: reference color derived from spectral measurement $f_{Test}=f(x, \vec{i}, \vec{o}) \cdot F_{CC}(i, o)$: test color computed from the initial BTF for the given illumination and observation direction $\alpha=(\alpha_1, \alpha_2, \alpha_3)$: vector of parameters for the Beckmann distribution of the three Cook-Torrance lobes $S=(S_1, S_2, S_3)$: vector of weights for the three Cook-Torrance lobes $F_0=(F_{0,1}, F_{0,2}, F_{0,3})$: vector of Fresnel reflections for the three Cook-Torrance lobes $P(\alpha, S, F_0, \alpha)$: penalty function.

As indicated in equation (2) the cost function can be supplemented by a penalty function which is designed to take specific constraints into account. Such constraints may be used, for example, to keep the parameter values of the intensity function in a valid range to prevent effects in the optimized BTF which are not being observed in reality. In one example, the constraints are defined heuristically. To compute the color difference, the initial BTF is evaluated at the different spectral reflectance measurement geometries and the resulting CIE L*a*b*values are compared to the CIE L*a*b* values from the spectral reflectance measurements using a weighted color difference formula such as, for example, the formula defined in DIN 6157/2, and the parameters of the intensity function are optimized using a non-linear optimization method, such as, for example the Nelder-Mead-Downhill-Simplex method, so that the cost function is minimized.

The first and the second optimization steps may be run repeatedly/iteratively to further improve the accuracy of the optimized BTF. The number of iterations can be specified and pre-defined. It has been found that three iterations can already yield reliable good results. The optimized BTF is more accurate than the initial BTF which is obtained directly from the camera-based device, thus resulting in a higher color accuracy compared to the measured color when displaying colors using the optimized BTF.

In an aspect of step (i), providing the digital representation of the colored coating layer comprises displaying a pre-existing color library on the screen of the display device, selecting a color from the displayed pre-existing library, obtaining the digital representation of the colored coating layer based on the selected color and providing the obtained digital representation of the colored coating layer via the communication interface to the computer processor. The term "pre-existing color library" refers to a database with a set amount of preselected colors. The pre-existing color library may include at least 2 different colors, each color corresponding to the color of a colored coating layer being prepared from a coating material and each color being defined by the optimized bi-directional texture function (BTF) calculated as previously described or being defined by color space data and/or gloss data and/or appearance data and/or texture characteristics.

Displaying the pre-existing color library may include providing object data of a virtual object, optionally providing further color data, mapping the optimized BTFs associated with the colors present in the pre-existing library or mapping the color space data and/or gloss data and/or appearance data and/or texture characteristics associated with the colors present in the pre-existing library, and optionally the further color data to the provided virtual object data and rendering the mapping result using predefined illumination conditions. Predefined lighting conditions may include direct light sources (also called analytic light sources), such as point light sources, directional light sources or spotlights, or high dynamic range (HDR) environment maps, in particular high dynamic range (HDR) environment maps. Rendering processes using direct light sources are known in the state of the art and can be performed in real time (see for example OpenGL shading language, Rost, R. J., et. al., AddisonWesley Professional, 2009). Rendering processes using high dynamic range (HDR) environment maps are known in the state of the art as image-based lighting (see for example Debevec, Paul "Image-Based Lighting", IEEE Computer Graphics and Applications, March/April 2002, pages 37 to 34). In these processes, real or virtual objects are illuminated with images of light from the real world by capturing real-world illumination as an omnidirectional, high dynamic range image, mapping the illumination onto a representation of the environment, placing a computer graphics object inside the environment and simulating the light from the environment illuminating the computer graphics object. Rendering results using image-based lighting are therefore perceived as more realistic due to the use of real-world illumination. It may therefore be preferred to perform the rendering process using image-based lighting to obtain a more realistic image of the colored objects. The virtual object may be selected from virtual 2D objects, such as colored areas, or virtual 3D objects, such as color chips, dome shapes, automotive bodies or parts of such automotive bodies. The automotive body or part thereof may be generic or specific automotive bodies or parts thereof. The term "generic automotive body or part thereof" refers to an automotive body or part thereof being a generic representation of a vehicle class, such as a car, a motorcycle etc. Such generic body is merely used to represent the general geometry of the respective vehicle class but is normally not manufactured. In contrast, the term "specific automotive body or part thereof" refers to an automotive body or part thereof having the same geometry as a real automotive body being manufactured. Data on the virtual object may be stored on a computer readable medium, such as the memory of the display device or a database connected via a communication interface with the display device. In one example, the user may be able to select the virtual object prior to rendering. For this purpose, available virtual objects may be displayed to the user on the screen of the display device and the user may select the desired object via the interaction element. Object data associated with the selected virtual object is then retrieved by the processor from a computer readable medium, such as a database or internal memory, prior to rendering. In another example, a pre-defined virtual object is used for rendering. In yet another example, the user may provide to the computer processor via a communication interface a virtual object stored on a data storage medium. The virtual object used for rendering may also be a colored virtual object. In one example, color data associated with available or predefined virtual objects is retrieved by the processor based on the selected or pre-defined virtual object. In another example, the user can select a color from the pre-exiting color library displayed on the screen of the display device as previously disclosed. The color data associated with the selected color is then retrieved from a computer readable medium, such as the memory of the display device or a database, prior to rendering. Use of colored virtual objects allows the user to display the overall visual impression of the object if the selected color is combined with a further colored coating layer. This may be preferred if the colored coating layer is a tined clearcoat with is to be combined with an underlaying colored basecoat layer because the color of the basecoat layer is at least partly visible through the tinted clearcoat layer due to its at least partial transparency. The displayed pre-existing color library may be manipulated, for example by zooming, moving, turning and/or scrolling, to increase user comfort upon browsing through the displayed colors present in the pre-existing library.

The pre-existing color library may be stored on a computer readable medium and may be provided via a communication interface to the computer processor performing the rendering step previously disclosed. The computer readable medium may be a memory of the display device or may be an external storage device, such as a database, connected via a communication interface, in particular a wireless communication interface, with the display device. The user may select a color from the displayed pre-existing color library via an interaction element, present within the display device, coupled to the display device via a communication interface or projected by the display device. After selecting the desired color from the displayed pre-existing color library, the digital representation of the colored coating layer may be obtained by searching a database for said digital representation based on the selected color. Displaying a pre-defined color library allows the user to browse through all available colors easily and to select the desired color in a user intuitive way.

In an alternative aspect of step (i), the step of providing the digital representation of the colored coating layer comprises providing coating layer identification data, obtaining the digital representation of the coating layer based on the provided coating layer identification data and providing the obtained digital representation. Providing coating layer identification data may include providing the optimized bi-directional texture function (BTF) of the colored coating layer and/or providing data being indicative of the colored coating layer. Data being indicative of the colored coating layer may refer to the color number, the color name, a QR code, a bar code, etc. Such data may be provided by the user via the screen of the display device. The screen may comprise a GUI in order to facilitate data entry for the user. The digital representation of the coating layer may then be obtained by searching a database for said digital representation based on the provided coating layer identification data.

In an aspect, step (i) further includes displaying the color associated with the provided digital representation of the colored coating layer on the screen of the display device. The "color associated with the provided digital representation" refers to the displayed color which is resulting from using the optimized BTF comprised in the digital representation of the colored coating layer for displaying the color on the screen of the display device. Displaying the obtained color data may include providing object data of a virtual object and rendering the provided color data and the provided object data using predefined illumination conditions. The predefined illumination conditions, rendering process as well as the virtual object may be the same as previously described. This aspect allows the user to select a virtual object corresponding to the real object for which an appearance should be designed such that the visual impression of the colored virtual object is displayed as realistic as possible. Moreover, this allows the user to check whether the selected color is corresponding to the desired color and thus allows the user to correct the starting color in case a wrong starting color was selected, for example by entering an incorrect color identification data or by selecting a wrong color from the pre-existing library previously described.

Step (ii):

In step (ii) of the inventive method, a digital representation of illumination conditions is provided by displaying a user interface comprising a plurality of illumination conditions on the display device, detecting with the computer processor a user input being indicative of selecting an illumination condition from the plurality of displayed illumination conditions, and in response to the detected user input, retrieving with the computer processor via the communication interface the digital representation of illumination conditions associated with the detected user input. The term "plurality of illumination conditions" refers to at least two different illumination conditions, i.e. at least two illumination conditions being different from each other. The user interface may be displayed by the display device based on a user interface generation generated by the processor. The user interface generation may comprise, apart from the plurality of illumination conditions, further buttons, menus, etc. The plurality of illumination conditions may be depicted within the user interface presentation using icons, images, text or a combination thereof.

In an aspect, the plurality of illumination conditions includes at least (i) ambient lightning surrounding the display device, and (ii) predefined high dynamic range (HDR) environment map(s), and (iii) ambient lighting associated with a specific time, date and location.

In an aspect, the user input is detected via an interaction element. The interaction element may be a physical input device, an input/output device or a projected input device as previously described.

In an aspect, retrieving the digital representation of the illumination conditions comprises retrieving data being indicative of a date, a time, a position, in particular a geographic position, and optionally a degree of haze of the sky via the communication interface, and/or retrieving data acquired from at least one illumination sensor of the display device, data acquired from at least one orientation sensor of the display device and optionally data acquired from at least one vantage point sensor via the communication interface, and/or retrieving at least one high dynamic range (HDR) environment map via the communication interface.

The illumination sensor(s) as well as the vantage point sensor(s) of the display device may each be implemented as a CMOS imaging module, embedded camera, or similar device as described previously. Orientation sensor(s) may be placed within the enclosure of the display device and may include any suitable types of sensors capable of sensing motion of the display device, such as the pitch, roll and yaw of the display device, about one or more of its axes. Such sensors may include micro-electromechanical (MEM) gyroscopic sensor(s), such as those available from INVENSENCE CORP. of Santa Clara Calif., and inclinometers, accelerometers, etc., instead of or in addition to gyroscopic sensor(s). The high dynamic range (HDR) environment may be obtained by using a special camera with a rotating objective or fisheye lens, by photographing a sphere reflecting the scene or by stitching images and transforming images to a sphere surrounding the scene.

In one example, the step of retrieving data being indicative of a position, in particular a geographic position, via the communication interface may include displaying a world map on the display device, detecting via the interaction element a user input being indicative of selecting a position on the displayed world map, and in response to the detected user input, retrieving data associated with said selected geographic position, in particular GPS data, via the communication interface with the processor. The world map may be displayed in response to a user input being indicative of selecting an icon (which corresponds to one of the plurality of illumination conditions displayed in the user interface) displayed on the display device. The world map may be stored on a data storage medium, such as the internal memory of the display device or an external database, or may be provided via a web access service, such as Google Maps. The user may zoom or move the world map or may enter a search string, such as the name of a city, using the interaction element to facilitate locating the desired position on the displayed world map. In another example, a position determination module, such as GPS, cellular module etc., may be used to determine the position of the display device and the determined position is then retrieved via the communication interface with the computer processor.

The step of retrieving data being indicative of the date and/or time and/or degree of haze of the sky via the communication interface may include displaying at least one adjustment tool comprising at least one regulator corresponding to the date or time or haze, detecting via an interaction element a user input being indicative of manipulating the at least one adjustment tool, in particular by detecting via the interaction element a movement of at least one regulator of the at least one displayed adjustment tool, and in response to the detected user input, determining the date or time or haze associated with the position of the respective regulator. "Adjustment tool" may refer to a part of a graphical user interface which allows to modify the displayed date and/or time and or haze of the sky. The use of an adjustment tool provides user guidance with respect to the manipulation of the date and/or time and/or haze, thus presenting a user intuitive way of setting the desired parameters. The step of manipulating at least one adjustment tool via the interaction element may comprise adjusting the date and/or time and/or haze via the interaction element, for example by moving the respective regulator(s) of the adjustment tool(s) using the interaction element. In one example, the user may freely select the time and/or date and/or haze by manipulating the adjustment tool(s). In another example, at least one of date, time or haze may be fixed, i.e. a predefined value, such as the actual time or actual date or a predefined haze associated with the selected position/time, may be retrieved from a data storage medium via the communication interface with the computer processor.

Data acquired from at least one illumination sensor of the display device may include data on the illumination conditions surrounding the display device, such as the Lux level, the spectral content, illumination directions, at least one photograph of the environment surrounding the display device, in particular at least one high dynamic range (HDR) or low dynamic range (LDR) photograph, or a combination thereof. Lux level may describe the general level of ambient light incident on the surface of the screen of the display device. Spectral content may describe the spectral components of the ambient light. Illumination directions may include the dominant illumination direction(s), i.e. the primary direction(s) from which ambient light is incident. If the appearance of the object is modeled in an environment where there are one or a few ambient light sources, then there may be one or a few distinct dominant illumination directions. On the other hand, if the appearance of the surface is modeled in a diffuse ambient environment including multiple sources or diffuse sources, there may not be a dominant illumination direction. Use of data acquired from the illumination sensor(s) renders it possible to consider the effects of real illumination sources being present in the environment surrounding the display device in predicting the appearance of the colored object instead of using predefined illumination sources.

Data acquired from at least one vantage point sensor of the display device may include at least one photograph showing the user viewing the display device. According to various embodiments, the illumination sensor(s) and the vantage point sensor(s) may be implemented as a single sensor with both vantage point position and illumination information derived from at least one photograph acquired by the single sensor.

Retrieving at least one high dynamic range (HDR) environment map may include displaying at least one high dynamic range (HDR) environment map on the screen of the display device, detecting via an interaction element a user input being indicative of selecting a displayed high dynamic range (HDR) environment map and in response to the detected user input, retrieving the high dynamic range (HDR) environment map associated with the detected user input via the communication interface. Data associated with the selected HDR environment map may include existing HDR environment maps, i.e. HDR environment maps which have previously been acquired and are stored on a data storage medium. The step of displaying at least one HDR environment map on the display device may include displaying at least one existing HDR environment map on the display device. The existing HDR environment maps may be stored on a data storage medium, such as the internal memory of the display device, or may be retrieved from a database via a communication interface prior to their display. Retrieving the selected HDR environment map may include retrieving the selected HDR environment map from a data storage memory, such as an external database or the internal memory, based on detected user input via the communication interface with the computer processor.

In an aspect, step (ii) may further include displaying the retrieved illumination conditions on the display device. In one example, this may include calculating a HDR environment map from the data being indicative of a date, a time, a position, in particular a geographic position, and optionally a degree of haze of the sky using a model derived from historic illumination conditions as described previously and displaying the calculated HDR environment map. In another example, this may include calculating a HDR environment map from the data acquired by the illumination sensor(s) and/or orientation sensor(s) and/or vantage point sensor(s) using at least one model derived from historic environment conditions as described previously and displaying the calculated HDR environment map. In yet another example, this may include displaying the retrieved existing HDR environment map. Displaying the provided illumination conditions on the display device to the user may allow the user to check whether the desired illumination conditions were selected and to correct the input if necessary.

Optional Step (iii):

In optional step (iii) of the inventive method, a model derived from historic illumination conditions and/or a model derived from historic environmental conditions is provided to the computer processor via the communication interface. This step may also be performed after providing the digital representation of illumination conditions to the computer processor as described in relation to step (iii) below. The communication interface may be wired or wireless, in particular wireless. Examples of wireless communication interfaces are WLAN, WiFi or Bluetooth. The computer processor may be any suitable kind of processor. According to various embodiments, the computer processor, in particular the processor of the display device, may comprise a graphics processing unit (GPU) specifically designed to handle graphics processing. For example, suitable GPUs are available from NVIDIA and AMD (Advanced Micro Devices, Inc.). The processor may also be in communication with a memory and interaction elements, such as input/output devices. The input/output devices may allow the user to configure the device and/or to input data. In various embodiments, the display device may provide a menu-driven user interface on the screen or on a secondary display allowing the user to enter information and to guide the user through the process. In addition to other peripherals, the processor may be in communication with a computer via wired or wireless data link, such as, for example, a RS232 or Universal Serial Bus (USB) link.

In an aspect of step (iii), the model derived from historic illumination conditions is a physically-based analytical model of the daytime sky. Such models are known in the state of the art and are commonly used for rendering processes involving the use of daylight. One suitable model is the Preetham model of formula (3), $$F_{Preetham}(\theta, \gamma) = \left(1 + Ae^{B/cos\theta}\right)\left(1 + Ce^{D\gamma} + E\cos^2\gamma\right) \quad (3)$$

in which $\gamma$ is the angle formed by the view direction and a vector pointing towards the sun, $\theta$ is the angle formed by zenith and view direction, A, B, C, D, E are radiance distribution parameters.

The parameters A to E are calculated analytically from a set of linear functions that take one parameter, turbidity, as an argument, and return the parameters A to E, as well as a bi-cubic function of turbidity and solar elevation angle for calculating zenith luminance. In addition to luminance, the Preetham model also provides two chroma channels that are calculated using the same approach, and the outputs can be converted to spectral radiance data. Another suitable model is the model described in I. Hosek et. al, "An analytic model for full spectral sky-dome radiance", ACM Transactions on Graphics, 2012, Vol. 31, Article No.: 95, https://doi.org/10.1145/2185520.2185591. Since the latter model yields good results for high as well as for low turbidity values of the atmosphere, the latter model is preferably used within the present invention. The model of Hosek et. al. provides spectral radiance data for each point on the hemisphere and for each wavelength which can be used to calculate an HDR environment map arbitrarily filling the lower half of the spherical panorama with a pre-defined bottom color. For this purpose, the spectral radiance data for pixel of the HDRI is calculated and the calculated spectral radiance data for each pixel is then transformed into color space data, such as sRGB values or CIEL*a*b* values.

In an aspect of step (iii), the at least one model derived from historic environmental conditions provides a relationship between the data acquired from the illumination and/or orientation and/or vantage point sensor(s) of the display device and the ambient lighting conditions surrounding the display device. "Ambient lighting" may refer to any source of light that is not explicitly supplied to the environment for the purpose of determining the ambient lighting surrounding the display device using the aforementioned model. The term usually refers to sources of light that are already available naturally (e.g. the Sun, the Moon, lightning) or artificial light already being used (e.g. to light a room). The ambient lighting conditions surrounding the display device may be determined using a number of models commonly known in the state of the art from data acquired by the illumination sensor(s) and/or the vantage point sensor(s), such as a CMOS imaging module, embedded camera, or similar device, of the display device. In one example, the illumination and vantage point sensor(s) may be implemented as a single sensor. Data acquired by said sensor(s) may include high dynamic range (HDR) photographs or low dynamic range (LDR) photographs. One suitable model calculates a HDR environment map from single HDR photographs acquired with the illumination and/or vantage point sensor(s) from different viewing directions using data acquired from the orientation sensor(s), for example as described in P. Debevec, "Image-based lighting", ACM SIGGRAPH 2006 Courses, pages 4—es and, Q. Yang et. al, "Inertial sensors aided image alignment and stitching for panorama on mobile phones", Proceedings of the 1st International Workshop on Mobile Location-Based Service, 2011, pages 21 to 30 (called HDRI model hereinafter). Another suitable model derives the color and brightness from a low dynamic range (LDR) photograph and uses said values to estimate the ambient lighting conditions surrounding the display device (called ambient lighting model hereinafter). An example of such an ambient lighting model is implemented in Apple's ARKit program library. Other suitable models calculate the spherical harmonics (SH) coefficients from low dynamic range (LDR) photographs (called SH coefficient model hereinafter). Since only 9 coefficients are needed to accurately represent the surface's irradiance given that irradiance smoothly varies with orientation, said coefficients are a very effective technique to compress direct illumination from distant sources. In one example, the SH coefficients can be calculated as implemented in Apple's ARKit program library from the color, brightness and main illumination direction present in the data acquired by the illumination and/or vantage points sensor(s), the main illumination direction being determined using the shadowing a face recognized in the acquired data, such as a photograph. The calculated SH coefficients can be used to generate the color data in step (v) (see for example OpenGL shading language, Rost, R. J., et. al., AddisonWesley Professional, 2009) or a HDR environment map can be calculated from the SH coefficients (see for example P.-P. Sloan, "Stupid Spherical Harmonics (SH) tricks", Game Developers Conference 2008, February 2008) prior to generating the color data in step (v). In another example, the SH coefficients as well as an HDR environment map can be calculated from low dynamic range (LDR) photographs with a limited field of vision (FOV) using a trained neural network as implemented in Google's ARCore program library (see for example C. LeGendre et. al., "DeepLight: Learning Illumination for Unconstrained Mobile Mixed Reality", Proceedings of the IEEE/CVF Conference on Computer Vision and Pattern Recognition, 5918 to 5928).

Step (iv):

In step (iv) of the inventive method, color data of the colored coating layer is generated with the computer processor based on the provided digital representation of the colored coating layer, the provided digital representation of the illumination condition and optionally the provided model(s). In an aspect, the step of generating color data with the computer processor includes providing object data of a virtual object, optionally providing further color data of at least one further coating layer, mapping the provided digital representation of the colored coating layer and optionally further color data on the provided virtual object and rendering the mapping result using the provided digital representation of illumination conditions and optionally the provided model(s).

The virtual objects may be 2D virtual objects, such as geometric shapes, or 3D virtual objects, such as chips, dome shapes, automotive bodies or parts thereof. The virtual object may be a predefined virtual object, may be selected by the user from displayed predefined objects prior to mapping or may be provided by the user prior to mapping as described previously. The step of providing further color data may include selecting at least one further color of a colored coating layer, in particular from a pre-existing color library such as previously described and providing the color data associated with the selected color to the processor prior to rendering. This allows the user to model the appearance of colored objects comprising more than one colored coating layer. Depending on the provided digital representation of illumination conditions, data contained in said digital representation may either be processed by the computer processor using an appropriate provided model prior to rendering or may be used directly for rendering. In one example, data contained in the provided digital representation of the illumination conditions may be processed using the processor of the display device. This may be preferred if the processor of the display device has sufficient computing power to perform data processing prior to rendering within a reasonable time, such as a few milliseconds up to a few seconds. In another example, the processing is performed by a further processor present outside of the display device. This may be preferred if the computing power of the processor of the display device is insufficient to perform the data processing prior to rendering within an acceptable time.

In an aspect, step (iv) further includes calculating with the computer processor an ambient illumination condition surrounding the display device from the provided digital representation of illumination conditions and the provided at least one model derived from historic environmental conditions prior to generating color data of the colored coating layer. In this case, the provided digital representation of illumination conditions contains data acquired by at least one of the following sensor(s): illumination sensor(s), orientation sensor(s) and vantage point sensor(s). The ambient illumination condition is calculated with the computer processor from acquired sensor data using at least one model derived from historic environmental conditions as previously described, such as the ambient lighting model, the HDR environment map model or the SH coefficients model. In one example, calculating the ambient illumination condition may include calculating an ambient lighting by estimating the brightness and color from the data acquired by the illumination sensor(s) as previously described. In another example, calculating an ambient illumination condition may include calculating a HDR environment map from the data acquired by the illumination sensor(s) and the orientation sensor(s) as previously described. In yet another example, calculating an ambient lighting condition may include calculating spherical harmonics (SH) coefficients from the data acquired by the illumination sensor(s) and optionally from data acquired by the vantage point sensor(s) and optionally calculating a HDR environment map from the calculated SH coefficients as previously described. The location of the vantage point may be derived from the photograph(s) acquired by the vantage point sensor or by the combined illumination and vantage point sensor of the display device. For example, a human eye or eyes may be identified in the photograph(s) according to any suitable algorithm. It may be assumed that the eye or eyes are directed toward the screen of the display device. Also, the distances between the eye(s) and respective points on the surface of the screen of the display device may be assumed based, for example, on the orientation of the display device as sensed by at least one orientation sensor. For example, when the user holds the display device at a position near eye level, they may tend to initially hold it at a more upright angle than when they hold it at a position near the waist. From the position of the eye(s) in the at least one photograph, the direction of the eye(s), and the distances between the eye(s) and respective points on the surface of the display device, the vantage point position may be derived.

Rendering may be performed with image-based lighting (IBL) using the provided or calculated HDR environment maps as previously described (see for example Debevec, Paul "Image-Based Lighting", IEEE Computer Graphics and Applications, March/April 2002, pages 37 to 34) or using the calculated SH coefficients as previously described (see for example OpenGL shading language, Rost, R. J., et. al., AddisonWesley Professional, 2009). The rendered object may be placed in front of a predefined background or a background selected by the user via a GUI displayed on the screen of the display device. The background may be a uniform color, comprising different colors or may be a photograph of an environment. Selection of a background by the user may either comprise selecting a background from a plurality of displayed predefined backgrounds via the inter-action element or providing a background by the user. The selected background may then be retrieved from a data storage medium based on the user selection and provided to the computer processor. Providing a background by the user may include retrieving a background, such as a stored image, from a data storage medium, or acquiring a photograph of the environment with the illumination sensor of the display device and providing the retrieved background or acquired photograph to the computer processor. Selection of a background by the user allows the user to display the rendered object in a desired environment, thus obtaining a better impression of the appearance of the object under real world conditions. In one example, the rendering is per-formed by the processor of the display device. In case the ambient illumination conditions are calculated with this processor as previously described, the processor can use the calculated ambient illumination conditions directly for ren-dering. In case the ambient illumination conditions are calculated with a further processor, the calculated ambient illumination conditions re provided to the processor of the display device via a communication interface prior to ren-dering. In another example, the rendering is performed by a further processor present outside of the display device and the rendering result is provided to the processor of the display device via a communication interface for display on the screen. This may be preferred if the computing power of the processor of the display device is insufficient to perform the rendering within an acceptable time, i.e. if the processor of the display device is not able to render at least 25 images within a second.

In an aspect of step (iv), the generated color data is recalculated and displayed on the screen of the display device in response to a change in data contained in the digital representation of illumination conditions provided in step (iii), in particular in response to a change in the provided data from at least one illumination sensor and/or to a change in the provided data from at least one orientation sensor and/or to a change in the provided data from at least one vantage point sensor. Recalculation may be performed automatically, i.e. without any user interaction upon detec-tion that the data contained in the provided digital repre-sentation of illumination conditions, in particular the data acquired by at least one sensor, has changed, for example by changing the illumination conditions surrounding the dis-play device and/or changing the orientation of the display device and/or changing the vantage point. For this purpose, the computer processor may be programmed to detect a change in the data acquired by at least one sensor or modification of data previously inputted by the user, such as time, position, location, haze, and may initiate recalculation of the generated color data using the newly acquired sensor data or modified input. Recalculation and displaying of the recalculated color data may be performed in real time or near real time. In this way, as the user tilts and rotates the display device, changes the vantage point or the time/position/haze, the appearance of the colored object displayed on the screen of the display device may behave as though the user is tilting and rotating an actual sample, changing the vantage point with respect to an actual sample or changing the time/position/haze of an actual sample.

Step (v):

In step (v), the color data generated in step (iv) is displayed on the screen of the display device. In an aspect, the step of displaying the color data received from the computer processor on the screen of the display device includes mapping the generated color data, in particular each rendered point, to the screen of the display device, causing the screen of the display device to show the rendered object. When the object is two-dimensional, such as a flat surface, there may be a one-to-one correlation between each ren-dered point and a pixel or group of pixels on the screen of the display device. In various embodiments, however, the number of rendered points may exceed the number of available pixels. In this case, the appearance of multiple points may be averaged or otherwise aggregated at a single pixel or pixel group. With a three-dimensional object, it is possible that the shape of the object may cause more than one rendered point to map to the same pixel or pixel group. When this occurs, appropriate corrections may be made according to any suitable method. For example, when one of the points on the surface tends to obscure another relative to the vantage point, the relevant pixel or pixel group may display the appearance of the point that is nearest to the vantage point. Also, for example, a pixel that is mapped to multiple points may display the average or other aggregate of the appearance of the points. Also, when a three-dimen-sional object is mapped to the screen of the display device, the mapping may be based on facets, vertices, or any other suitable way of representing the three-dimensional object.

In case the color associated with the digital representation is already displayed on the screen of the display device in step (i) or a recalculation as described earlier is performed, the step of displaying the color data received from the processor on the screen of the display device may include automatically updating the color displayed on the screen of the display device in step (i) in response to performing step (v) or in response to a recalculation performed in step (iv). Automatically updating may refer to updating the displayed color without any user interaction required for the updating. Automatically updating the color displayed on the screen of the display device may comprise mapping the generated color data, in particular each rendered point, generated in step (iv) to the screen of the display device, thus causing the screen of the display device to update the color displayed in step (i) with the rendering result of step (iv) or to update the color displayed in step (v) with the rendering result of the recalculation performed in step (iv).

In an aspect, step (v) further comprises storing the gen-erated color data and/or further data on a computer readable medium. Further data may include the ambient lighting conditions calculated from the provided digital representa-tion of illumination conditions using one of the aforemen-tioned models as well as the data used for the calculation, such as sensor data or data inputted by the user. Storing the generated color data and/or further data may increase the speed of the prediction process because the stored data can be retrieved quickly in case it is required once again and does not have to be generated by calculation. The data may be associated with the digital representation of the colored coating layer and the digital representation of illumination conditions and stored in a database which may be accessible to the computer processor prior to generation of color data. For example, the computer processor may—prior to generating color data as previously described—access the database and check whether generated color data and/or calculated ambient lighting conditions are available based on the provided digital representation of the colored coating layer and the provided digital representation of illumination conditions. This allows to build a database containing generated color data and/or calculated ambient lighting conditions during use of the inventive method and allows to increase the speed of step (iv) because the color data and/or ambient lighting conditions do not have to be generated by the computer processor but can instead be retrieved quickly from the database.

In an aspect, step (v) further comprises adding the displayed color to a pre-existing color library or to a newly generated color library to generate a modified color library. The newly generated color library may be generated by the user prior to addition of a first color to said library and therefore does not contain any colors prior to addition of a displayed color to said library. The modified color library may be associated with a stored user profile for future use of the modified color library in designing the color of a colored coating layer. This allows the user to store and retrieve the predicted color(s) and to modify the predicted color(s) at a later point in time. The user may also remove at least one added color from the modified color library. In one example, the user may also sort the colors being present in the pre-existing or modified color library according to a grouping criterion to create a sorted color library. The sorted color library may be associated with a stored user profile for future provision of the sorted color library. The sorted color library may represent a favorite list. The grouping criterion may be feely chosen by the user or may be a predefined criterion displayed on the screen for user selection and may be, for example, newly designed colors, recently selected colors etc.

Further Steps:

In an aspect, steps (i) to (v) or steps (ii) to (v) or steps (i), (iv) and (v) are repeated. This allows to select a new color and different illumination conditions (by repeating steps (i) to (v)), to modify the illumination conditions for a selected color (by repeating steps (ii) to (v)) or to modify the color for selected illumination conditions (by repeating steps (i), (iv) and (v)). In case steps (i) to (v) or steps (ii) to (v) or steps (i), (iv) and (v) are repeated, the step of displaying on the screen of the display device the generated color data may include automatically updating the color displayed on the screen of the display device in step (v) in response to repeating steps (i) to (v) or in response to repeating steps (ii) to (v) or in response to repeating steps (i), (iv) and (v) Automatically updating the color displayed in step (i) or (v) allows to visualize the influence of illumination conditions on a given color and thus provides an interactive guidance for the user during selection of the desired color.

In an aspect, the inventive method further comprises the steps of:

(vi) modifying the provided digital representation of the colored coating layer to generate a modified digital representation of the colored coating layer;

(vii) optionally repeating step (vii);

(viii) generating color data of the coating layer(s) based on the modified digital representation(s) of the colored coating layer(s);

(ix) displaying on the screen of the display device the generated color data received from the processor;

(x) optionally repeating steps (vii) to (ix);

(xi) optionally determining with the computer processor if the modified digital representation of the colored coating layer is within at least one predefined tolerance;

(xii) optionally in accordance with the determination that the modified digital representation is within at least one predefined tolerance: repeating steps (ii) to (v) using the modified digital representation of the colored coating layer;

(xiii) optionally in accordance with the determination that the modified digital representation is within at least one predefined tolerance: providing via the communication interface the modified digital representation to a coating material manufacturing site and optionally manufacturing the coating material based on the provided modified digital representation;

(xiv) optionally in accordance with the determination that the modified digital representation is outside at least one predefined tolerance: displaying at least one recommendation on the screen of the display device; and (xv) optionally in accordance with the determination that the modified digital representation is outside at least one predefined tolerance: repeating steps (vi) to (ix) or steps (vi) to (x) or steps (vi) to (xiv).

Step (vi):

Step (vi) of modifying the provided digital representation of the colored coating layer to generate a digital representation of the colored coating layer may comprise the following:

optionally retrieving data on the formulation of a colored coating material associated with the provided digital representation and providing the retrieved data via a communication interface to the computer processor;

displaying at least part of the ingredients being present in the coating material used to prepare the colored coating layer on the screen of the display device;

manipulating at least one displayed ingredient via an interaction element;

detecting said manipulation with the computer processor; and converting with the computer processor the detected manipulation into a modified digital representation of the colored coating layer.

Data on the formulation of the coating material used to prepare the colored coating layer may comprise data on the type and amount of at least part of the ingredients being present in the coating material. Colored coating materials typically comprise at least one pigment, at least one binder and at least one solvent. Further ingredients are, for example, fillers, matting agents, crosslinking agents and additives. In case the provided digital representation of the colored coating layer does not contain such data, this data may be retrieved from a database in which this data is associated with respective digital representation of the colored coating layer provided in step (ii).

Displaying at least part of the ingredients being present in the coating formulation used to prepare the colored coating layer on the screen of the display device may include displaying at least one adjustment tool comprising a plurality of regulators, each regulator corresponding to the type and amount of an ingredient being present in the coating material. The at least one adjustment tool may be generated from the provided digital representation of the coating layer. This may include determining with the computer processor data on the formulation of the coating material used to prepare the colored coating layer comprised in the provided digital representation of the colored coating layer and generating at least one adjustment tool based on the determined data. In one example, the adjustment tool may be a box having a plurality of visually distinct compartments, each compartment being indicative of a type of ingredient being present in the coating material, the size of each compartment being indicative of the amount of the respective ingredient and the plurality of regulators corresponding to visual elements, in particular lines, separating the compartments. The type of ingredient may be displayed in the compartment using a graphical representation being indicative of the ingredient type. The graphical representation may be obtained from the provided digital representation of the colored coating layer and may be selected from images, such as color chips for colored pigments, metal pieces for metallic effect pigments, glass pieces for glass flakes, solid blocks for binders etc. The use of a box having compartments of different sizes and comprising graphical representations of specific ingredients provides an easy overview of the relevant ingredients and allows to easily assess the influence of the type/amount of each ingredient on the resulting color of the coating layer by changing the size of the compartments and/or the ingredients being present in the compartments. The use of the formulation of the coating material as a basis for the modification of its color allows to study the influence of the pigmentation on the color and thus allows to design the desired visual appearance in a very intuitive way.

Manipulating at least one displayed ingredient via the interaction element may comprise adjusting the type and/or amount of at least one displayed ingredient via the interaction element. In one example, this may include moving at least one regulator of at least one displayed adjustment tool via the interaction element.

In one example, the manipulation may be detected by a processor connected via a communication interface with the interaction element and may be provided to the computer processor via a further communication interface connecting the two processors. This may be preferred if a touch panel is used which comprises a panel processor to detect touch screen gestures. The detected touchscreen gestures are then provided via a communication interface to the computer processor which may be present within or outside of the display device. In another example, the user input may be detected with the computer processor present inside the display device. This may be preferred if an external input device is used as interaction element.

The detected user input is converted with the computer processor into a modified digital representation of the colored coating layer. This may include converting the detected user input into modified formulation data of the colored coating material used to prepare the colored coating layer. The modified formulation data of the colored coating material preferably comprises numerical values and is reflecting to the modification(s) of ingredients of the coating material performed by the user as previously described. Converting the detected user input may therefore include modifying the numerical values of the formulation data of the non-modified colored coating material, wherein the modification reflects the detected user input. In one example, the conversion is performed by a computer processor present inside the display device. In another example, the conversion is performed by a further computer processor being present outside of the display device, in particular being present inside another computing device, by providing the user input to said further processor via a communication interface and performing the conversion based on the provided user input.
Step (vii):

In optional step (vii), step (vi) is repeated at least once. This may be preferred if at least one further colored coating layer is present on the object and the color of the at least one further coating layer should also be modified.
Step (viii):

In step (viii), color data of the colored coating layer(s) is generated with the computer processor based on the modified digital representation(s) of the colored coating layer(s). If step (vii) is repeated, the user may select whether color data of coating layer(s) based on all modified digital representation(s) obtained by performing step (vii) at least twice should be generated in step (viii) or whether color data of selected modified digital representation(s) should be generated in step (viii). In the first case, the generated color data displayed in step (ix) described below corresponds to the visual impression of a combination of the colored coating layers. In the latter case, the generated color data displayed in step (ix) corresponds to the visual impression of the selected colored coating layer(s) and color data of modified digital representation(s) not selected in step (viii) may be generated upon repetition of (ix) and (x). In one example, generating color data based on the modified digital representation(s) of the colored coating layer(s) may include obtaining color data based on the modified digital representation(s), in particular based on the modified formulation data of the colored coating material(s) by retrieving color data from a database or lookup table based on the provided data of the modified formulation of the colored coating material. This may include comparing the retrieved color data to predefined tolerances, such as color distances, appearance distances or a combination thereof. In another example, generating color data based on the modified digital representation(s) of the colored coating layer(s) may include using a data driven model parametrized on color data of historical coating layers and historical formulations of colored coating materials used to prepare the historical coating layers to calculate color data from the modified digital representation(s) of the colored coating layer(s), in particular from modified formulation data of the colored coating material(s). "Data driven model" may refer to a model at least partially derived from data. Use of a data driven model can allow describing relations, that cannot be modelled by physico-chemical laws. The use of data driven models can allow to describe relations without solving equations from physico-chemical laws. This can reduce computational power and can improve speed. The data driven model may be derived from statistics (Statistics 4th edition, David Freedman et al., W. W. Norton & Company Inc., 2004). The data driven model may be derived from Machine Learning (Machine Learning and Deep Learning frameworks and libraries for large-scale data mining: a survey, Artificial Intelligence Review, Vol. 52, 2019, pages 77 to 124). The data driven model may comprise empirical or so-called "black box models". Empirical or "black box" model may refer to models being built by using one or more of machine learning, deep learning, neural networks, or other form of artificial intelligence. The empirical or "black box" model may be any model that yields a good fit between training and test data. Alternatively, the data driven model may comprise a rigorous or "white box" model. A rigorous or "white box" model refers to models based on physico-chemical laws. The physico-chemical laws may be derived from first principles. The physico-chemical laws may comprise one or more of chemical kinetics, conservation laws of mass, momentum and energy, particle population in arbitrary dimension, physical and/or chemical relationships. The rigorous or "white box" model may be selected according to the physico-chemical laws that govern the respective problem. The data driven model may also comprise hybrid models. "Hybrid model" refers to a model that comprises white box models and black box models, see e.g. review paper of Von Stoch et al., Computers & Chemical Engineering, Vol. 60, 2014, pages 86 to 101. Data driven models parametrized on color data of historical coating layers and historical formulations of colored coating materials used to prepare the historical coating layers are well known in the state of the art and are disclosed, for example, in US20020184167A1 and US20190078936A1.

Step (ix):

In step (ix), the generated color data is displayed on the screen of the display device. This may include providing object data of a virtual object, optionally providing further color data of at least one further coating layer and rendering the generated color data, the provided object data and optionally the provided further color data using predefined illumination conditions as described previously. The rendering may be performed by the processor of the display device, or a further processor as described previously. This step may include automatically updating the color displayed in step (v) in response to performing steps (vi) to (ix) as described previously. Step (ix) may include storing the generated color data and/or displayed color data, adding the displayed color data to a pre-existing color library or newly generated color library and further steps associated with the modified color library as previously described in connection with step (v).

Optional Step (x):

In optional step (x), steps (vii) to (ix) are repeated. This allows to modify the formulation of the coating material until the desired color is obtained.

Optional Step (xi):

In optional step (xi), the computer processor determines whether the modified digital representation of the colored coating layer is within predefined tolerances. This allows to guarantee that the color designed by the user fulfills certain predefined tolerances. Such tolerances may be selected from a maximum or minimum amount of an ingredient, an allowable combination of at least part of the ingredients and combinations thereof. The ingredient(s) may be pigments, binders, solvents or further ingredients being present in the coating material used to prepare the colored coating layer. In particular, a maximum or minimum amount of certain pigment types and/or binders and/or an allowable combination of pigment types and/or binders may be selected as predefined tolerances. The predefined tolerances may be stored on a storage device, such as a database, and may be provided via a communication interface to the computer processor performing step (xi). The step of determining if the modified digital representation of the coating layer is within at least one predefined tolerance may comprise comparing data of the modified formulation of the coating material contained in the modified digital representation with at least one predefined tolerance using a computer processor, in particular the computer processor of the display device. The comparison may be performed by using a rigorous model. The rigorous model may be selected according to the physico-chemical laws that govern the respective problem.

Optional Step (xii):

In optional step (xii), steps (ii) to (v) are repeated in case the modified digital representation is within at least one, in particular within all, predefined tolerance(s). This allows the user to check whether the modified color also has the desired appearance under defined illumination conditions. In an embodiment, optional step (xii) can also be performed prior to step (xi). However, it is desired to perform step (xii) after step (xi) because this guarantees that the color designed by the user fulfills defined criteria and can be produced and applied onto an object, thus allowing to produce a colored object having the designed color if desired by the user.

Optional Step (xiii):

In optional step (xiii) the modified digital representation of the colored coating material is provided via a communication interface to a coating material manufacturing site. In one example, this may be triggered by the user in case the user is satisfied with the appearance of the colored object displayed on the screen of the display device upon repeating steps (ii) to (v) using the modified digital representation of the colored coating layer (i.e. the modified digital representation of the colored coating layer is provided in step (ii)). In another example, the user may skip step (xiii) and directly proceed to step (xiii). The modified digital representation preferably comprises the modified formulation obtained by converting the user input received via the interaction element. In one example, the step of providing the modified digital representation of the coating layer to the coating material manufacturing site includes providing via a communication interface formulation data associated with the modified digital representation to a processing unit located at the coating material manufacturing site. In another example, the step of providing the modified digital representation of the coating layer to the coating manufacturing site includes providing via a communication interface formulation data associated with the modified digital representation to a computer readable medium, such as a database or a cloud. This computer readable medium may then be accessed by the processing unit located at the coating manufacturing site prior to manufacturing the coating material based on the provided modified representation. In one example, the modified digital representation is automatically provided to the coating manufacturer without any user interaction if at least one predefined tolerance, in particular if all predefined tolerances, are met by the modified representation of the coating material. A message may be displayed on the screen of the display device, or an email may be sent to the user to inform the user about the status of the data transfer to the coating material manufacturing site. In another example, the user may have to actively provide the modified digital representation to the coating material manufacturing site by clicking on a respective button on the screen of the display device. Step (xiv) may further include manufacturing the coating material based on the provided modified digital representation after the modified digital representation has been provided to the coating material manufacturing site as previously described. For this purpose, the provided modified digital representation may be adapted or converted, in particular by the processing unit located at the coating material manufacturing site, such that if fulfills predefined manufacturing requirements or data formats needed for the manufacturing process. The manufactured coating material may then be applied to a substrate, such as a metal plate or dome shape relief, using commonly known application techniques and thermally cured. The obtained cured colored coating layer may optionally be coated with a cured clearcoat layer and may then be provided to the user and compared by the user to the color designed in steps (vi) to (ix). This step ensures that the color designed by the user in steps (vi) to (ix) can be produced by the coating manufacturer based on the provided modified digital representation. In case the colored coating layer does not match the expectations of the user, the user may either repeat steps (vi) to (ix) or the coating manufacturer may adapt the formulation of the coating material to provide a better matching colored coating layer.

Optional Step (xiv):

If the determination performed in step (xi) reveals that the modified digital representation does not fulfil at least one predefined tolerance, at least one recommendation may be displayed to the user on the screen of the display in optional step (xiv). The recommendations may be stored on a computer readable medium, such as a database. In an example, the computer processor may access a database containing the recommendation(s) and may retrieve respective recommendation(s) based on the result of the determination. Said retrieved recommendation(s) is then displayed to the user on the screen of the display device. An example recommendation may be "Formulation requirements not fulfilled. Please modify the type/amount of pigment(s)".

Step (xv):

If the determination performed in step (xi) reveals that the modified digital representation does not fulfil at least one predefined tolerance, steps (vi) to (ix) or steps (vi) to (x) or steps (vi) to (xiv) may be repeated. It may be preferred to perform this step after displaying the recommendation(s) to provide user guidance with respect to modifications necessary to fulfil the predefined tolerance(s).

Steps (vi) to (ix) and optional steps (x) to (xiv) allow to modify the color in case the appearance of the colored object displayed in step (v) does not match with the desired appearance. Use of a graphical representation of the formulation of the colored coating material allows to quickly gain an understanding of the influences of the ingredients of the coating material on the resulting color of the colored coating layer, thus allowing an interactive guidance of color modification even without deep knowledge of coating compositions.

In an aspect, the method further comprises the step of providing to a computer processor via the communication interface an order instruction for an item, wherein the order instruction includes data on the color displayed in step (v) or data on the color associated with the modified digital representation of the colored coating layer fulfilling at least one predefined tolerance. The computer processor receiving the order instruction via the communication interface is present separately form the display device, i.e. is present within a further computing device. The further computing device comprising the computer processor may be located at a seller, for example at a car dealership, or at a company manufacturing the colored item, such as a car manufacturer. The seller may forward the order instruction to the manufacturer of the item, optionally after modifying the order instruction to include further data necessary for the manufacturing process or delivery to the seller. In one example, the item may be an automotive. In another example, the item may be a piece of furniture, a piece of clothing, etc. Data on the color displayed in step (v) may be the digital representation of the colored coating layer provided in step (ii) and data associated with said digital representation, such as a color code, a color name, the formulation of the coating material, etc. Data on the color associated with the modified digital representation of the colored coating fulfilling at least one predefined tolerance may be the formulation of the coating material. The order instruction may include further data, such as further configurations of the item performed by the user, user information, payment details, etc. This step of the inventive method is preferably performed if the prediction of the color of the item under different illumination conditions is performed within the process of configuring the item to be purchased, for example within a car configurator. This allows the user to select the desired color of the item, such as the automotive, by choosing a color and viewing the color under different illumination conditions to decide whether the selected color provides the appearance desired by the user.

Embodiments of the Inventive Systems

The aforementioned systems may further comprise at least one database. Such database may comprise the digital representation(s) of colored coating layer(s), color data associated with formulations of coating materials, digital representations of illumination conditions, a model derived from historic illumination conditions, model(s) derived from historic environmental conditions, data driven models parametrized on color data of historical coating layers and historical formulations of colored coating materials used to prepare the historical coating layers, object data of a virtual objects, and color data of further coating layers. The aforementioned databases may be used in any combination.

In an aspect, the systems further comprise a device for measuring color data of colored coating layers. Suitable devices for measuring color data are well known in the state of the art.

Further embodiments or aspects are set forth in the following numbered clauses:

1. A computer-implemented method for predicting the appearance of an object being coated with at least one colored coating layer and displaying the predicted appearance on a display device, said method comprising the steps of:
   (i) providing to a computer processor via a communication interface a digital representation of a colored coating layer;
   (ii) providing a digital representation of illumination conditions by
      displaying a graphical user interface comprising a plurality of illumination conditions on the display device;
      detecting with the computer processor a user input being indicative of selecting an illumination condition from the plurality of displayed illumination conditions, and
      in response to the detected user input, retrieving with the computer processor via the communication interface the digital representation of illumination conditions associated with the detected user input;
   (iii) optionally providing to the computer processor via the communication interface a model derived from historic illumination conditions and/or at least one model derived from historic environmental conditions;
   (iv) generating with the computer processor color data of the colored coating layer based on the provided digital representation of the colored coating layer, the provided digital representation of the illumination condition and optionally the provided model(s); and
   (v) displaying on the display device the generated color data received from the computer processor.

2. The method according to clause 1, wherein the digital representation of the colored coating layer comprises color space data, gloss data, appearance data, texture characteristics or a combination thereof.

3. A method for predicting the appearance of an object being coated with at least one colored coating layer and displaying the predicted appearance on a display device, said method comprising the steps of:

(i) providing to a computer processor via a communication interface a digital representation of a colored coating layer, wherein the digital representation of the colored coating layer comprises an optimized bi-directional texture function (BTF) which is obtained by the following steps:

determining an initial BTF for the colored coating layer using a camera-based measurement device, capturing spectral reflectance data for the colored coating layer for a pre-given number, i.e. a limited number, of different measurement geometries using a spectrophotometer, and adapting the initial BTF to the captured spectral reflectance data to obtain an optimized BTF by segmenting the initial BTF of formula (1)

$$f(x, \bar{i}, \bar{o}) = \chi(\bar{i}, \bar{o})\left(\frac{a}{\pi} + \sum_{k=1}^{3} f_{S_k, a_k, F_{0,k}}^{CT}(\bar{i}, \bar{o})\right) + \Xi(x, \bar{i}, \bar{o}) \qquad (1)$$

in which x: surface coordinates of the sample/object $\bar{i}, \bar{o}$: illumination and observation/viewing directions at the basecoat of the sample $\chi(\bar{i}, \bar{o})$: color table depending on illumination and observation direction a: Albedo or diffuse reflectivity $$f_{S_k, a_k, F_{0,k}}^{CT}(\bar{i}, \bar{o}):$$

the k-th Cook-Torrance lobe, corresponding to a Bi-directional Reflectance Distribution Function (BRDF) that describes the glossiness of a microfacet surface $S_k$: weight for the k-th Cook-Torrance lobe $a_k$: parameter for the Beckmann distribution of the k-th Cook-Torrance lobe $F_{0,k}$: Fresnel reflectivity for the k-th Cook-Torrance lobe $\Xi(x, \bar{i}, \bar{o})$: table of spatial texture images depending on illumination and observation direction into a term $$\chi(\bar{i}, \bar{o})\left(\frac{a}{\pi} + \sum_{k=1}^{3} f_{S_k, a_k, F_{0,k}}^{CT}(\bar{i}, \bar{o})\right)$$

(F1) and a term $\Xi(x, \bar{i}, \bar{o})$ (F2), further dividing the first term (F1) into a first sub-term corresponding to a color table depending on illumination and observation direction $\chi(\bar{i}, \bar{o})$ and a second sub-term corresponding to an intensity function $$\left(\frac{a}{\pi} + \sum_{k=1}^{3} f_{S_k, a_k, F_{0,k}}^{CT}(\bar{i}, \bar{o})\right)$$

and minimizing a color difference between the captured spectral reflectance data and the initial BTF by optimizing in a first optimization step the parameters of the first sub-term while the parameters of the second sub-term are kept constant, and by optimizing in a second optimization step the parameters of the second sub-term while the parameters of the first sub-term are kept constant;

(ii) providing a digital representation of illumination conditions by displaying a user interface comprising a plurality of illumination conditions on the display device;

detecting with the computer processor a user input being indicative of selecting an illumination condition from the plurality of displayed illumination conditions, and in response to the detected user input, retrieving with the computer processor via the communication interface the digital representation of illumination conditions associated with the detected user input;

(iii) optionally providing to the computer processor via the communication interface a model derived from historic illumination conditions and/or at least one model derived from historic environmental conditions;

(iv) generating with the computer processor color data of the colored coating layer based on the provided digital representation of the colored coating layer, the provided digital representation of the illumination condition and optionally the provided model(s); and (v) displaying on the display device the generated color data received from the computer processor.

4. The method according to any one of the preceding clauses, wherein the at least one colored coating layer is present on at least part of the surface of the object.

5. The method according to any one of the preceding clauses, wherein the at least one colored coating layer is a basecoat layer or a tinted clearcoat layer, in particular a basecoat layer.

6. The method according to any one of the preceding clauses, wherein the object is an automotive or a part thereof.

7. The method according to any one of the preceding clauses, wherein the display device is a mobile or a stationary display device, preferably a mobile display device.

8. The method according to any one of the preceding clauses, wherein the screen of the display device is a liquid crystal display (LCD) or an organic light emitting diode display (OLED), in particular an LCD or OLED display comprising a touchscreen panel.

9. The method according to any one of the preceding clauses, wherein the display device comprises an enclosure housing the computer processor used in steps (i) to (v) and the screen.

10. The method according to any one of clauses 1 to 8, wherein the display device and the computer processor performing steps (i) to (iv) or steps (ii) to (iv) or step (iv) are configured as separate components.

11. The method according to any one of the preceding clauses, wherein steps (iv) and (v) are performed simultaneously.

12. The method according to any one clauses 3 to 12, wherein measuring an initial BTF for the colored coating layer using a camera-based measurement device includes creating with the camera-based measurement device a plurality of images of the colored coating layer at different viewing angles, at different illumination angles, for different illumination colors and/or for different exposure times, thus providing a plurality of measurement data considering a plurality of combinations of illumination angle, viewing angle, illumination color and/or exposure time.

13. The method according to clause 12, wherein the images with different illumination color and different exposure time, but with equal illumination angle and viewing angle are combined to images with high dynamic range, respectively.

14. The method according to any one of clauses 3 to 13, wherein optimizing in a first optimization step the parameters of the first sub-term for each spectral measurement geometry includes the following:

computing first CIEL*a*b*values from the captured spectral reflectance data, computing second CIEL*a*b* values from the initial BTF of formula (1), computing correction vectors in a* and b* coordinates by subtracting the second CIEL a*b* values from the first CIEL a*b* values, component-wise interpolating and extrapolating the correction vectors for the complete range of viewing and illumination angles stored in the first sub-term, applying the interpolated correction vectors to the second CIEL*a*b* values for each spectral measurement geometry stored in the first sub-term to obtain corrected BTF CIEL*a*b* values, transforming the corrected BTF CIEL*a*b* values to linear sRGB coordinates and normalizing the linear sRGB coordinates and storing the normalized sRGB coordinates in the first sub-term.

15. The method according to clause 14, wherein a multilevel B-Spline interpolation algorithm is used for the component-wise interpolation and extrapolation of the correction vectors.

16. The method according to any one clauses 3 to 15, wherein optimizing in a second optimization step the parameters of the second sub-term includes the following:

defining a cost function based on the sum of the color differences across all spectral reflectance measurements geometries, computing first CIEL*a*b*values from the captured spectral reflectance data, computing second CIEL*a*b* values from the initial BTF of formula (1) at different spectral reflectance geometries, comparing the second CIEL*a*b* values to the first CIEL*a*b* values using a weighted color difference formula, and optimizing the parameters of the second sub-term using a non-linear optimization method such that the cost function is minimized.

17. The method according to clause 16, wherein the cost function comprises a penalty function for considering specific constraints to keep the parameter values of the intensity function in a valid range.

18. The method according to any one of clauses 3 to 17, wherein the first and the second optimization steps are run repeatedly/iteratively, in particular for a pre-defined number, to improve the accuracy of the optimized BTF.

19. The method according to any one of the preceding clauses, wherein providing the digital representation of the colored coating layer comprises displaying a pre-existing color library on a screen of the display device, selecting a color from the displayed pre-existing library, obtaining the digital representation of the colored coating layer based on the selected color and providing the obtained digital representation of the colored coating layer via the communication interface to the computer processor.

20. The method according to clause 19, wherein the pre-existing color library includes at least 2 different colors, each color corresponding to the color of a colored coating layer being prepared from a colored coating material and each color being defined by the optimized bi-directional texture function (BTF) or by color space data and/or gloss data and/or appearance data and/or texture characteristics.

21. The method according to clause 20, wherein displaying the pre-existing color library on the screen of the display device includes providing object data of a virtual object, optionally providing further color data, mapping the optimized BTFs or color space data and/or gloss data and/or appearance data and/or texture characteristics associated with the colors present in the pre-existing library and optionally the further color data to the provided virtual object data and rendering the mapping result using predefined illumination conditions.

22. The method according to clause 21, wherein the virtual object is selected from virtual 2D objects, such as geometric shapes, or virtual 3D objects, such as chips, dome shapes, automotive bodies or parts thereof.

23. The method according to clauses 21 or 22, wherein the predefined illumination conditions are selected from direct light sources or high dynamic range (HDR) environment maps, in particular from high dynamic range (HDR) environment maps.

24. The method according to any one of clauses 1 to 18, wherein providing the digital representation of the colored coating layer comprises providing coating layer identification data, obtaining the digital representation of the coating layer based on the provided coating layer identification data and providing the obtained digital representation.

25. The method according to clause 24, wherein providing coating layer identification data includes providing the optimized bi-directional texture function (BTF) of the colored coating layer and/or providing data being indicative of the colored coating layer.

26. The method according to any one of clauses 19 to 25, wherein the step of obtaining the digital representation of the colored coating layer is further defined as searching a database for said digital representation based on the selected color or provided coating layer identification.

27. The method according to any one of the preceding clauses, wherein step (i) further includes displaying the color associated with the provided digital representation of the colored coating layer on the screen of the display device.

28. The method according to any one of the preceding clauses, wherein the plurality of illumination conditions includes at least (i) ambient lightning surrounding the display device, and (ii) predefined high dynamic range (HDR) environment map(s), and (iii) ambient lighting associated with a specific time, date and location.

29. The method according to any one of the preceding clauses, wherein the user input is detected via an interaction element, in particular a physical interaction element, such as a mouse, a keyboard, a trackball, a touch screen or a combination thereof.

30. The method according to any one of the preceding clauses, wherein retrieving the digital representation of the illumination conditions comprises retrieving data being indicative of a date, a time, a position, in particular a geographic position, and optionally a degree of haze of the sky via the communication interface, and/or retrieving data acquired from at least one illumination sensor of the display device, data acquired from at least one orientation sensor of the display device and optionally data acquired from at least one vantage point sensor via the communication interface, and/or retrieving at least one high dynamic range (HDR) environment map via the communication interface.

31. The method according to clause 30, wherein retrieving data being indicative of a position, in particular a geographic position, via the communication interface includes displaying a world map on the display device, detecting via the interaction element a user input being indicative of selecting a position on the displayed world map and in response to the detected user input, retrieving data associated with said selected geographic position, in particular GPS data, via the communication interface.

32. The method according to clauses 30 or 31, wherein retrieving data being indicative of the date and/or time and/or degree of haze of the sky via the communication interface includes displaying at least one adjustment tool comprising at least one regulator corresponding to the date or time or haze, detecting via an interaction element a user input being indicative of manipulating the at least one adjustment, in particular by detecting via the interaction element a movement of at least one regulator of at least one adjustment tool, and in response to the detected user input, determining the date or time or haze associated with the position of the respective regulator.

33. The method according to any one of clauses 30 to 32, wherein data acquired from at least one illumination sensor of the display device includes data on the illumination conditions surrounding the display device, such as the Lux level, the spectral content, illumination directions, at least one photograph of the environment surrounding the display device, in particular at least one high dynamic range (HDR) or low dynamic range (LDR) photograph, or a combination thereof.

34. The method according to any one of clauses 30 to 33, wherein data acquired from at least one vantage point sensor of the display device includes at least one photograph showing the user viewing the display device.

35. The method according to any one of clauses 30 to 34, wherein retrieving at least one high dynamic range (HDR) environment map includes displaying at least one high dynamic range (HDR) environment map on the display device, detecting via an interaction element a user input being indicative of selecting a displayed high dynamic range (HDR) environment map, and in response to the detected user input, retrieving the high dynamic range (HDR) environment map associated with the detected user input via the communication interface.

36. The method according to any one of the preceding clauses, wherein step (ii) further includes displaying the provided illumination conditions on the screen of the display device.

37. The method according to any one of the preceding clauses, wherein the model derived from historic illumination conditions is a physically-based analytical model of the daytime sky.

38. The method according to any one of the preceding clauses, wherein the at least one model derived from historic environmental conditions provides a relationship between the data acquired from the illumination and/or orientation sensor and/or vantage point sensor of the display device and the ambient lighting conditions surrounding the display device.

39. The method according to clause 38, wherein data acquired by the illumination sensor(s) and/or the vantage point sensor(s) includes high dynamic range (HDR) photographs or low dynamic range (LDR) photographs.

40. The method according to any one of the preceding clauses, wherein the step of generating color data with the computer processor includes providing object data of a virtual object, optionally providing further color data of at least one further coating layer, mapping the provided digital representation of the colored coating layer and optionally further color data on the provided virtual object and rendering the mapping result using the provided digital representation of illumination conditions and optionally the provided model(s).

41. The method according to clause 40, wherein the virtual object is a 2D virtual object, such as a geometric shape, or a 3D virtual object, such as a chip, a dome shape, an automotive body or a part thereof.

42. The method according to any of the preceding clauses, wherein step (iv) further includes calculating with the computer processor an ambient illumination condition surrounding the display device from the provided digital representation of illumination conditions and the provided at least one model derived from historic environmental conditions prior to generating color data of the colored coating layer.

43. The method according to clause 42, wherein calculating with the computer processor an ambient illumination condition surrounding the display device includes calculating an ambient lighting by estimating the brightness and color of the data acquired by the illumination sensor(s) or calculating a high dynamic range (HDR) environment map from the data acquired by the illumination sensor(s) and the orientation sensor(s) or calculating spherical harmonics (SH) coefficients from the data acquired by the illumination sensor(s) and optionally from data acquired by the vantage point sensor(s) and optionally calculating a HDR environment map from the calculated SH coefficients.

44. The method according to any one of the preceding clauses, wherein the generated color data is recalculated and displayed on the screen of the display device in response to a change in data contained in the digital representation of illumination conditions provided in step (iii), in particular in response to a change in the provided data from at least one illumination sensor and/or to a change in the provided data from at least one orientation sensor and/or to a change in the provided data from at least one vantage point sensor.

45. The method according to any one of the preceding clauses, wherein the step of displaying the color data received from the computer processor on the screen of the display device includes mapping the generated color data, in particular each rendered point, to the screen of the display device.

46. The method according to any one of clauses 27 to 45, wherein the step of displaying the color data received from the processor on the display device includes automatically updating the color displayed on the screen of the display device in step (i) in response to performing step (v).

47. The method according to clause 46, wherein the step of automatically updating the color displayed on the display device comprises mapping the generated color data, in particular each rendered point, generated in step (iv) to the display device to update the color displayed in step (i) with the generated color data.

48. The method according to any one of the preceding clauses, wherein step (v) further comprises storing the generated color data and/or further data, such as ambient lighting conditions calculated from the provided digital representation of illumination conditions and at least one provided model, on a computer readable medium.

49. The method according to any one of the preceding clauses, wherein step (v) further comprises adding the displayed color to a pre-existing color library or to a newly generated color library to generate a modified color library.

50. The method according to clause 49, wherein the modified color library is associated with a stored user profile for future use of the modified color library in designing the color of a colored coating layer.

51. The method according to clause 49 or 50, further comprising removing at least one added color from the modified color library.

52. The method according to any one of clauses 49 to 51, further comprising sorting the colors being present in the pre-existing or modified color library according to a grouping criterion to create a sorted color library and optionally associating the sorted color library with a stored user profile for future provision of the sorted color library.

53. The method according to any one of the preceding clauses, wherein the step of displaying on the screen of the display device the generated color data includes automatically updating the color displayed on the screen of the display device in step (v) in response to repeating steps (ii) to (v) or in response to repeating steps (iii) to (v) or in response to repeating steps (ii) and (v).

54. The method according to any one of the preceding clauses further comprising repeating steps (i) to (v) or steps (ii) to (v) or steps (i), (iv) and (v).

55. The method according to any one of the preceding clauses, further comprising the steps of
(vi) modifying the provided digital representation of the colored coating layer to generate a modified digital representation of the colored coating layer;
(vii) optionally repeating step (vi);
(viii) generating color data of the coating layer(s) based on the modified digital representation(s) of the colored coating layer(s);
(ix) displaying on the screen of the display device the generated color data received from the processor;
(x) optionally repeating steps (vi) to (ix)
(xi) optionally determining with the computer processor if the modified digital representation of the colored coating layer is within at least one predefined tolerance;
(xii) optionally in accordance with the determination that the modified digital representation is within at least one predefined tolerance: repeating steps (ii) to (v) using the modified digital representation of the colored coating layer;
(xiii) optionally in accordance with the determination that the modified digital representation is within at least one predefined tolerance: providing via the communication interface the modified digital representation to a coating material manufacturing site and optionally manufacturing the coating material based on the provided modified digital representation;
(xiv) optionally in accordance with the determination that the modified digital representation is outside at least one predefined tolerance: displaying at least one recommendation on the screen of the display device; and
(xv) optionally in accordance with the determination that the modified digital representation is outside at least one predefined tolerance: repeating steps (vi) to (ix) or steps (vi) to (x) or steps (vi) to (xiv).

56. The method according to any one of the preceding clauses, further comprising the step of providing to a computer processor via the communication interface an order instruction for an item, wherein the order instruction includes data on the color displayed in step (v) or data on the color associated with the modified digital representation of the colored coating layer fulfilling at least one predefined tolerance.

57. A system for predicting the appearance of an object being coated with at least one colored coating layer, said system comprising:
optionally a communication interface for providing a model derived from historic illumination conditions and/or at least one model derived from historic environmental conditions to a computer processor;
at least one communication interface for providing a digital representation of a colored coating layer and a digital representation of illumination conditions to the computer processor;
a display device comprising a screen;
an interaction element for detecting a user input;
optionally a least one illumination sensor and/or at least one orientation sensor adapted to sense the orientation of the display device and/or at least one vantage point sensor adapted to sense the vantage point of a user holding the display device;
a processor in communication with the communication interfaces, the display device and optionally the at least one illumination and/or orientation and/or vantage point sensor, the processor programmed to:
receive via the communication interface the digital representation of the colored coating layer;
generate a user interface presentation comprising a plurality of illumination conditions, detect a user input being indicative of selecting an illumination condition from the plurality of displayed illumination conditions and retrieve the digital representation of illumination conditions associated with the detected user input in response to the detected user input;

optionally calculate an ambient illumination condition surrounding the display device from the retrieved digital representation of the illumination conditions and the received model(s); and generate color data of the colored coating layer based on the received digital representation of the colored coating layer and the received digital representation of the illumination condition or the calculated ambient illumination condition surrounding the display device, wherein the display device receives the generated user interface presentation and the generated color data of the colored coating layer from the processor and displays the generated user interface presentation and color data and wherein the digital representation of the colored coating layer comprises an optimized bi-directional texture function (BTF) which is obtained by the following steps:

determining an initial BTF for the colored coating layer using a camera-based measurement device, capturing spectral reflectance data for the colored coating layer for a pre-given number, i.e. a limited number, of different measurement geometries using a spectrophotometer, and adapting the initial BTF to the captured spectral reflectance data to obtain an optimized BTF by segmenting the initial BTF of formula (1)

$$f(x, \bar{i}, \bar{o}) = \chi(\bar{i}, \bar{o})\left(\frac{a}{\pi} + \sum_{k=1}^{3} f_{S_k, a_k, F_{0,k}}^{CT}(\bar{i}, \bar{o})\right) + \Xi(x, \bar{i}, \bar{o}) \qquad (1)$$

in which x: surface coordinates of the sample/object $\bar{i}, \bar{o}$: illumination and observation/viewing directions at the basecoat of the sample $\chi(\bar{i}, \bar{o})$: color table depending on illumination and observation direction a: Albedo or diffuse reflectivity $$f_{S_k, a_k, F_{0,k}}^{CT}(\bar{i}, \bar{o}):$$

the k-th Cook-Torrance lobe, corresponding to a Bi-directional Reflectance Distribution Function (BRDF) that describes the glossiness of a microfacet surface $S_k$: weight for the k-th Cook-Torrance lobe $a_k$: parameter for the Beckmann distribution of the k-th Cook-Torrance lobe $F_{0,k}$: Fresnel reflectivity for the k-th Cook-Torrance lobe $\Xi(x, \bar{i}, \bar{o})$: table of spatial texture images depending on illumination and observation direction into a term $$\chi(\bar{i}, \bar{o})\left(\frac{a}{\pi} + \sum_{k=1}^{3} f_{S_k, a_k, F_{0,k}}^{CT}(\bar{i}, \bar{o})\right)$$

(F1) and a term $\Xi(x, \bar{i}, \bar{o})$ (F2), further dividing the first term (F1) into a first sub-term corresponding to a color table depending on illumination and observation direction $\chi(\bar{i}, \bar{o})$ and a second sub-term corresponding to an intensity function $$\left(\frac{a}{\pi} + \sum_{k=1}^{3} f_{S_k, a_k, F_{0,k}}^{CT}(\bar{i}, \bar{o})\right)$$

and minimizing a color difference between the captured spectral reflectance data and the initial BTF by optimizing in a first optimization step the parameters of the first sub-term while the parameters of the second sub-term are kept constant, and by optimizing in a second optimization step the parameters of the second sub-term while the parameters of the first sub-term are kept constant.

58. A system for predicting the appearance of an object being coated with at least one colored coating layer, said system comprising:

optionally a communication interface for providing a model derived from historic illumination conditions and/or at least one model derived from historic environmental conditions to a computer processor;

at least one communication interface for providing a digital representation of a colored coating layer and a digital representation of illumination conditions to the computer processors;

a display device comprising a screen;

an interaction element for detecting a user input;

optionally a least one illumination sensor and/or at least one orientation sensor adapted to sense the orientation of the display device and/or at least one vantage point sensor adapted to sense the vantage point of a user holding the display device;

a first processor in communication with the communication interfaces, the display device and optionally the at least one illumination and/or orientation and/or vantage point sensor, the processor programmed to:

generate a user interface presentation comprising a plurality of illumination conditions, detect a user input being indicative of selecting an illumination condition from the plurality of displayed illumination conditions and retrieve the digital representation of illumination conditions associated with the detected user input in response to the detected user input;

optionally calculate an ambient illumination condition surrounding the display device from the retrieved digital representation of the illumination conditions and the received model(s); and a second processor in communication with the communication interfaces and the first processor, the second processor programmed to:

receive via the communication interface the digital representation of the colored coating layer and the digital representation of illumination conditions, or the ambient illumination conditions calculated with the first processor;

generate color data of the colored coating layer based on the received digital representation of the colored coating layer and the received digital representation of illumination conditions or the calculated ambient illumination conditions received from the first processor, wherein the display device receives the generated user interface presentation from the first processor and the generated color data from the second processor and displays the received user interface presentation and color data and wherein the digital representation of the colored coating layer comprises an optimized bi-directional texture function (BTF) which is obtained by the following steps:

determining an initial BTF for the colored coating layer using a camera-based measurement device, capturing spectral reflectance data for the colored coating layer for a pre-given number, i.e. a limited number, of different measurement geometries using a spectrophotometer, and adapting the initial BTF to the captured spectral reflectance data to obtain an optimized BTF by segmenting the initial BTF of formula (1)

$$f(x, \bar{i}, \bar{o}) = \chi(\bar{i}, \bar{o})\left(\frac{a}{\pi} + \sum_{k=1}^{3} f_{S_k, a_k, F_{0,k}}^{CT}(\bar{i}, \bar{o})\right) + \Xi(x, \bar{i}, \bar{o}) \qquad (1)$$

in which x: surface coordinates of the sample/object $\bar{i}, \bar{o}$: illumination and observation/viewing directions at the basecoat of the sample $\chi(\bar{i}, \bar{o})$: color table depending on illumination and observation direction a: Albedo or diffuse reflectivity $$f_{S_k, a_k, F_{0,k}}^{CT}(\bar{i}, \bar{o}):$$

the k-th Cook-Torrance lobe, corresponding to a Bi-directional Reflectance Distribution Function (BRDF) that describes the glossiness of a microfacet surface $S_k$: weight for the k-th Cook-Torrance lobe $a_k$: parameter for the Beckmann distribution of the k-th Cook-Torrance lobe $F_{0,k}$: Fresnel reflectivity for the k-th Cook-Torrance lobe $\Xi(x, \bar{i}, \bar{o})$: table of spatial texture images depending on illumination and observation direction into a term $$\chi(\bar{i}, \bar{o})\left(\frac{a}{\pi} + \sum_{k=1}^{3} f_{S_k, a_k, F_{0,k}}^{CT}(\bar{i}, \bar{o})\right)$$

(F1) and a term $\Xi(x, \bar{i}, \bar{o})$ (F2), further dividing the first term (F1) into a first sub-term corresponding to a color table depending on illumination and observation direction $\chi(\bar{i}, \bar{o})$ and a second sub-term corresponding to an intensity function $$\left(\frac{a}{\pi} + \sum_{k=1}^{3} f_{S_k, a_k, F_{0,k}}^{CT}(\bar{i}, \bar{o})\right)$$

and minimizing a color difference between the captured spectral reflectance data and the initial BTF by optimizing in a first optimization step the parameters of the first sub-term while the parameters of the second sub-term are kept constant, and by optimizing in a second optimization step the parameters of the second sub-term while the parameters of the first sub-term are kept constant.

59. A system for predicting the appearance of an object being coated with at least one colored coating layer, said system comprising: a display; one or more computing nodes; and one or more computer-readable media having thereon computer-executable instructions that are structured such that, when executed by the one or more computing nodes, cause the system to perform the method of any one of clauses 1 to 56.

60. A non-transitory computer-readable storage medium, the computer-readable storage medium including instructions that when executed by a computer, cause the computer to perform the steps according to the method of any one of clauses 1 to 56.

61. Use of the method of any one of clauses 1 to 56 or the system according to any one of clauses 57 to 59 for predicting the appearance of an object being coated with at least one colored coating layer.

62. An object being coated with at least one colored coating layer, wherein the color of at least one coating layer was predicted according to the method of any one of clauses 1 to 56.

BRIEF DESCRIPTION OF THE DRAWINGS

These and other features of the present invention are more fully set forth in the following description of exemplary embodiments of the invention. To easily identify the discussion of any particular element or act, the most significant digit or digits in a reference number refer to the figure number in which that element is first introduced. The description is presented with reference to the accompanying drawings in which.

DETAILED DESCRIPTION

The detailed description set forth below is intended as a description of various aspects of the subject-matter and is not intended to represent the only configurations in which the subject-matter may be practiced. The appended drawings are incorporated herein and constitute a part of the detailed description. The detailed description includes specific details for the purpose of providing a thorough understanding of the subject-matter. However, it will be apparent to those skilled in the art that the subject-matter may be practiced without these specific details.

Figure 1A:
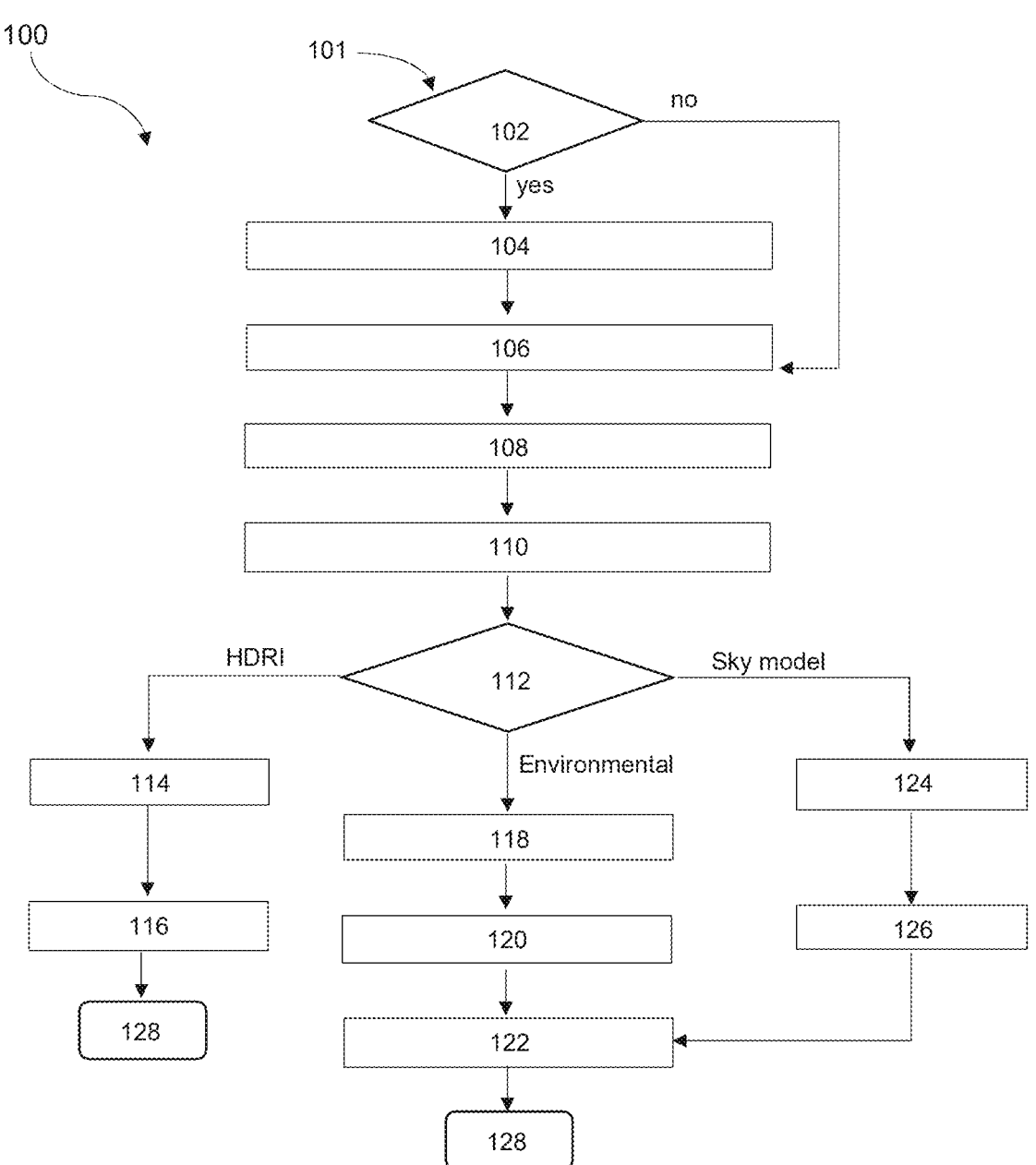
FIG. 1a is a block diagram of a method for predicting the appearance of an object being coated with at least one colored coating layer in accordance with a first embodiment of the invention

FIG. 1a depicts a non-limiting first embodiment of a method 100 for predicting the appearance of an object being coated with at least one colored coating layer and displaying the predicted appearance on the screen of a display device according to the invention. In this example, the colored coating layer is a basecoat layer and the object is an automotive or a part thereof, such as a trim part, a bumper, etc. In this example, the display device is a portable display device having an LCD screen comprising a touch screen, such as a tablet or a smartphone. In another example, the display device is a stationary device, such as a stationary computer, television screen connected via a communication interface with a computer or a projection display device. In this example, the display device has an enclosure housing the screen as well as the processor. In another example, the processor is present separately from the display device, for example on an external device being coupled to the display device via a wired or wireless communication interface.

In block 102, routine 101 determines whether a pre-existing color library is to be displayed on the screen of the display device. The determination may be made, for example, based on user data, such as the user profile. This allows to display different pre-existing color libraries depending on the user such that each pre-existing color library can be customized to increase user comfort. If routine 101 determines in block 102 that a pre-existing color library is to be displayed, it proceeds to block 104, otherwise it proceeds to block 106 described later on.

In block 104, routine 101 displays the respective pre-existing color library on the screen of the display device. The pre-existing library of this example contains 195 different colors, each color corresponding to the color of a colored coating layer being prepared from a colored coating material and each color being defined by the optimized BTF as previously described. In this example, the pre-existing color library is displayed on the screen of the display device by providing pre-defined object data of a virtual object and rendering the color data present in the pre-existing color library and the provided object data using predefined illumination conditions (image-based lighting) (see for example FIG. 3). The pre-defined object data of the virtual object is provided from a database via a communication interface to the processor. In this example, the virtual object is a 3D virtual object having a dome shape. In another example, the virtual object is a 2D virtual object, such as a colored area. In this example, the user can scroll through the displayed pre-existing color library to view all colors being displayed via an interaction element. The interaction element may be a touch screen gesture, a mouse click, a short cut or a combination thereof.

In block 106, routine 101 detects a user input (for example a selection of a color from the displayed pre-existing library by the user) and retrieves the digital representation of the colored coating layer based on the detected user input (for example the selected color) from a database and provides the retrieved digital representation via the communication interface to the computer processor. The digital representation of a colored coating layer comprises the optimized bi-directional function (BTF) obtained by the steps described previously and may include further data, such as the formulation of the coating material used to prepare the colored coating layer, color name, color identification number, etc. The user input may, for example, be performed via an interaction element, such as a touchscreen gesture, mouse click, short cut, etc.

In block 108, routine 101 displays a plurality of illumination conditions on the screen of the display device, for example within a GUI. For this purpose, routine 101 may generate a user interface presentation comprising said plurality of illumination conditions and said user interface presentation is then displayed on the screen of the display device. In this example, the available illumination conditions include use of ambient lighting surrounding the display device (environmental), use of existing HDR environment maps (HDRI) and use of ambient lighting associated with a specific time, date and location (sky model). The plurality of illumination conditions may be displayed within the user interface using icons, images, text or a combination thereof and may be selected by selecting the respective icon, image, text or combination thereof via the interaction element. In one example, the selected illumination condition is displayed to the user and the GUI may provide the possibility to return to the selection of different illumination conditions to allow correction of user input.

In block 110, routine 101 detects a user input being indicative of selecting an illumination condition from the plurality of displayed illumination conditions and proceeds to block 112.

In block 112, routine 101 determines the illumination condition selected by the user via the interaction element based on the user input detected in block 110. Depending on the user selection, routine 101 proceeds to block 114 (in case the determined user selection corresponds to the use of HDR environment maps) or to block 116 (in case the determined user selection corresponds to the use of ambient lighting surrounding the display device) or to block 124 (in case the determined user selection corresponds the use of ambient lighting associated with a specific time, date and location).

In block 114, routine 101 displays the available HDR environment maps on the screen of the display device, for example within a GUI. In this example, the available HDR environment maps are displayed on the GUI by retrieving images associated with the available environment maps from a data storage medium, such as a database or the internal memory of the display device, and displaying the retrieved images (as, for example, illustrated in FIG. 6 described later on). The selection of a displayed HDR image via the interaction element by the user is detected by routine 101 and is used to retrieve the respective HDR environment map as described in block 116 hereinafter. In one example, the user may further select the orientation of the selected HDR environment map as well as the viewing direction which is used to generate the color data in block 134. For this purpose, routine 101 may display a GUI comprising the selected HDR environment map and the user may change the orientation by rotating the map. The viewing direction may be selected by displaying a list of available directions or by displaying a graphic containing an object and a person and the user may select the viewing direction by choosing the appropriate entry from the list or by moving the person with respect to the displayed object. The user selections are detected by routine 101 and are converted with the computer processor to the selected orientation of the HDR environment map and/or the selected viewing direction. In another example, a predefined orientation of the HDR environment map and a predefined viewing direction are used to generate the color data in block 134 and the user is able to change the orientation of the HDR environment map and/or the viewing direction as described later on.

In block 116, routine 101 retrieves the HDR environment map associated with the user selection detected in block 114 from a data storage medium, such as a database, and provides the retrieved HDR environment map to the processor. The retrieved HDR environment map corresponds to the digital representation of illumination conditions described previously.

In block 118, routine 101 initiates the acquisition of data by the illumination and/or orientation and/or vantage point sensor(s) of the display device and stores the acquired data on a data storage medium, such as the internal memory of the display device. The data acquisition may be performed for a predefined duration or may be performed until the user ends method 100 or selects a different illumination condition as described later on. The data may be stored with further meta data, such as acquisition time, sensor name, etc. The acquired data may be deleted upon end of the method to reduce the amount of data storage necessary for storing the acquired sensor data if method 100 is repeated several times. The data acquired by the illumination and/or orientation and/or vantage point sensor(s) of the display device corresponds to the digital representation of illumination conditions described previously.

In block 120, routine 101 retrieves a model derived from historic environmental conditions via the communication interface from a data storage medium, such as a database or the internal memory of the display device, and provides the retrieved model to the computer processor. Suitable models being derived from historic environmental conditions include the HDRI model, ambient lighting model and the spherical harmonics coefficient model previously described as well as a data driven model estimating HDR environment maps from SH coefficients as described previously.

In block 122, ambient illumination conditions based on the model retrieved in block 120 or block 126 described later on and the sensor data acquired in block 118 or the user input detected in block 124 described later on are calculated. In one example, calculating the ambient illumination condition may include calculating ambient lighting conditions from the color and brightness estimated from the data acquired by the illumination sensor(s), such as at least one photograph of the environment surrounding the display device as previously described. In another example, calculating ambient illumination conditions may include calculating a HDR environment map and/or spherical harmonics (SH) coefficients from the acquired sensor data as previously described. The calculated ambient illumination conditions may be displayed, for example in the form of a calculated HDR environment map, on the screen of the display device (see for example FIG. 4, reference sign 416) In block 124, routine 101 detects user input of a date, a time, a location and optionally a degree of haze. In this example, a GUI comprising at least one adjustment tool which allows the user to enter at least one of a date, a time, a location and optionally a degree of haze of the sky is displayed on the screen of the display device, such as, for example, illustrated in FIG. 4. The user may use the displayed adjustment tools and further icons, such as interactive calendars, maps, etc., to enter the date, time, location and optionally degree of haze via an interaction element. The displayed adjustment tools or icons may contain pre-defined data, such as the current time, the current date, the location of the display device and a pre-defined degree of haze. The regulators of the adjustment tools can be manipulated by the user via the interaction element. Routine 101 may determine the time, date and optionally haze from the position of the regulators of the adjustment tools. The location of the display device may be determined using the GPS module of the display device. The inputted or pre-defined data on the time, date, location and optionally degree of haze corresponds to the digital representation of illumination conditions described previously.

In block 126, routine 101 retrieves a model derived from historic illumination conditions via the communication interface from a data storage medium, such as a database or the internal memory of the display device, and provides the retrieved model to the computer processor. A suitable model derived from historic illumination conditions is the physically-based analytical model of the daytime sky described in in I. Hosek et. al, "An analytic model for full spectral sky-dome radiance", ACM Transactions on Graphics, 2012, Vol. 31, Article No.: 95, https://doi.org/10.1145/2185520.2185591. After block 126, routine 101 proceeds to block 122 as previously described.

After block 116 or 122, routine 101 proceeds to block 128. In block 128, routine 101 determines whether pre-defined virtual object data is to be used for the generation of color data described in relation to block 134 later on. In case pre-defined virtual object data is to be used, routine 101 proceeds to block 130, otherwise routine 101 proceeds to block 132.

In block 130, routine 101 retrieves the pre-defined virtual object data. In this example, this includes displaying icons, images, text or a combination thereof being indicative of available virtual objects on the GUI on the screen of the display device, detecting a user input indicating a selection of a displayed virtual object, retrieving the virtual object data based on the detected user input from a data storage medium, such as a database or the internal memory of the display device, and providing the retrieved virtual object data to the computer processor. The available virtual objects may include 2D objects, such as colored areas, or 3D objects, such as dome shape reliefs or different types of generic automotive (i.e. shapes of automotive being representative of different automotive types, such as SUVs, sports cars etcs.)

In block 132, routine 101 detects virtual object data provided by the user, for example by providing a file containing virtual object data or by selecting a respective file stored on the internal memory of the display device. This may include providing a GUI on the screen of the display device where available options to provide virtual object data are displayed to the user. Use of user defined virtual object data allows to customize the virtual object data to the user specific needs and therefore increases user comfort.

In one example (not shown), method 100 may further include block 133. In block 133, routine 101 determines whether at least one further colored coating layer is to be used for generating color data in block 134. If this is the case, routine 101 provides color data of at least one further colored coating layer to the processor. Otherwise, routine 101 proceeds to block 134 described hereinafter. In one example, the color data of at least one further coating layer is provided by displaying a pre-existing color library, detecting the selection of a displayed color by the user, retrieving the color data associated with the selected color from a data storage medium, such as a database or the internal memory of the display device, and providing the retrieved color data to the computer processor. In another example, the user may enter information on the type of the further colored coating layer(s) (such as further basecoat, tinted clearcoat, etc.) and/or color information (such as color name, color code, etc.) and routine 101 retrieves color data based on the entered information and provides the retrieved color data to the computer processor. Use of color data of at least one further colored coating layer allows to generate color data for a multilayer coating comprising more than one colored coating layer and thus allows to adapt the method 100 to the respective layer structure of the coating for which the appearance is to be predicted.

In block 134, color data of the coating layer is generated with the computer processor based on the digital representation of the colored coating layer provided in block 106, the virtual object data provided in block 130 or 132 and the HDR environment map provided in block 116 or the ambient illumination conditions calculated in block 122.

If the color data is generated using a HDR environment map provided in block 116, the orientation of the HDR environment map and/or the viewing angle selected in block 114 or a predefined orientation of the HDR environment map and/or a predefined viewing direction is used for the rendering process. If a predefined orientation of the HDR environment map is used, the orientation can be adapted by the user by turning the HDR environment map displayed in block 138/140 as described later on. The color data is generated by mapping the provided digital representation of the colored coating layer on the provided virtual object and rendering the mapping result using the provided HDR environment map or the provided ambient illumination conditions. Rendering using the provided HDR environment maps or the provided ambient illumination conditions is performed as previously described, for example using image-based lighting (IBL).

In block 136, routine 101 determines if any color data associated with the provided digital representation of the colored coating layer is already displayed on the screen of the display device. For example, the color data associated with the provided digital representation of the colored coating layer may be displayed in block 104 or block 124. If the color data associated with the provided digital representation of the colored coating layer is already displayed on the screen of the display device, routine 101 proceeds to block 140, otherwise routine 101 proceeds to block 138.

In block 138, routine 101 displays the color data generated in block 134 on the screen of the display device by mapping the generated color data, i.e. each rendered point, to the screen of the display device causing the screen of the display device to show the rendered object placed in front of a predefined or selected background. In this example, the rendered object is placed in front of a predefined background having a uniform color. In another example, the rendered object is placed in front of a user defined background. The user-defined background may be provided by detecting the selection of background from a list of pre-defined background or by using a background provided by the user, such as a photograph. Use of a user-defined background allows to customize the vicinity of the virtual object such that the user gets an impression of the appearance of the object within a specific surrounding. This may improve the judgment of whether the displayed appearance satisfies the user's requirements because the virtual object can be placed in the real environment. The color data may be displayed within a GUI comprising further icons, images, text or a combination thereof to allow the user to perform further actions, such as changing the viewing direction in the HDR environment map (see for example FIG. 7b), storing the generated color data, adding comments to the generated color data or performing further blocks described later on. Besides the color data, further data, such as the ambient illumination conditions calculated in block 122, the adjustment tools displayed in block 124 or information on the color selected in block 106 may be displayed on the screen of the display device.

In block 140, routine 101 automatically updates the displayed color on the screen of the display device with the color data generated in block 134 by mapping the generated color data, i.e. each rendered point, to the screen of the display device such that the previously displayed color is replaced by the generated color data. Updating may include showing further icons, images, text or a combination thereof or further data as described in relation to block 138 on the GUI of the display device.

In block 142, routine 101 determines whether the sensor data acquired after block 138 or block 140 has changed with respect to the sensor data acquired in block 118 or whether the user has changed input data, such as data inputted in block 124, or pre-defined data, such as the viewing angle of the HDR environment map selected in block 114. If routine 101 determines that the sensor data or the user input or the pre-defined data has not changed, routine proceeds to block 144 described below. If routine 101 determines that the sensor data or the user input or the pre-defined data has changed, routine 101 either proceeds to block 122 (in case the sensor data or the user input has changed) or to block 134 (in case the pre-defined data has been changed by the user).

Determining a change in the sensor data may include comparing the data acquired in block 118 with the data acquired after performing block 122 and determining if the difference is above a pre-defined threshold. If data acquisition has ended prior to performing block 122, routine 101 may initiate sensor data acquisition as described in relation to block 122 in block 142 and compare the data acquired in block 118 with the data acquired in block 142 as previously described. If routine 101 determines that the difference in the acquired sensor data is above a pre-defined threshold, routine 101 proceeds to block 122 and the processor calculates ambient illumination conditions using sensor data acquired after block 122 or acquired in block 142 as described in relation to block 122 above. If routine 101 determines that the difference in the acquired sensor data is below a pre-defined threshold (i.e. no significant change has occurred), routine 101 proceeds to block 144.

Determining a change in user input may include comparing the data inputted in block 124 with respective data inputted in block 138, for example by moving regulators of adjustment tools or interactive icons displayed on the GUI in block 138.

Determining a change in pre-defined data may include comparing the pre-defined viewing angle of the HDR environment map with the viewing angle of the HDR environment map displayed in block 138. In case the user changes the viewing angle in block 138, routine 101 proceeds to block 134 and generates color data using the HDR environment map provided in block 116 and the viewing angle defined in block 138.

Recalculating and displaying the color data on the screen of the display device in response to a change in acquired sensor data, user input or pre-defined data as previously described allows to automatically update the generated color data using the current sensor data, user input or pre-defined data. In one example, the recalculation and displaying of the regenerated color data is performed automatically upon detection of previously described changes in the acquired, inputted or predefined data, i.e. without any user interaction. This allows the user to gain an understanding of the influence of different parameters, such as the orientation of the display device, the location, the time, the data, the degree of haze or the viewing angle, on the displayed appearance. Recalculation and displaying of the recalculated color data is performed in real time or near real time, thus rendering it possible that the user gets the impression that the appearance of the colored object displayed on the screen behaves like a real sample if the user tilts and rotates the display device, changes the vantage point or the time/date/position/haze.

In block 144, routine 101 determines whether the illumination condition determined in block 112 is to be changed or whether method 100 is to be ended. In one example, this includes displaying a respective menu on the screen of the display device prompting the user to select the desired option. In another example, routine 101 detects a user input indicating that the user wants to return to block 110, for example by detecting a selection of a respective user icon being indicative of available illumination conditions. If routine 101 determines in block 144 that the user wants to change the illumination conditions, routine 101 proceeds to block 110. Otherwise, routine 101 proceeds to block 146 or ends the method depending on the user selection. Returning to block 110 allows the user to study the influence of different illumination conditions on the selected color and allows to judge whether the selected color has the required appearance under all illumination conditions being relevant for the colored object.

In block 146, routine 101 determines whether the color selected in block 104 is to be changed. In one example, this includes displaying a respective menu on the screen of the display device prompting the user to select the desired option. In another example, routine 101 detects a user input indicating that the user wants to return to block 102, for example by detecting a selection of a respective user icon being indicative of selecting a color. If routine 101 determines in block 146 that the user wants to change the color, routine 101 proceeds to block 102. Otherwise, routine 101 ends the method. Returning to block 102 allows the user to select a new color in case the appearance of the color selected in block 104 does not result in the desired appearance.

Figure 1A:
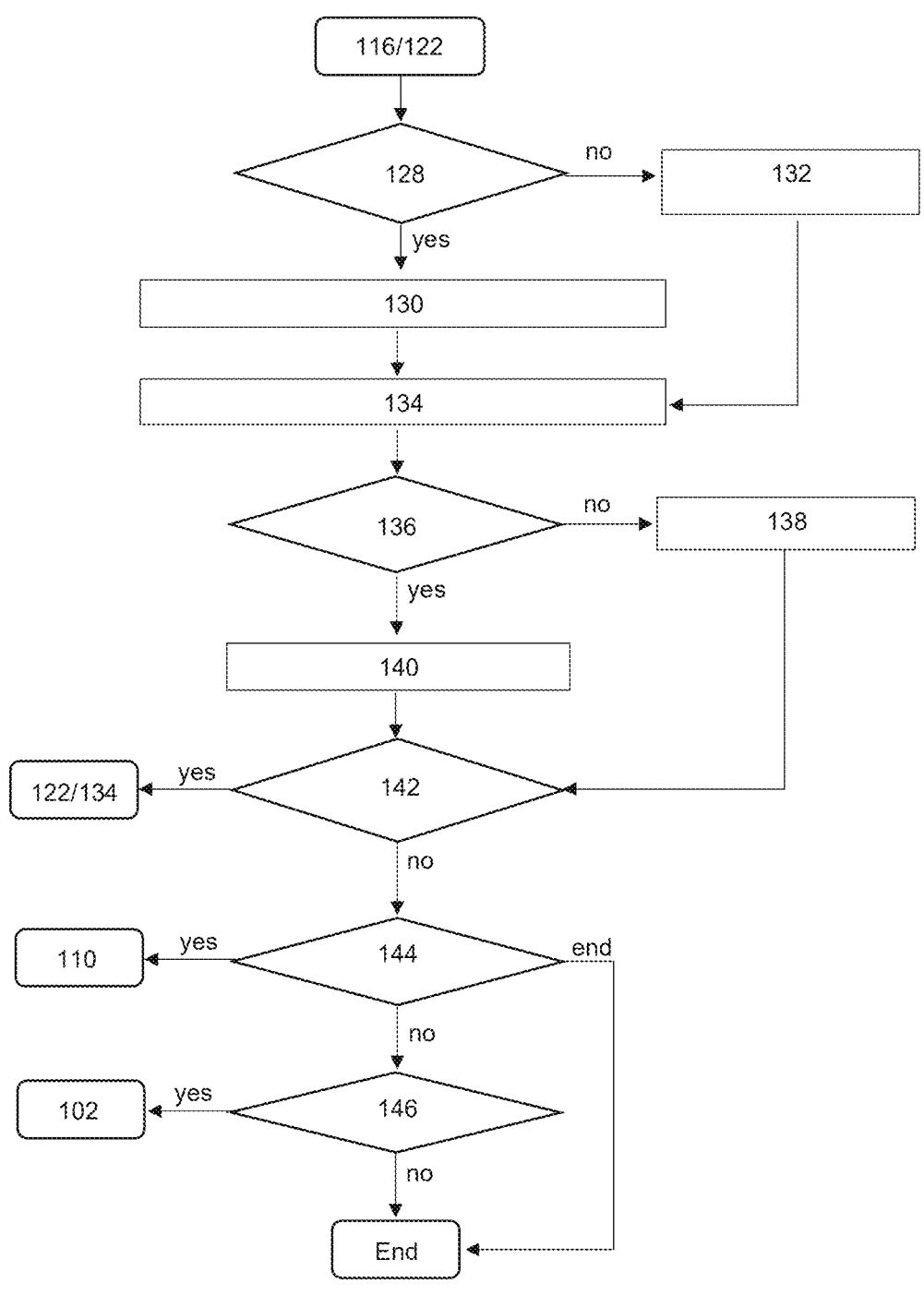
Figure 1B:
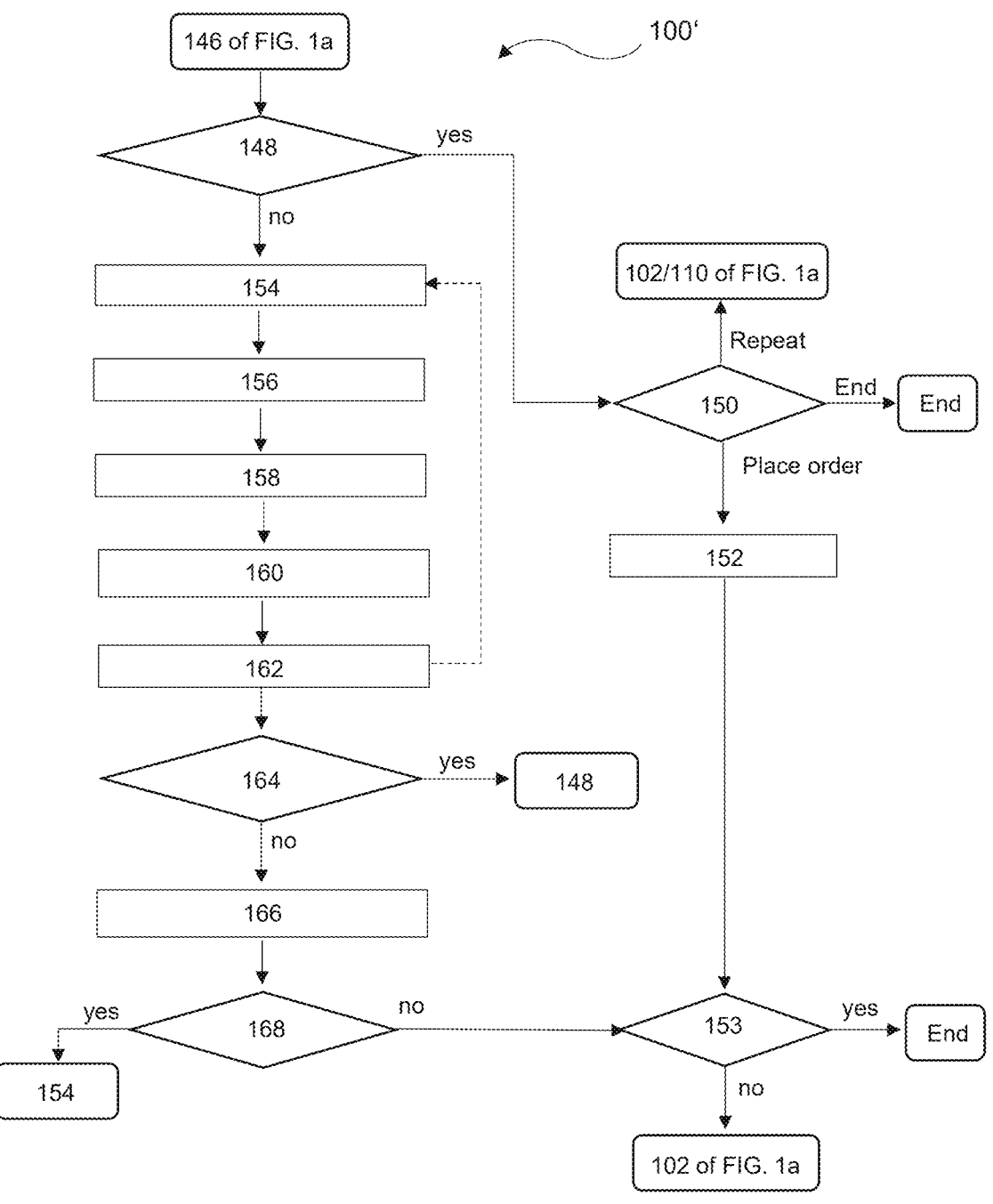
FIG. 1b is a block diagram of a method for predicting the appearance of an object being coated with at least one colored coating layer in accordance with a second embodiment of the invention

FIG. 1*b* depicts a non-limiting second embodiment of a method 100' for predicting the appearance of an object being coated with at least one colored coating layer and displaying the predicted appearance on the screen of a display device according to the invention. In this example, the colored coating layer is a basecoat layer and the object is an automotive or a part thereof, such as a trim part, a bumper, etc. In this example, the display device is a portable display device having an LCD screen comprising a touch screen, such as a tablet or a smartphone. In another example, the display device is a stationary device, such as a stationary computer, television screen connected via a communication interface with a computer or a projection display device. In this example, the display device has an enclosure housing the screen as well as the processor. In another example, the processor is present separately from the display device, for example on an external device being coupled to the display device via a wired or wireless communication interface.

Method 100' of FIG. 1*b* comprises blocks 102 to 146 previously described in relation to FIG. 1*a*. Additionally, method 100' includes blocks 148 to 168 as described in the following. In one example, method 100' is performed if the user determines that the predicted appearance of the colored object displayed on the screen of the display device in block 138 or block 140 does not match the appearance desired by the user. The user may then perform method 100' to modify the color displayed on the screen of the display device in block 138 or block 140. In another example, method 100' is performed if the user wants to place an order instruction for an item being colored with the color selected in block 104.

In block 148, routine 101' determines whether the visual appearance of the color data displayed in block 138 or 140 is acceptable or not. This may include displaying a respective menu on the GUI and prompting the user to make the appropriate selection. If routine 101' determines in block 148 that the visual appearance is acceptable, it proceeds to block 150, otherwise it proceeds to block 154 described below.

In block 150, routine 101' determines what the further actions are desired by the user. This may include displaying a respective dialog on the GUI and prompting the user to make the appropriate selection. If routine 101' determines that the user wants to repeat blocks 102 or 110 previously described (i.e. to change the illumination conditions or the color), routine 101' proceeds to block 102 or 110, respectively. If routine 101' determines that the user wants the end the method, routine 101' ends method 100'. If routine 101' determines that the user wants to place an order instruction, routine 101' proceeds to block 152 described hereinafter. Proceeding to block 110 using the modified digital representation of the colored coating layer allows the user to check whether the modified color results in the desired appearance under the available illumination conditions and thus increases user comfort during the virtual color design process. In this block, the user may also have the option to save the generated color data on a data storage medium, such as a database or the internal memory of the display device, optionally in combination with further data, such as comments, labels, etc. This allows to retrieve the stored color data if needed and thus reduces the amount of time necessary to calculate the respective color data.

In block 152, routine 101' generates an order instruction for an item and provides the generated order instruction to a further computing device via the communication interface. In one example, the further computing device is located at a seller, for example at a car dealership, or at a company manufacturing the colored item, such as a car manufacturer, or at a coating material manufacturing site. The provided order instruction includes data on the color displayed in block 138 or 140, such as a color code, a color name, the formulation of the coating material used to prepare the colored coating layer, the (modified) formulation of the coating material and combinations thereof. The order instruction may include further data, such as further configurations of the item performed by the user, user information, payment details, etc. Sending an order instruction for the object having the desired color within the inventive method 100' allows the user to directly provide all necessary details with respect to the desired color to the seller or manufacturer, thus avoiding unnecessary data transfers and reducing the risk of data loss or incorrect transfer of data. After sending an order instruction, the colored item/coating material may be manufactured based on the information contained in the provided order and may be provided to the user associated with the provided order. Routine 101' then proceeds to block 153.

In block 153, routine 101' determines whether the user wants to end method 100' or whether the user wants to go back to block 102 described in relation to FIG. 1*a*. For this purpose, routine 101' may display a respective dialog on the screen of the display device prompting the user to make the appropriate selection. If routine 101' determines that the user wants to end method 100', routine 101' ends method 100'. Otherwise, routine 101' proceeds to block 102 described in relation to FIG. 1*a*.

In block 154, routine 101' displays the digital representation of the colored coating layer provided in block 106 on the screen of the display device. The displayed digital representation comprises at least part of the ingredients used to prepare the coating material associated with the provided digital representation, i.e. at least part of the ingredients being present in the coating material used to prepare the color selected in block 104 are displayed on the screen of the display device in block 154. In one example, a rendered virtual object obtained by rendering a virtual object with the color data contained in the digital representation provided in step 106 using predefined illumination conditions as previously described is additionally displayed on the screen in this block. In this example, pre-defined virtual object data of part of an automotive is used and the displayed virtual object can be turned or zoomed. In another example, the user can select the virtual object and object data associated with the selected object is then retrieved from the database and used for the rendering process.

In block 156, routine 101' detects a modification of the displayed digital representation of the colored coating layer by the user. This may include modifying at least one displayed ingredient via an interaction element, such as a touchscreen gesture, by the user and detecting the user input with the processor of the display device. In this example, the ingredients being present in the coating formulation used to prepare the colored coating layer are displayed using at least one adjustment tool comprising a plurality of regulators, each regulator corresponding to the type and amount of an ingredient being present in the coating material. The adjustment tool is generated by routine 101' from the digital representation of the colored coating layer provided in block 106 by transforming the data on the formulation of the coating material contained in said digital representation into an adjustment tool. In this example, the adjustment tool is a box having a plurality of visually distinct compartments, each compartment being indicative of a type of ingredient being present in the coating material, the size of each compartment being indicative of the amount of the respective ingredient and the plurality of regulators corresponding to lines separating the compartments. The type of ingredient is displayed in each compartment using a graphical representation being indicative of the respective ingredient type. The graphical representation is obtained from the provided digital representation of the colored coating layer by associating the formulation data contained in the provided digital representation with pre-defined images for each type of ingredient, such as color chips for colored pigments, metal pieces for metallic effect pigments, glass pieces for glass flakes, solid blocks for binders etc., and displaying said images in the respective compartment. The use of a box having compartments of different sizes and comprising graphical representations of specific ingredients provides an easy overview of the relevant ingredients of coating materials without a deep understanding of the chemical structure and the curing chemistry and allows to easily assess the influence of the type/amount of each ingredient on the resulting color of the coating layer. In another example, the adjustment tool has the form of a list comprising the type and amount of each ingredient and the user can change the type/amount of ingredient by selecting a different ingredient or by changing the listed amount. The list is generated from the formulation data contained in the provided digital representation. In one example, the touch screen gestures are detected with the panel processor of the touch screen panel and are provided from the panel processor to the computer processor via a communication interface. Block 156 may be repeated, i.e. the formulation may be modified until the desired color is obtained.

In block 158, routine 101' generates a modified digital representation of the colored coating layer based on the user modifications detected in block 156. In this example, the detected touch screen gestures are converted into modified formulation data of the colored coating material used to prepare the colored coating layer. The modified digital representation therefore comprises formulation data of the modified coating material.

In block 160, routine 101' generates color data of the coating layer based on the modified digital representation obtained in block 158. In this example, generating color data includes providing a data driven model parametrized on color data of historical coating layers and historical formulations of colored coating materials used to prepare the historical coating layers and calculating color data based on the provided data driven model and the modified formulation data of the colored coating material. The data driven model is stored on a computer readable medium, such as a database, and is provided to the processor via a communication interface. An example of a suitable data driven model is disclosed in US20020184167A1. In another example, the color data is generated by retrieving color data from a database or lookup table based on the modified formulation data of the colored coating material. This example may include comparing the retrieved color data to predefined tolerances in order to provide the best matching color data.

In block 162, routine 101' displays the color data generated in block 160 on the screen of the display device. In this example, displaying the generated color data on the screen of the display device includes automatically updating the color of the virtual object displayed in block 154 in response to performing blocks 156 to 160 by rendering the generated color data and the virtual object data using predefined illumination conditions as previously described and updating the color displayed in block 154 with the rendering result of block 162. In one example, blocks 154 to 162 are repeated. This may be preferred if the displayed color is not matching the color desired by the user.

In block 164, routine 101' determines if the modified digital representation generated in block 158 is within at least one predefined tolerance, in particular within all predefined tolerances. In this example, the predefined tolerance is selected from a maximum or minimum amount of pigment(s) and binders, an allowable combination pigments and binders and combinations thereof. The predefined tolerances may be determined by the coating manufacturer based on stability criterions, manufacturing process criterions etc. The predefined tolerance(s) is/are stored on a storage device, such as a database, and is/are provided via a communication interface to the computer processor prior to the determination. The determination is performed by comparing data of the modified formulation of the coating material comprised in the modified digital representation with at least one predefined tolerance using the computer processor. The result of the determination may be displayed to the user on the screen of the display device. In this example, the comparison is performed by the computer processor of the display device. In another example, the comparison is performed by a further computer processor being present outside the display device. For this purpose, the modified digital representation is provided via a communication interface to the further processor prior to determination and the result of the determination may be provided to the processor of the display device via said communication interface after completion of the determination. If routine 101' determines that the modified digital representation is within at least one, preferably within all, pre-defined tolerance(s), routine 101' proceeds to block 148. If routine 101' determines that modified digital representation is outside at least one pre-defined tolerance, routine 101' proceeds to block 168.

In block 166, routine 101' displays at least one recommendation on the screen of the display device if the determination performed in block 164 results in the modified digital representation not fulfilling at least one predefined tolerance. The recommendations are stored in a database and are retrieved by the processor connected via a communication interface with the database based on the result of the determination, i.e. based on which tolerance(s) is/are not fulfilled. In one example, the displayed recommendation is: "Amount of [compound X] too high. Please reduce amount or choose a different [compound]". The term in brackets is replaced in the specific example by the name of the compound being out of the predefined tolerance.

In block 168, routine 101' determines whether the user wants to repeat modification of the coating material. This may include displaying a respective menu on the GUI and prompting the user to make the appropriate selection. If routine 101' determines that the user wants to repeat modification of the coating material, routine 101' proceeds to block 154. Otherwise, routine 101' proceeds to block 153 previously described.

Figure 2A:
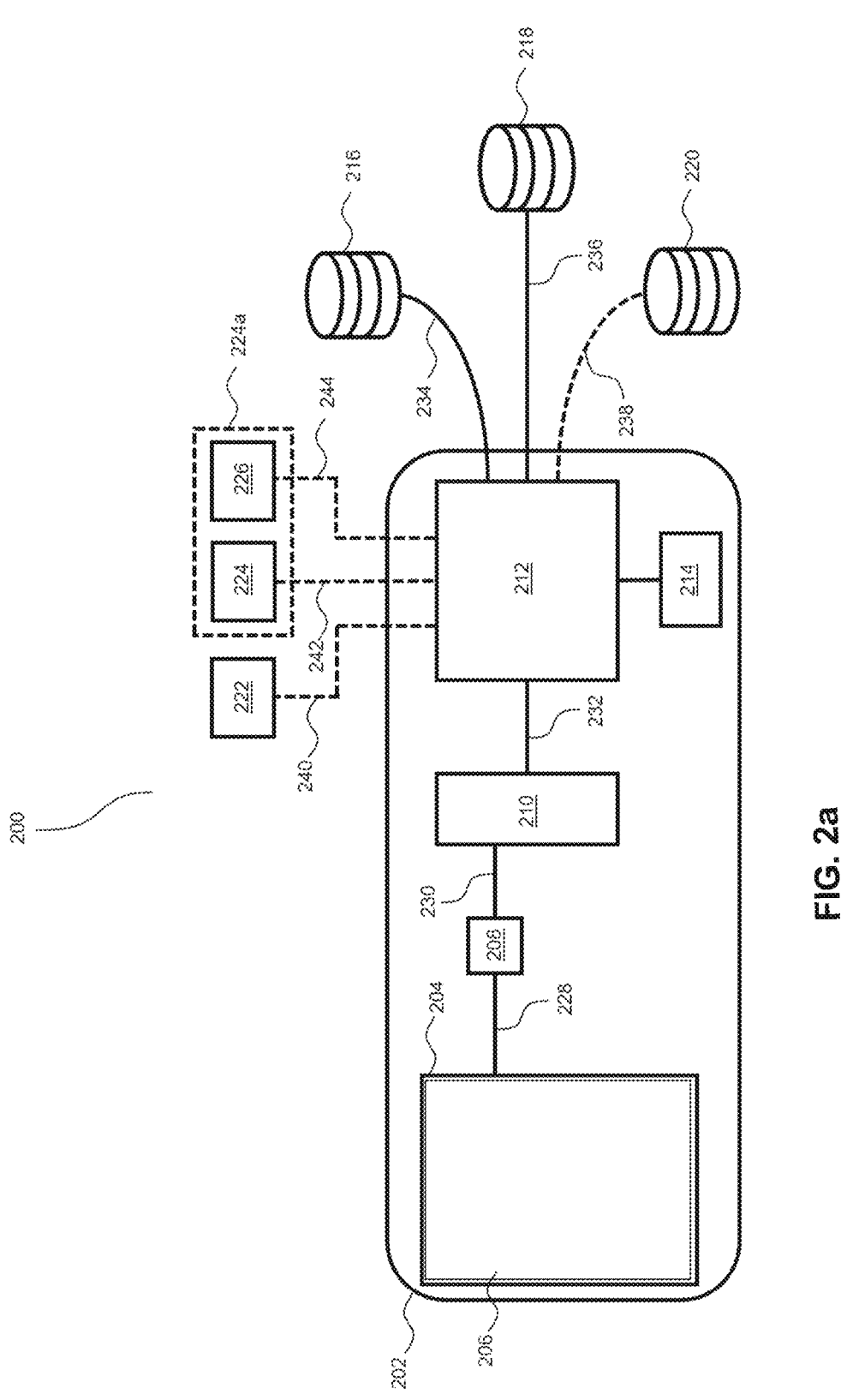
FIG. 2a illustrates a system in accordance with a first embodiment of the invention

FIG. 2*a* shows a first embodiment of a system 200 for designing the appearance of a colored coating layer being produced from a colored coating material which can be used to carry out the inventive method, for example method 100 described in relation to FIG. 1. In this example, system 200 is a display device 202 which is coupled via communication interfaces 234, 236, 238 to databases 216, 218, 220. The display device 202 may be coupled via communication interfaces 240, 242, 244 to sensors 222, 224, 228. As shown, computer system 200 includes a processor 212 configured to execute instructions, for example retrieved from memory 214, and to carry out operations associated with the computer system 200, namely receive via the communication interface a digital representation of a colored coating layer, a digital representation of the illumination conditions and optionally the previously described model(s);

optionally derive an ambient illumination condition surrounding the display device, an orientation of the display device and optionally a vantage point from the received digital representation of the illumination conditions;

generate color data of the colored coating layer based on the received digital representation of the colored coating layer, the received digital representation of the illumination condition or the derived ambient illumination condition surrounding the display device, an orientation of the display device and optionally a vantage point, and optionally the received model(s);

optionally recalculate color data of the colored coating layer in response to a change in the provided digital representation of illumination conditions, in particular in response to a change in data acquired by the orientation sensor(s) and/or the illumination sensor(s) and/or the vantage point sensor(s).

Display device 202 includes a screen 204 for displaying the provided digital representation of the colored coating layer, the provided digital representation of illumination conditions and the generated color data of the colored coating layer received from the processor 212, in particular via a graphical user interface (GUI), to the user. For this purpose, display device 202 is operatively coupled to processor 212 via a communication interface. In this example, the display device 202 is connected to processor 212 via communication interfaces 228, 230, 232, 324, sensing circuit 208 and input/output (I/O) controller 210. In another example, display device 202 is coupled directly to the processor 212 via a communication interface. In this example, display device 202 is integrated with processor 212 and memory 214 to form a desktop computer (all in one machine), a laptop, handheld or tablet or the like. In another example, display device 202 may be a separate component (peripheral device, not shown). By way of example, the display device 202 may be a monochrome display, color graphics adapter (CGA) display, enhanced graphics adapter (EGA) display, variable-graphics-array (VGA) display, super VGA display, liquid crystal display (e.g., active matrix, passive matrix and the like), cathode ray tube (CRT), plasma displays and the like.

The system further includes an interaction element 206 for detecting a user input which is operatively coupled to the processor 212 via a communication interface. In this example, the interaction element 206 is a touch screen which is operatively coupled to the processor 212 via sensing device 208 and input/output (I/O) controller 210 such that the processor can detect a user input via the interaction element 206. The touch screen 206 is a transparent panel that is positioned in front of the screen 204 of the display device 202. In this example, the touch screen 206 is integrated with the display device 202. In another example, the touch screen 206 is a separate component. The touch screen 206 is configured to receive input from a user's touch and to send this information to the processor 212. For this purpose, the touch screen 206 recognizes touches and the position and magnitude of touches on its surface. The touch screen 206 generally includes a sensing device configured to detect an object in close proximity thereto and/or the pressure exerted thereon, for example by using sensing points positioned throughout the touch screen 206. In the simplest case, a signal is produced each time an object is positioned over a sensing point, for example by using capacitance. In this example, the touch screen 206 includes a sensing circuit 208 connected via communication interface 228 to the touch screen 206 that acquires the data from the sensing device. The sensing circuit 208 is connected via communication interface 230 to input/output (I/O) controller 210 that is operatively coupled to the processor 212. In this example, the (I/O) controller 210 is a separate component. In another example, the (I/O) controller 210 is integrated with the processor 212. The I/O controller 210 is generally configured to control interactions with one or more I/O devices, such as the touch screen 206. The I/O controller 210 generally operates by exchanging data between the processor 212 and the I/O devices that desire to communicate with the processor. The data acquired from the sensing circuit 208 are thus supplied via (I/O) controller 210 to the processor 212. In another example, the processor may include this functionality. In one example, the sensing circuit 208 is configured to send raw data to the processor 212 so that the processor 212 processes the raw data. For example, the processor 212 receives data from the sensing circuit 208 and then determines how the data is to be used within the system 200. The data may include the coordinates of each sensing point as well as the pressure exerted on each sensing point. In another example, the sensing circuit 208 is configured to process the raw data itself by reading the pulses from the sensing points and turning them into data that the processor 212 can understand. The sensing circuit 208 may perform filtering and/or conversion processes. Filtering processes are typically implemented to reduce a busy data stream so that the processor 212 is not overloaded with redundant or non-essential data. The conversion processes may be implemented to adjust the raw data before sending or reporting them to the processor 212. The conversions may include determining the center point for each touch region (e.g., centroid). The sensing circuit 208 may include a storage element for storing a touch screen program, which is a capable of controlling different aspects of the touch screen 206. For example, the touch screen program may contain what type of value to output based on the sensing points selected (e.g., coordinates). The sensing circuit 208 generally includes one or more microcontrollers, each of which monitors one or more sensing points. The microcontrollers may for example correspond to an application specific integrated circuit (ASIC), which works with firmware to monitor the signals from the sensing device and to process the monitored signals and to report this information to the processor 212. Suitable touch screens are commercially available and are commonly included in mobile devices, such as smartphones or tablets. In another example, the interaction element 206 is a mouse which is operatively coupled to the processor 212 via a communication interface. The mouse may be connected to the processor via input/output (I/O) controller 210 as previously described in connection with the touch screen.

The databases 216, 218, 220 may store the digital representation of the colored coating layer, a model derived from historic illumination conditions and/or a model derived from historic environmental conditions and the digital representation of illumination conditions. The information stored in the databases 216, 218, 220 is retrieved by processor 212 via communication interfaces 234, 236, 238 and used to calculate the ambient illumination conditions and/or to generate color data as described in relation to step 108 of FIG. 1.

Figure 5B:
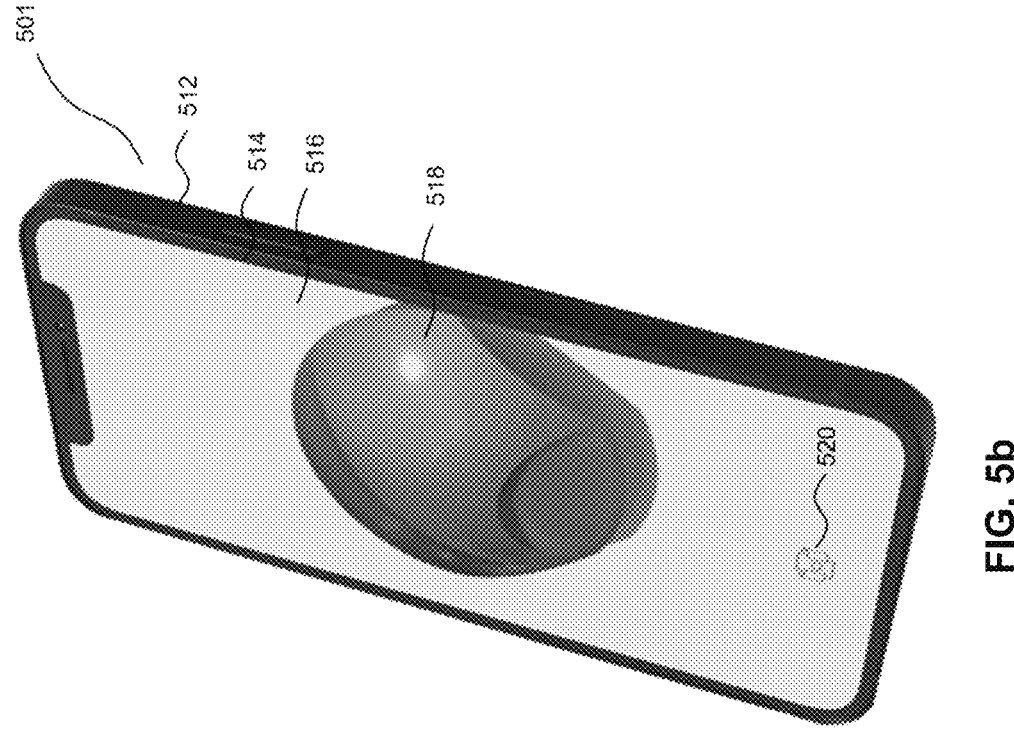
FIG. 5b is a 3D view of a system comprising a display device having a graphical user interface showing a virtual 3D object in the form of a dome relief being colored with the color associated with ambient illumination and the orientation of the display device
Figure 5A:
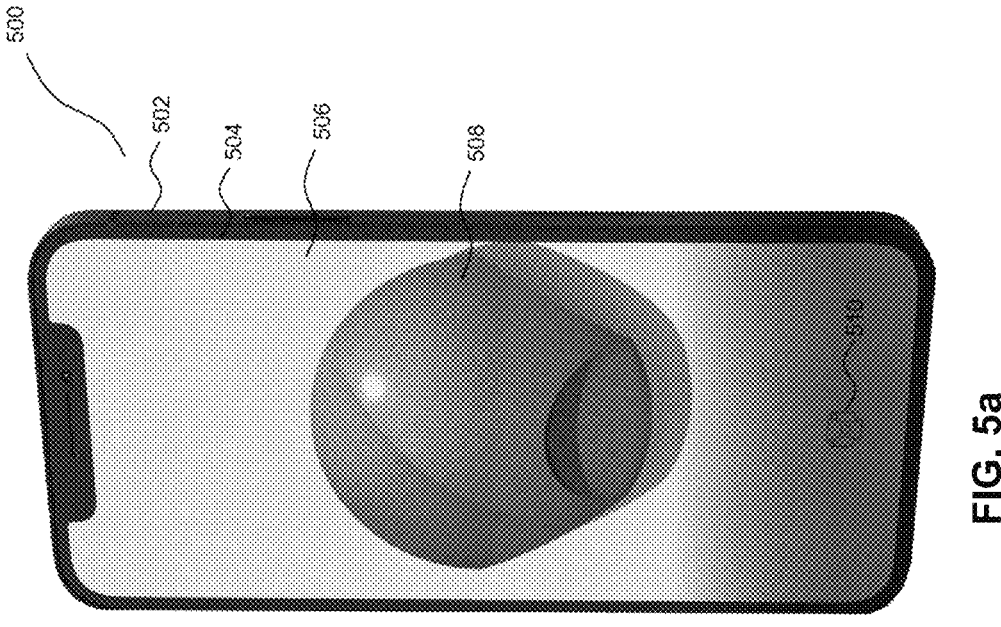
FIG. 5a is a 3D view of a system comprising a display device having a graphical user interface showing a virtual 3D object in the form of a dome relief being colored with the color associated with ambient illumination and the orientation of the display device

The device 200 may, according to various embodiments, include a sensor or sensors for sensing environmental conditions such as, for example, orientation sensor(s) 222, illumination sensor(s) 224 and/or vantage point sensor(s) 226. Readings from the sensors 222, 224, 226 are provided to processor 212 via communication interfaces 240, 242, 244 as described in relation to step 106 of FIG. 1. These readings are used to calculate ambient illumination conditions with processor 212 using the models stored in database 220 as described in relation to step 108 of FIG. 1. The calculated ambient illumination conditions are used by processor 212 for predicting the appearance of the coated object as though the coated object is interacting with the actual environment of the device 200 as described in relation to step 108 of FIG. 1. Orientation sensor(s) 222 may sense the pitch, roll and yaw of the device around at least one of its axis, for example, as shown in FIGS. 5a and 5b. As the device 200 rotates, it can be appreciated that environmental factors considered during prediction of the appearance of the coated object may change (e.g., illumination directions, such as dominant illumination direction, vantage point location, etc.). Accordingly, the processor 212 may consider this pitch, roll and yaw of the device 200 and calculate appropriate changes to environmental conditions. According to various embodiments, resulting changes to the displayed appearance of coated object may be updated in real time or near real time as described in relation to step 110 of FIG. 1. In this way, as the user tilts and rotates the device 200, the appearance of the coated object shown by the screen 204 may behave as though the user is tilting and rotating an actual sample. Orientation sensors 222 may be placed within the display device 202 and may include any suitable types of sensors capable of sensing motion of the device 200 about one or more axes as described previously. Illumination sensor(s) 224 may sense ambient illumination conditions surrounding the device 200 including, for example, Lux level, spectral content and illumination directions, such as dominant illumination direction, or may be used to take at least one photograph of the environment surrounding the display device, such as at least one HDR or LDR photograph. According to various embodiments, the illumination sensor(s) 224 may be implemented as a CMOS imaging module, embedded camera, or any other sensor capable of capturing an image. The processor 212 may then derive ambient illumination conditions considering a captured image as described previously. The vantage point sensor 226 may be used to locate the vantage point and may also be implemented as a CMOS imaging module, embedded camera, or similar device. The location of the vantage point may be derived from the resulting images as described previously. Also, according to various embodiments illumination sensor(s) 224 and vantage point sensor(s) 226 may be implemented as a single sensor 224a with both vantage point position and illumination information derived from the images acquired by said sensor 224a as previously described.

The processor 212 can be a single-chip processor or can be implemented with multiple components. In most cases, the processor 212 together with an operating system operates to execute computer code and produce and use data. In this example, the computer code and data resides within memory 214 that is operatively coupled to the processor 212. Memory 214 generally provides a place to hold data that is being used by the computer system 200. By way of example, memory 214 may include Read-Only Memory (ROM), Random-Access Memory (RAM), hard disk drive and/or the like. In another example, computer code and data could also reside on a removable storage medium and loaded or installed onto the computer system when needed. Removable storage mediums include, for example, CD-ROM, PC-CARD, floppy disk, magnetic tape, and a network component. In this example, the processor 212 retrieves the digital representation of the colored coating layer and the digital representation of illumination conditions via communication interfaces 234, 236 from databases 216, 218. For this purpose, a pre-existing color library and pre-defined HDR environment maps are displayed on screen 204 of display device 202 and a user's selection of a color and HDR environment map is detected via touch screen 206 as previously described. Processor 212 then retrieves the digital representation of the colored coating layer associated with the selected color from database 216 via communication interface 234 as described in relation to step 104 of FIG. 1 and retrieves the digital representation of illumination conditions associated with the selected HDR environment map from database 218 via communication interface 236 as described in relation to step 106 of FIG. 1. In another example, processor 212 may further retrieve at least one previously described model derived from historic illumination conditions and/or at least one model derived from historic environmental conditions via communication interface 238 from database 220 in case data is acquired from sensors 222, 224, 226 or sensors 222, 224*a* and provided via communication interfaces 240, 242, 244 to processor 212. The model(s) retrieved from database 220 is/are used by processor 212 to calculate ambient illumination conditions from the data acquired by sensors 222, 224, 226 or sensors 222, 224*a* as previously described prior to generating the color data as described in relation to step 108 of FIG. 1. Processor 212 then uses the retrieved digital representation of the colored coating layer and digital representation illumination conditions or the calculated ambient illumination conditions to generated color data by the previously described rendering processes as described in relation to step 108 of FIG. 1. The virtual object data used for said rendering process is either stored in any of databases 216, 218, 220 or in a further database (not shown). The rendered object is then displayed by the display device after processor 212 has performed the rendering process by mapping the generated color data to the screen of the display device as described in relation to step 110 of FIG. 1. In this example, displaying the rendered object includes updating the selected color from the pre-existing color library. This allows the user to see the effect of the selected illumination conditions on the selected color, such that the user gets an understanding of the influence of different illumination conditions on the selected color.

In one example, processor 212 may further be programmed to display the provided digital representation of the colored coating layer, in particular at least part of the ingredients of the coating material used to prepare colored coating material associated with the provided digital representation as described in relation to step 112 of FIG. 1; and detect a modification of the displayed digital representation of the colored coating layer by the user, preferably by detecting a user input via interaction element 206, as described in relation to step 112 of FIG. 1; and convert the detected user input into a modified digital representation of the colored coating layer; and generate color data of the coating layer based on the modified digital representation as described in relation to step 114 of FIG. 1; and optionally determine if the generated modified digital representation of the coating layer is within at least one predefined tolerance, in particular within all predefined tolerances as described in relation to step 118 of FIG. 1; and optionally provide the modified digital representation of the colored coating material via a communication interface to a coating material manufacturing site as described in relation to step 120 of FIG. 1; and/or optionally display at least one recommendation on the screen of the display device if the modified digital representation does not fulfill at least one predefined tolerance as described in relation to step 122 of FIG. 1; and/or provide to a further computer processor via the communication interface an order instruction for an item as described in relation to step 124 of FIG. 1

Figure 2B:
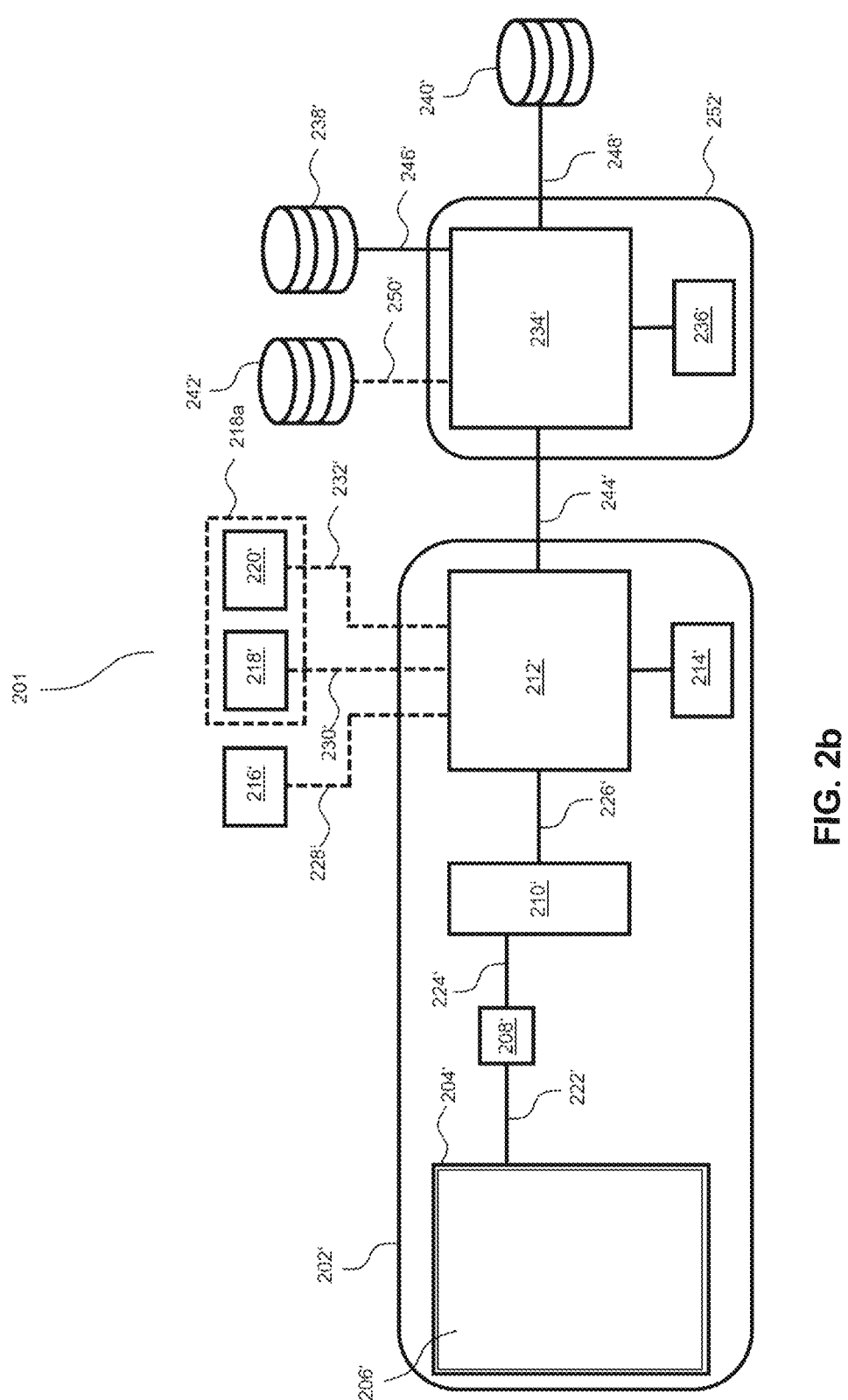
FIG. 2b illustrates a system in accordance with a second embodiment of the invention

FIG. 2*b* shows a second embodiment of a system 201 for designing the color of a colored coating layer being produced from a colored coating material which can be used to carry out the inventive method, for example method 100 described in relation to FIG. 1. In this example, system 201 comprises a display device 202' which may be coupled via a communication interfaces 228', 230', 232' to sensors 216', 218', 220', namely orientation sensor(s) 216', illumination sensor(s) 218' and vantage point sensor(s) 220'. As described in relation to FIG. 2*a*, illumination sensor(s) 218' and vantage point sensor(s) 220' may be configured as a single sensor 218*a*. Display device 202' has a screen 204' for displaying the provided digital representation of a coating layer, the provided digital representation of illumination conditions or the calculated ambient illumination conditions and the generated color data received from processor 212', in particular via a graphical user interface (GUI), to the user. For this purpose, display device 202' is operatively coupled to processor 212' via communication interfaces and the processor 212' is configured to receive via communication interfaces 228', 230', 232' the digital representation of illumination conditions, i.e. the data acquired by sensors 216', 218', 220' as described with relation to step 108 of FIG. 1;

provide the received digital representation of illumination conditions via communication interface 244' to the further computing device 252'; and receive from the further computing device 252' the calculated ambient illumination conditions and generated color data for display on the screen 204' of display device 202' as described in relation to step 110 of FIG. 1.

In this example, display device 202' is connected to processor 212' via communication interfaces 222', 224', 226', sensing circuit 208' and input/output (I/O) controller 210'. In another example, display device 202' is coupled directly to processor 212' via a communication interface. In this example, display device 202' is integrated with processor 212' and memory 214' to form a desktop computer (all in one machine), a laptop, handheld or tablet or the like. In another example, display device 202' may be a separate component (peripheral device, not shown). In this example, display device 202' further contains interaction element 206' as described in relation to FIG. 2*a* and processor 212' of display device 202' is used to detect the user input via interaction element 206' as described in relation to FIGS. 1 and 2*a*.

System 201 further includes computing device 252' connected via communication interface 244' to display device 202' and via communication interfaces 246', 248', 250' to databases 238', 240', 242'. The databases 238', 240', 242' contain the digital representation of the colored coating layer, the digital representation of illumination conditions and the previously described models derived from historic illumination conditions and/or previously described models derived from historic environmental conditions. Computing device 234' may be a single computing device or located in a server environment. In the latter case, display device 202' may serve as a client device and may access the server (i.e. computing device 234') via a network (i.e. communication interface 244'), such as the Internet. Preferably, the server may be an HTTP server and is accessed via conventional Internet web-based technology. The internet-based system is in particular useful, if the service of designing the color of a colored coating layer being produced from a colored coating material is provided to customers or in a larger company setup.

Computing device 252' includes processor 234' configured to execute instructions, for example retrieved from memory 236', and to carry out operations associated with system 201, namely optionally receive via communication interface 244' the digital representation of illumination conditions from processor 212';

optionally calculate an ambient illumination condition surrounding the display device from the received digital representation of illumination conditions and the model(s) stored in database 242' as described in relation to step 106 of FIG. 1;

optionally provide the calculated ambient illumination conditions via communication interface 244' to processor 212' for display on screen 204' of display device 202'; and generate color data of the colored coating layer using the digital representation of the colored coating layer stored in database 238' and the digital representation of illumination conditions stored in database 240' or the calculated ambient illumination conditions as described in relation to step 108 of FIG. 1.

Use of two different computer processors performing different steps of the inventive method allows to shift the step requiring high computing power to a separate computing device, thus allowing to use display devices having limited computing power without negatively influencing the computing time necessary for generating of color data which may include the use of high computing power to perform the calculations within acceptable time frames. This embodiment of the system is thus especially preferred if ambient illumination conditions are calculated using the aforementioned models or if generation of the color data is performed by rendering or by calculating color data using the modified digital representation and a data driven model as previously described. With respect to suitable computer processors 212' and 234', reference is made to FIG. 2a. In one example, processor 334' of computing device 252' retrieves the digital representation of the colored coating layer associated with the selected color as described in relation to FIGS. 1 and 2a, the digital representation of illumination conditions and virtual object data (either stored in memory 236' or a further database which is not shown) and calculates color data using the previously described rendering processes, in particular image-based lighting. In another example, processor 334' of computing device 252' retrieves the digital representation of the colored coating layer associated with the selected color as described in relation to FIGS. 1 and 2a and calculates the color data using the calculated ambient illumination conditions and the rendering processes described previously. In yet another example, processor 334' may—in a first step—calculate color data based on the provided digital representation of the colored coating layer and the illumination conditions, such as pre-defined HDR environment maps, and may—in a second step—calculate color data based on the provided digital representation of the colored coating layer and calculated ambient lighting conditions, or vice versa. The color displayed after the first step may be updated with the rendering result after performing the second step. This allows to display the influence of different illumination conditions on the displayed colored object and thus increases the user comfort during selection of a desired color because the illumination conditions predominant at the point of use may be used to predict the appearance of the colored object.

In one example, the ambient illumination conditions calculated by processor 234' is displayed by screen 204' of display device 202' by providing the calculated ambient illumination conditions via communication interface 244' to processor 212'. The calculated ambient illumination conditions may be, for example, calculated HDR environment maps. In another example, the color data generated by processor 234' is provided via communication interface 244' to processor 212' and the processor maps the rendering result to screen 204' of display device 202'. In yet another example, the calculated ambient illumination conditions and generated color data are forwarded to processor 212' for display on screen 204' of display device 202'. In this example, displaying the rendered object includes updating the selected color from the pre-existing color library.

In one example, processor 212' may further be programmed to display the provided digital representation of the colored coating layer, in particular at least part of the ingredients of the coating material used to prepare colored coating material associated with the provided digital representation as described in relation to step 112 of FIG. 1; and detect a modification of the displayed digital representation of the colored coating layer by the user, preferably by detecting a user input via interaction element 206, as described in relation to step 112 of FIG. 1; and convert the detected user input into a modified digital representation of the colored coating layer; and optionally determine if the generated modified digital representation of the coating layer is within at least one predefined tolerance, in particular within all predefined tolerances as described in relation to step 118 of FIG. 1; and optionally provide the modified digital representation of the colored coating material via a communication interface to a coating material manufacturing site as described in relation to step 120 of FIG. 1; and/or optionally display at least one recommendation on the screen of the display device if the modified digital representation does not fulfill at least one predefined tolerance as described in relation to step 122 of FIG. 1; and/or provide to a further computer processor via the communication interface an order instruction for an item as described in relation to step 124 of FIG. 1

Processor 234' may further be programmed to:

generate color data of the coating layer based on the modified digital representation as described in relation to step 114 of FIG. 1.

Figure 2C:
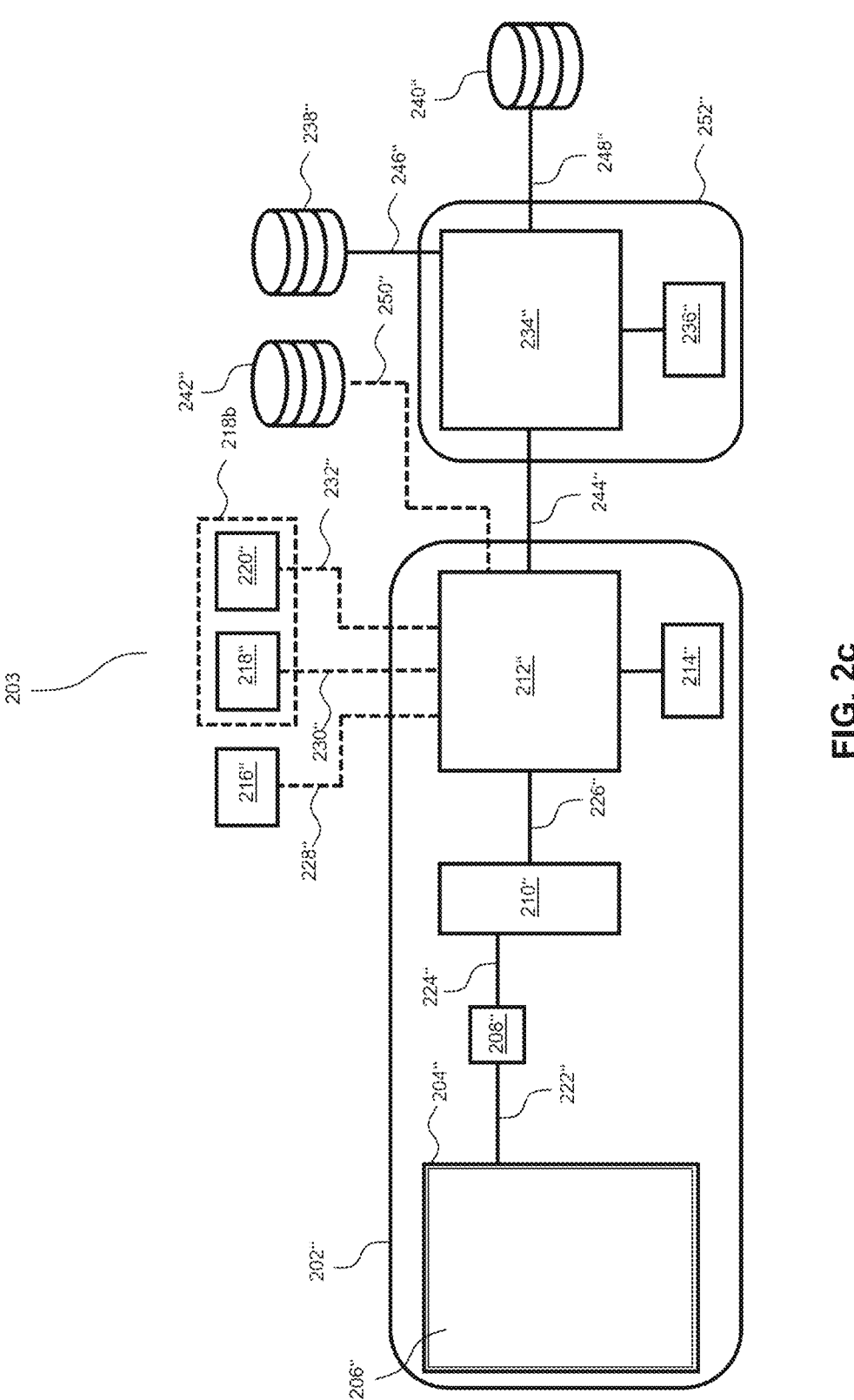
FIG. 2c illustrates a system in accordance with a third embodiment of the invention

FIG. 2c shows a third embodiment of a system 203 for designing the color of a colored coating layer being produced from a colored coating material which can be used to carry out the inventive method, for example method 100 described in relation to FIG. 1. In this example, system 203 comprises a display device 202" which may be coupled via a communication interfaces 228", 230", 232" to sensors 216", 218", 220", namely orientation sensor(s) 216", illumination sensor(s) 218" and vantage point sensor(s) 220". As described in relation to FIGS. 2a and 2b, illumination sensor(s) 218" and vantage point sensor(s) 220" may be configured as a single sensor 218b. Display device 202" has a screen 204" for displaying the provided digital representation of a coating layer, the provided digital representation of illumination conditions or the calculated ambient illumination conditions and the generated color data received from processor 212", in particular via a graphical user interface (GUI), to the user. For this purpose, display device 202" is operatively coupled to processor 212" via communication interfaces and the processor 212" is configured to receive via communication interfaces 228", 230", 232" the digital representation of illumination conditions, i.e. the data acquired by sensors 216", 218", 220" as described in relation to step 106 of FIG. 1; and calculate an ambient illumination condition surrounding the display device from the received digital representation of illumination conditions and the model(s) stored in database 242" as described in relation to step 106 of FIG. 1.

The models derived from historic illumination conditions and/or the models derived from historic environmental conditions which are necessary for calculating the ambient illumination conditions from the received digital representation of illumination conditions are retrieved by processor 212" from database 242" via communication interface 250".

In this example, display device 202" is corresponding to the display device described in FIGS. 2a and 2b.

System 203 further includes computing device 252" connected via communication interface 244" to display device 202" and via communication interfaces 246", 248" to databases 238", 240". The databases 238', 240' contain the digital representation of the colored coating layer and the digital representation of illumination conditions. Computing device 234" may be a single computing device or located in a server environment. In the latter case, display device 202" may serve as a client device and may access the server (i.e. computing device 234") via a network (i.e. communication interface 244"), such as the Internet. Preferably, the server may be an HTTP server and is accessed via conventional Internet web-based technology. The internet-based system is in particular useful, if the service of designing the color of a colored coating layer being produced from a colored coating material is provided to customers or in a larger company setup.

Computing device 252" includes processor 234" configured to execute instructions, for example retrieved from memory 236", and to carry out operations associated with system 203, namely optionally receive via communication interface 244' the ambient illumination conditions calculated with processor 212";

generate color data of the colored coating layer using the digital representation of the colored coating layer stored in database 238" and the digital representation of illumination conditions stored in database 240" or the calculated ambient illumination conditions as described in relation to step 108 of FIG. 1.

Use of two different computer processors performing different steps of the inventive method allows to shift the step requiring high computing power to a separate computing device, thus allowing to use display devices having limited computing power without negatively influencing the computing time necessary for generating of color data which may include the use of high computing power to perform the calculations within acceptable time frames. This embodiment of the system is thus especially preferred if generation of the color data is performed by rendering or by calculating color data using the modified digital representation and a data driven model as previously described. With respect to suitable computer processors 212" and 234" and generation of color data, reference is made to FIGS. 2a and 2b.

In one example, the ambient illumination conditions calculated by processor 212" are displayed on screen 204" of display device 202" as described in relation to FIG. 2b. The generated color data is forwarded via communication interface 244" from processor 234" to processor 212" for display on screen 204" of display device 202" as described in relation to FIGS. 2a and 2b. Displaying the rendered object may include updating the selected color from the pre-existing color library with the rendering result. In one example, processor 212" may further be programmed to display the provided digital representation of the colored coating layer, in particular at least part of the ingredients of the coating material used to prepare colored coating material associated with the provided digital representation as described in relation to step 112 of FIG. 1; and detect a modification of the displayed digital representation of the colored coating layer by the user, preferably by detecting a user input via interaction element 206, as described in relation to step 112 of FIG. 1; and convert the detected user input into a modified digital representation of the colored coating layer; and optionally determine if the generated modified digital representation of the coating layer is within at least one predefined tolerance, in particular within all predefined tolerances as described in relation to step 118 of FIG. 1; and optionally provide the modified digital representation of the colored coating material via a communication interface to a coating material manufacturing site as described in relation to step 120 of FIG. 1; and/or optionally display at least one recommendation on the screen of the display device if the modified digital representation does not fulfill at least one predefined tolerance as described in relation to step 122 of FIG. 1; and/or provide to a further computer processor via the communication interface an order instruction for an item as described in relation to step 124 of FIG. 1

Processor 234" may further be programmed to:

generate color data of the coating layer based on the modified digital representation as described in relation to step 114 of FIG. 1.

Figure 3:
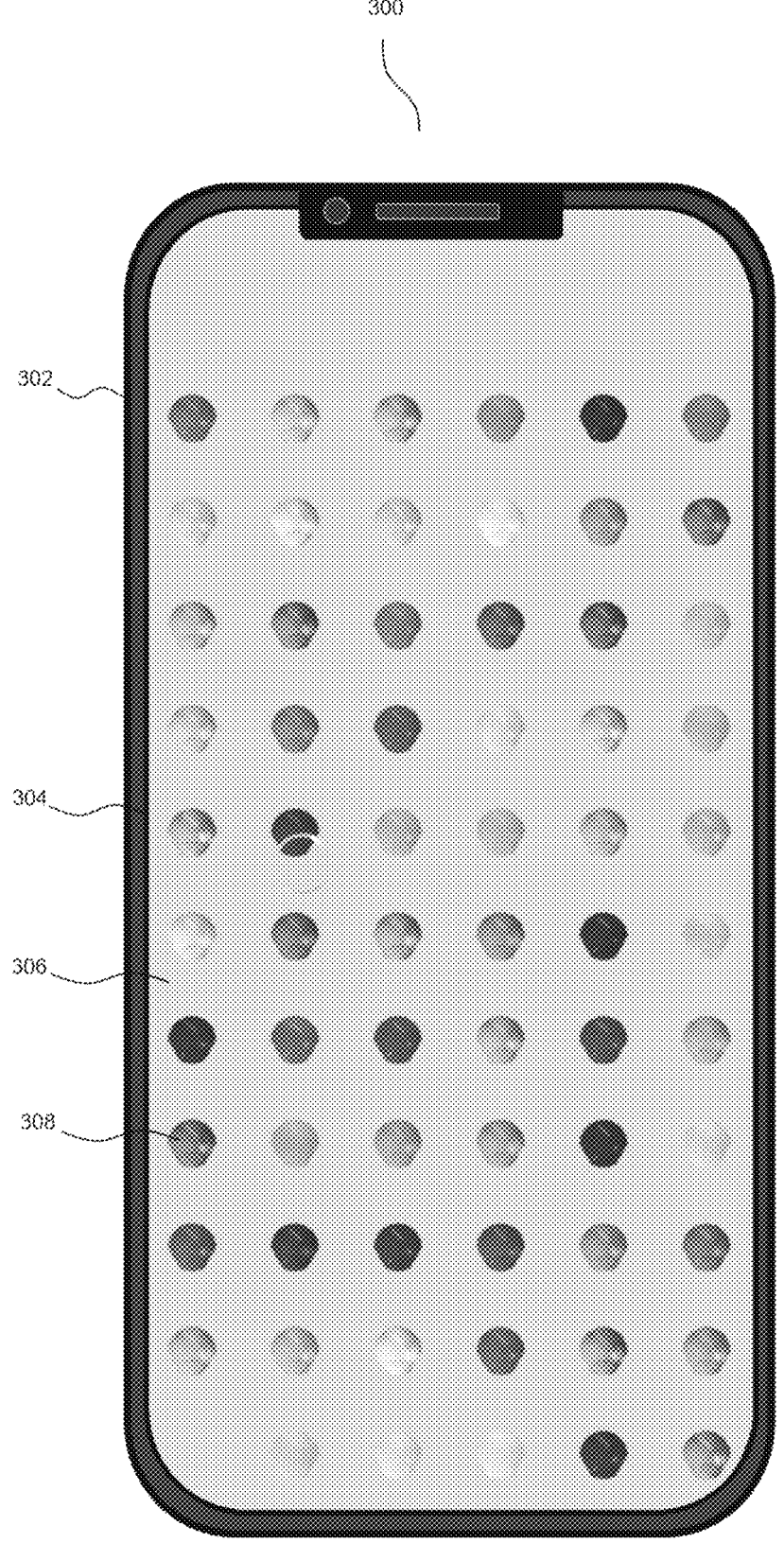
FIG. 3 is a planar view of a system comprising a display device having a graphical user interface showing a pre-existing color library in which colored coating layers are displayed on virtual 3D objects in the form of dome reliefs

FIG. 3 illustrates a planar view of a system 300 comprising/consisting of a display device 302 having a screen 304 on which a graphical user interface 306 showing a pre-existing color library is displayed to the user. Suitable system are described in connection with FIGS. 2a to 2c. The graphical user interface 304 may be, for example, displayed in block 104 of FIG. 1. In this example, the graphical user interface 304 is displayed on a portable display device 302, such as a smartphone. In another example, the graphical user interface 304 is displayed on a stationary display device, such as a stationary computer monitor. The graphical user interface 306 illustrates a pre-existing color library in which colors of colored coating layers are shown on 3D virtual objects having a dome shape 308. In this example, the pre-existing color library contains 195 colors of which 65 colors are shown on the screen of the display device. Further colors may be viewed by scrolling through the pre-existing color library 306 via touchscreen gestures. The pre-existing color library is displayed by rendering object data of virtual dome shape objects and color data associated with the pre-defined library using predefined illumination conditions (image-based lighting) with a processor being present inside the display device 302 and displaying the rendering result on the screen 304. In this example, the color data associated with the predefined library is stored in a database and is provided via a communication interface, preferably a wireless communication interface, to the processor of the display device prior to rendering as described in relation to FIGS. 2a to 2c. In another example, the color data associated with the pre-defined color library is stored on the memory present inside the display device 302. The color data associated with the colors present in the pre-existing library is defined by the optimized BTF as previously described.

Figure 4:
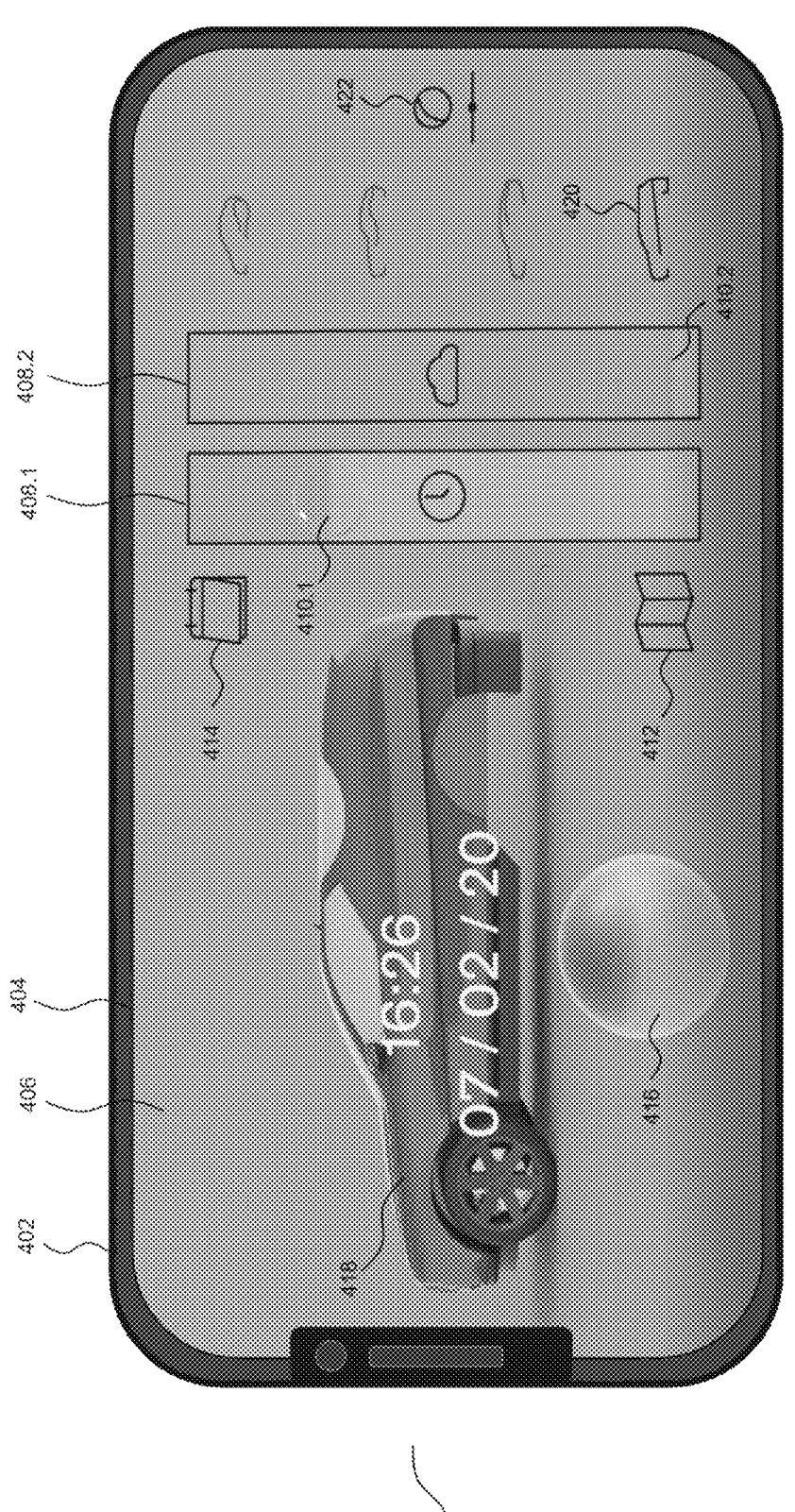
FIG. 4 is a planar view of a system comprising a display device having a graphical user interface showing adjustment tools and a virtual 3D object in the form of part of an automotive body being colored with the color associated with the selected illumination conditions

FIG. 4 illustrates a planar view of a system 400 comprising/consisting of a display device 402 having a screen 404 on which a graphical user interface 406 showing adjustment tools 408.1, 408.2 and a virtual 3D object in the form of part of an automotive body 418 being colored with the color associated with pre-defined illumination conditions 416 is displayed to the user. Icon 422 illustrates that the color is calculated using data on the position, date, time and optionally haze of the sky. Suitable system are described in connection with FIG. 2a to 2c. The graphical user interface 404 may be, for example, displayed in block 106 of FIG. 1.

In this example, the graphical user interface 404 comprises two adjustment tools 408.1 and 408.2 which can be used to adjust the current time displayed in front of the automotive body 418 and the haze by moving the respective regulators 410.1 and 410.2. In this example, the user can select a position by clicking on the map icon 412 and navigating to the desired position using the appearing world map. In another example, the display device 404 may determine the current position of the user which may then be used to calculate the ambient illumination conditions as described previously. In this example, the user can select the desired date by clicking on the calendar icon 414.

The graphical user interface 404 further comprises a calculated HDR environment map 416 obtained from pre-defined values, such as predefined position, predefined time, predefined date and a predefined haze of the sky as described in relation to step 106 of FIG. 1 which may be updated in real time or near real time upon adjustment of at least one of position, date, time, haze by using the aforementioned adjustment tools 410.1, 410.2, the map icon 412 and/or the calendar icon 414.

The graphical user interface further comprises a part of an automotive body 418 which is colored with the color selected form the pre-existing color library, for example as described in relation to step 104 of FIG. 1 or FIG. 3. Displaying part of the colored automotive body may include rendering virtual object data and color data associated with the color selected from the pre-existing color data using ambient illumination conditions, i.e. the displayed HDR environment map 416, which have been calculated from a predefined position, data, time and haze using a model derived from historic illumination conditions, such as the described in I. Hosek et. al, "An analytic model for full spectral sky-dome radiance", ACM Transactions on Graphics, 2012, Vol. 31, Article No.: 95, https://doi.org/10.1145/2185520.2185591. In one example, the virtual automotive part used for rendering is a predefined virtual object. In another example, the virtual automotive part used for rendering can be selected by the user prior to rendering. The displayed color of the colored automotive part is updated in real time or near real time upon modification of at least one of the position, time, date or haze by recalculating the ambient illumination conditions and performing the rendering using the recalculated ambient illumination conditions. The currently selected shape of the automotive used for displaying the colored automotive 418 on the graphical user interface 404 is shown by black symbol 420. The user may change the shape by clicking on the respective grey icons above symbol 420 and the displayed colored automotive 418 is automatically updated in real time by performing a new rendering using the updated virtual object data. Updating of the color in real time or near real time upon modification of the illumination conditions allows the user to view the appearance of the colored object under selected illumination conditions, for example illumination conditions normally present at the users' residence. This allows the user to check whether the color selected from the pre-existing library provides the desired appearance under user specific illumination conditions, thus increasing user comfort upon selection of the color for an item, such as an automotive, and reduces disappointment of the user after the purchase.

FIGS. 5a and 5b are each a 3D view of a system 500, 501 comprising a display device 502, 512 having a graphical user interface 506, 516 showing a virtual 3D object in the form of a dome relief 508, 5018 being colored with the color associated with ambient illumination and the orientation of the display device. Icon 510, 520 illustrates that the color is calculated using data acquired from the orientation sensor(s) and/or illumination sensor(s) and optionally vantage point sensor(s). Suitable system are described in connection with FIG. 2a to 2c. The graphical user interface 506, 516 may be, for example, displayed in block 106 of FIG. 1. The color data of the virtual dome relief 508 in FIG. 5a is generated by using color data associated with the color selected from the pre-existing library as described in relation to FIG. 3, pre-defined virtual object data of a dome relief and rendering said data using ambient illumination conditions as described in relation to step 108 of FIG. 1. The ambient illumination conditions are calculated from data acquired from the orientation sensor(s) and illumination senor(s) and optionally vantage point sensor(s) and at least one model derived from historic environmental conditions as previously described, for example as implemented in Apple's ARKit or Google's ARCore program library.

Upon change in the orientation of the display device as shown in FIG. 5b, the color data is recalculated using the changed orientation data. For this purpose, the ambient illumination condition is recalculated using the updated data from the orientation sensor and the recalculated ambient illumination data is used for rendering. Updating of color of the dome relief 518 is performed in real time or near real time such that the displayed color behaves as if the user is turning a real colored dome relief in his hands.

Figure 6:
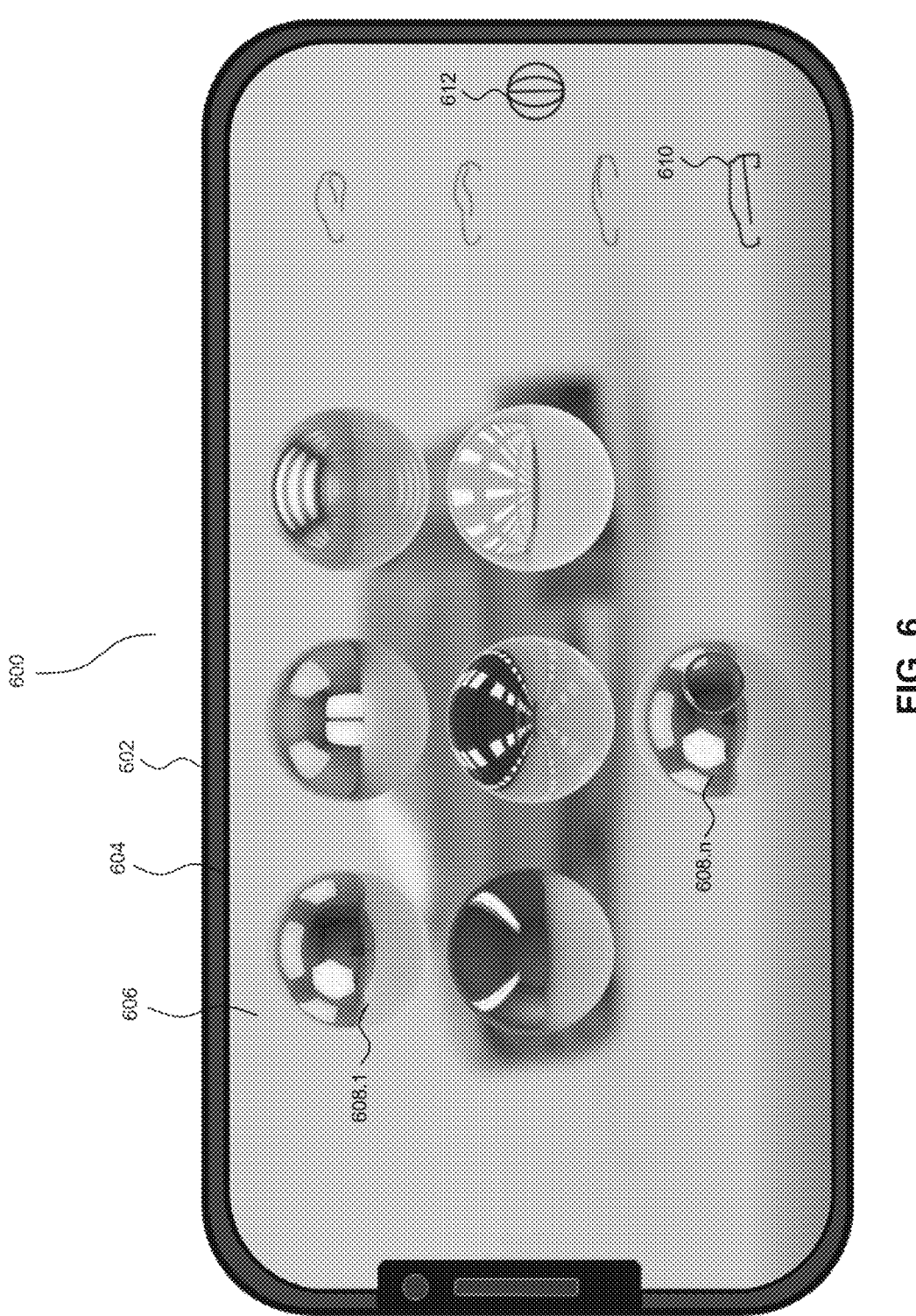
FIG. 6 is a planar view of a system comprising a display device having a graphical user interface showing available high dynamic range (HDR) map environments

FIG. 6 is a planar view of a system 600 comprising a display device 602 having a graphical user interface 606 showing available high dynamic range (HDR) environment maps 608.1, 608.n in front of a blurred shape of an automotive. The graphical user interface 606 may be, for example, displayed in block 106 of FIG. 1. The currently selected shape of the automotive which will be used for displaying the colored automotive under the selected HDR environment map is displayed with icon 610. Icon 612 shows the user that in this mode, the color will be displayed using a pre-defined HDR environment map. The color which is to be displayed in this mode was selected by the user using the pre-existing color library as described in relation to step 104 of FIG. 1 and FIG. 3. The user may select the virtual object as well as the desired HDR environment map by clicking on the respective icon 610 and one of the displayed pre-defined HDR environment map 608.1, 608.n. The pre-defined HDR environment maps may be stored in a database as described in relation to FIGS. 2a to 2c.

Upon selection of a virtual object and displayed HDR environment map, the color data associated with the color selected from the pre-existing color library, the virtual object data associated with the selected virtual object are rendered using the selected HDR environment map. The rendering result is displayed in FIG. 7a.

Figure 7A:
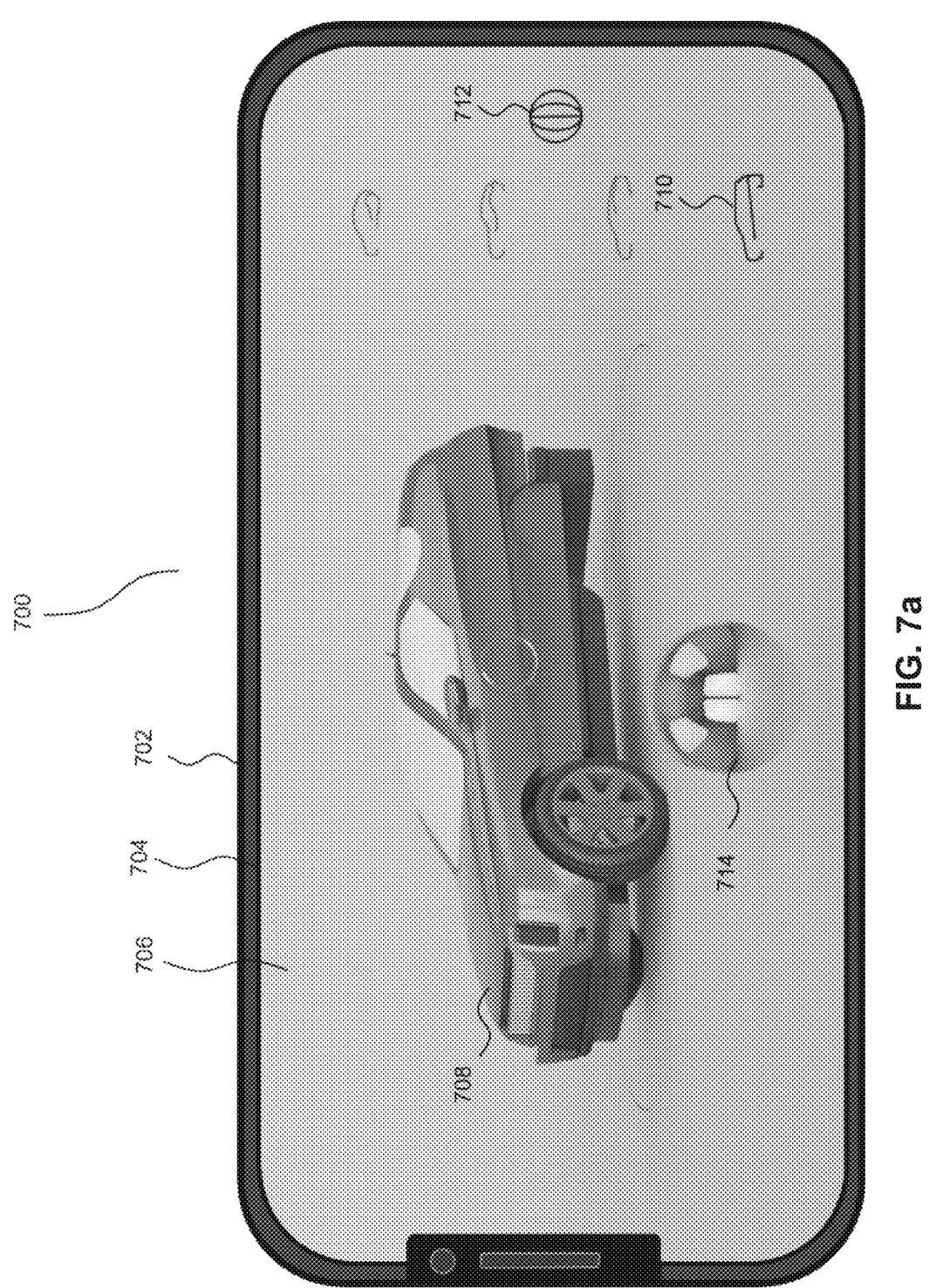
FIG. 7a is a planar view of a system comprising a display device having a graphical user interface showing a virtual 3D object in the form of part of an automotive body being colored with the color generated using a selected high dynamic range (HDR) map environment

FIG. 7a is a planar view of a system 700 comprising a display device 702 having a graphical user interface 706 showing a virtual 3D object in the form of part of an automotive body 708 being colored with the color generated using a selected high dynamic range (HDR) environment map. For convenience, the selected HDR environment map 714 is shown below the colored automotive. Icons 710 and 712 have the same meaning as described in relation to icons 610 and 612 of FIG. 6.

Figure 7B:
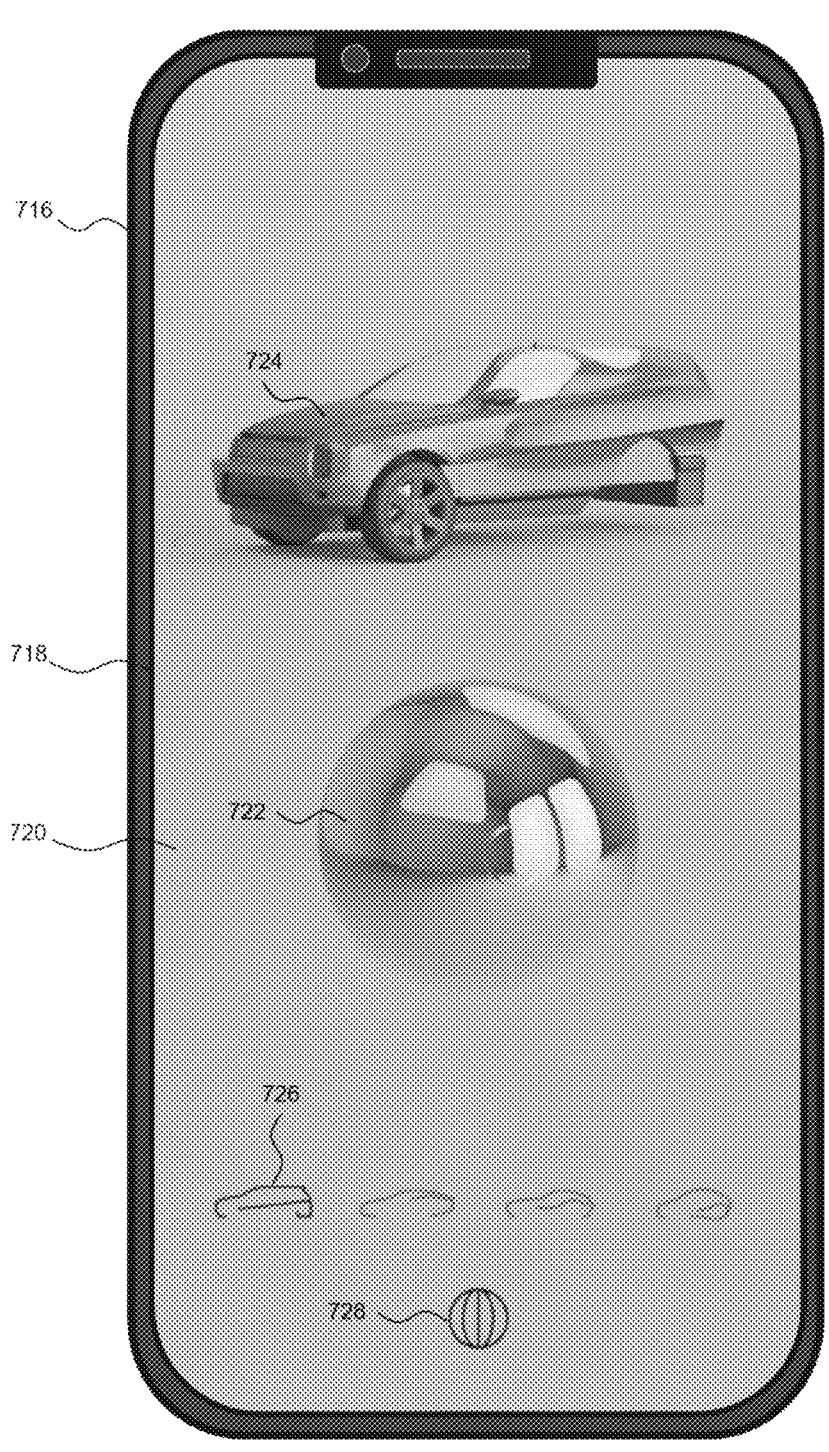
FIG. 7b is a planar view of a system comprising a display device having a graphical user interface showing a virtual 3D object in the form of part of an automotive body being colored with the color generated using a selected high dynamic range (HDR) map environment when viewed from a different viewing angle

The user may change the orientation of the HDR environment map by clicking on a position in the displayed HDR environment map 722 and the displayed colored automotive may be updated in real time or near real time with the rendering result obtained upon rendering the color data and virtual object data using changed orientation of the HDR environment map as shown in FIG. 7b. This allows the user to gain an understanding of the change of the appearance of a colored object using different orientations of the HDR environment map. Use of pre-defined HDR environment maps allows the user to determine the HDR environment map that results in the desired appearance without having to install real illumination concepts in order to tune the appearance of colored objects. This significantly reduces the costs associated with the presentation of colored objects, for example in automotive salesrooms.

The invention claimed is:

1. A computer-implemented method for predicting the appearance of an object being coated with at least one colored coating layer and displaying the predicted appearance on a display device, said method comprising the steps of:

(i) providing to a computer processor via a communication interface a digital representation of a colored coating layer;

(ii) providing a digital representation of illumination conditions by displaying a graphical user interface comprising a plurality of illumination conditions on the display device;

detecting with the computer processor a user input being indicative of selecting an illumination condition from the plurality of displayed illumination conditions, and in response to the detected user input, retrieving with the computer processor via the communication interface the digital representation of illumination conditions associated with the detected user input, wherein the retrieving comprises retrieving data acquired from at least one of: at least one illumination sensor of the display device, at least one orientation sensor of the display device, or at least one vantage point sensor of the display device;

(iii) optionally providing to the computer processor via the communication interface at least one of a model derived from historic illumination conditions or at least one model derived from historic environmental conditions;

(iv) generating with the computer processor color data of the colored coating layer based on the provided digital representation of the colored coating layer, the provided digital representation of the illumination condition, and optionally the provided model(s); and (v) displaying on the display device the generated color data received from the computer processor.

2. The method according to claim 1, wherein the digital representation of the colored coating layer comprises color space data, gloss data, appearance data, texture characteristics or a combination thereof.

3. A method for predicting the appearance of an object being coated with at least one colored coating layer and displaying the predicted appearance on a display device, said method comprising the steps of:

(i) providing to a computer processor via a communication interface a digital representation of a colored coating layer, wherein the digital representation of the colored coating layer comprises an optimized bi-directional texture function (BTF) which is obtained by the following steps:

determining an initial BTF for the colored coating layer using a camera-based measurement device, capturing spectral reflectance data for the colored coating layer for a pre-given, limited number of different measurement geometries using a spectrophotometer, and adapting the initial BTF to the captured spectral reflectance data to obtain an optimized BTF by segmenting the initial BTF of formula (1)

$$f(x, \vec{\imath}, \vec{o}) = \chi(\vec{\imath}, \vec{o})\left(\frac{a}{\pi} + \sum_{k=1}^{3} f_{S_k, a_k, F_{0,k}}^{CT}(\vec{\imath}, \vec{o})\right) + \Xi(x, \vec{\imath}, \vec{o}) \qquad (1)$$

in which x: surface coordinates of the sample/object $\vec{\imath}, \vec{o}$: illumination and observation/viewing directions at the basecoat of the sample $\chi(\vec{\imath}, \vec{o})$: color table depending on illumination and observation direction a: Albedo or diffuse reflectivity $$f_{S_k, a_k, F_{0,k}}^{CT}(\vec{\imath}, \vec{o}):$$

the k-th Cook-Torrance lobe, corresponding to a Bi-directional Reflectance Distribution Function (BRDF) that describes the glossiness of a microfacet surface $S_k$: weight for the k-th Cook-Torrance lobe $a_k$: parameter for the Beckmann distribution of the k-th Cook-Torrance lobe $F_{0,k}$: Fresnel reflectivity for the k-th Cook-Torrance lobe $\Xi(x, \vec{\imath}, \vec{o})$: table of spatial texture images depending on illumination and observation direction into a term $$\chi(\vec{\imath}, \vec{o})\left(\frac{a}{\pi} + \sum_{k=1}^{3} f_{S_k, a_k, F_{0,k}}^{CT}(\vec{\imath}, \vec{o})\right)$$

(F1) and a term $\Xi(x, \vec{\imath}, \vec{o})$ (F2), further dividing the first term (F1) into a first sub-term corresponding to a color table depending on illumination and observation direction $\chi(\vec{\imath}, \vec{o})$ and a second sub-term corresponding to an intensity function $$\left(\frac{a}{\pi} + \sum_{k=1}^{3} f_{S_k, a_k, F_{0,k}}^{CT}(\vec{\imath}, \vec{o})\right)$$

and minimizing a color difference between the captured spectral reflectance data and the initial BTF by optimizing in a first optimization step the parameters of the first sub-term while the parameters of the second sub-term are kept constant, and by optimizing in a second optimization step the parameters of the second sub-term while the parameters of the first sub-term are kept constant;

(ii) providing a digital representation of illumination conditions by displaying a graphical user interface comprising a plurality of illumination conditions on the display device;

detecting with the computer processor a user input being indicative of selecting an illumination condition from the plurality of displayed illumination conditions, and in response to the detected user input, retrieving with the computer processor via the communication interface the digital representation of illumination conditions associated with the detected user input, wherein the retrieving comprises retrieving data acquired from at least one of: at least one illumination sensor of the display device, at least one orientation sensor of the display device, or at least one vantage point sensor of the display device;

(iii) optionally providing to the computer processor via the communication interface at least one of a model derived from historic illumination conditions or at least one model derived from historic environmental conditions;

(iv) generating with the computer processor color data of the colored coating layer based on the provided digital representation of the colored coating layer, the provided digital representation of the illumination condition, and optionally the provided model(s); and (v) displaying on the display device the generated color data received from the computer processor.

4. The method according to claim 1, wherein providing the digital representation of the colored coating layer comprises displaying a pre-existing color library on a screen of the display device, selecting a color from the displayed pre-existing library, obtaining the digital representation of the colored coating layer based on the selected color and providing the obtained digital representation of the colored coating layer via the communication interface to the computer processor.

5. The method according to claim 1, wherein retrieving the digital representation of the illumination conditions further comprises retrieving data being indicative of a date, a time, a position, and optionally a degree of haze of the sky via the communication interface, or retrieving at least one high dynamic range (HDR) environment map via the communication interface.

6. The method according to claim 5, wherein retrieving data being indicative of the date, time, or degree of haze of the sky via the communication interface comprises:

displaying at least one adjustment tool comprising at least one regulator corresponding to the date or time or haze;

detecting via an interaction element a user input being indicative of manipulating the at least one adjustment tool; and in response to the detected user input, determining the date or time or haze.

7. The method according to claim 1, wherein the data acquired from the at least one illumination sensor of the display device includes data on ambient lighting conditions surrounding the display device.

8. The method according to claim 1 wherein the model derived from historic illumination conditions is a physically-based analytical model of the daytime sky.

9. The method according to claim 7, wherein the at least one model derived from historic environmental conditions provides a relationship between (i) the data acquired from the at least one of the illumination sensor, the orientation sensor, or the vantage point sensor of the display device and (ii) the ambient lighting conditions surrounding the display device.

10. The method according to claim 1, wherein the step of generating color data with the computer processor comprises:

providing object data of a virtual object;

optionally providing further color data of at least one further coating layer;

mapping the provided digital representation of the colored coating layer and optionally the further color data on the provided virtual object; and rendering the mapping result using the provided digital representation of illumination conditions and optionally the provided model(s).

11. The method according to claim 2, wherein step (iv) further comprises calculating with the computer processor the ambient lighting conditions surrounding the display device from the provided digital representation of illumination conditions and the provided at least one model derived from historic environmental conditions prior to the generating the color data of the colored coating layer.

12. The method according to claim 1, wherein the step of displaying the generated color data received from the computer processor on the display device comprises mapping the generated color data to a screen of the display device.

13. A system for predicting the appearance of an object being coated with at least one colored coating layer, said system comprising:

optionally a communication interface for providing at least one of a model derived from historic illumination conditions or at least one model derived from historic environmental conditions to a computer processor;

at least one communication interface for providing a digital representation of a colored coating layer and a digital representation of illumination conditions to the computer processor;

a display device comprising a screen;

an interaction element for detecting a user input;

at least one of: at least one illumination sensor, at least one orientation sensor adapted to sense the orientation of the display device, or at least one vantage point sensor adapted to sense the vantage point of a user holding the display device;

a processor in communication with the communication interfaces, the display device, and the at least one illumination sensor, the at least one orientation sensor, or the at least one vantage point sensor, the processor programmed to:

receive via the communication interface the digital representation of the colored coating layer;

generate a user interface presentation comprising a plurality of illumination conditions, detect a user input being indicative of selecting an illumination condition from the plurality of displayed illumination conditions, and retrieve the digital representation of illumination conditions associated with the detected user input in response to the detected user input;

optionally calculate an ambient illumination condition surrounding the display device from the received digital representation of the illumination conditions and the received model(s); and generate color data of the colored coating layer based on the received digital representation of the colored coating layer and the received digital representation of the illumination condition or the calculated ambient illumination condition surrounding the display device, wherein the display device receives the generated user interface presentation and the generated color data of the colored coating layer from the processor and displays the generated user interface presentation and color data, and wherein the digital representation of the colored coating layer comprises an optimized bi-directional texture function (BTF) which is obtained by the following steps:

determining an initial BTF for the colored coating layer using a camera-based measurement device, capturing spectral reflectance data for the colored coating layer for a pre-given, limited number of different measurement geometries using a spectrophotometer, and adapting the initial BTF to the captured spectral reflectance data to obtain an optimized BTF by segmenting the initial BTF of formula (1)

$$f\left(x, \bar{\imath}, \bar{o}\right) = \chi\left(\bar{\imath}, \bar{o}\right)\!\left(\frac{a}{\pi} + \sum\nolimits_{k=1}^{3} f_{S_k, a_k, F_{0,k}}^{CT}\left(\bar{\imath}, \bar{o}\right)\right) + \Xi\left(x, \bar{\imath}, \bar{o}\right) \qquad (1)$$

in which x: surface coordinates of the sample/object $\bar{\imath}$, $\bar{o}$: illumination and observation/viewing directions at the basecoat of the sample $\chi(\bar{\imath}, \bar{o})$: color table depending on illumination and observation direction a: Albedo or diffuse reflectivity $$f_{S_k, a_k, F_{0,k}}^{CT}\left(\bar{\imath}, \bar{o}\right):$$

the k-th Cook-Torrance lobe, corresponding to a Bi-directional Reflectance Distribution Function (BRDF) that describes the glossiness of a microfacet surface $S_k$: weight for the k-th Cook-Torrance lobe $a_k$: parameter for the Beckmann distribution of the k-th Cook-Torrance lobe $F_{0,k}$: Fresnel reflectivity for the k-th Cook-Torrance lobe $\Xi(x, \bar{\imath}, \bar{o})$: table of spatial texture images depending on illumination and observation direction into a term $$\chi\left(\bar{\imath}, \bar{o}\right)\!\left(\frac{a}{\pi} + \sum\nolimits_{k=1}^{3} f_{S_k, a_k, F_{0,k}}^{CT}\left(\bar{\imath}, \bar{o}\right)\right)$$

(F1) and a term $\Xi(x, \bar{\imath}, \bar{o})$ (F2), further dividing the first term (F1) into a first sub-term corresponding to a color table depending on illumination and observation direction $\chi(\bar{\imath}, \bar{o})$ and a second sub-term corresponding to an intensity function $$\left(\frac{a}{\pi} + \sum\nolimits_{k=1}^{3} f_{S_k, a_k, F_{0,k}}^{CT}\left(\bar{\imath}, \bar{o}\right)\right)$$

and minimizing a color difference between the captured spectral reflectance data and the initial BTF by optimizing in a first optimization step the parameters of the first sub-term while the parameters of the second sub-term are kept constant, and by optimizing in a second optimization step the parameters of the second sub-term while the parameters of the first sub-term are kept constant.

14. A non-transitory computer-readable storage medium, the computer-readable storage medium including instructions that when executed by a computer, cause the computer to perform the steps according to the method of claim 1.

15. The method of claim 1, wherein the method is used for predicting the appearance of an object being coated with at least one colored coating layer.

16. The system of claim 13, wherein the system is configured for predicting the appearance of an object being coated with at least one colored coating layer.

17. The method according to claim 3, wherein retrieving the digital representation of the illumination conditions further comprises:

retrieving data being indicative of a date, a time, a position, and optionally a degree of haze of the sky via the communication interface, or retrieving at least one high dynamic range (HDR) environment map via the communication interface.

18. The method according to claim 5, wherein retrieving data being indicative of the date, time, degree of haze of the sky via the communication interface comprises:

displaying at least one adjustment tool comprising at least one regulator corresponding to the date or time or haze;

detecting via the interaction element a movement of at least one regulator of at least one adjustment tool; and in response to the detected user input, determining the date or time or haze.

19. The method according to claim 1, wherein the data acquired from at least one illumination sensor of the display device includes data on the illumination conditions surrounding the display devices selected from the group consisting of the Lux level, the spectral content, illumination directions, at least one photograph of the environment surrounding the display device, in particular at least one high dynamic range (HDR) or low dynamic range (LDR) photograph, and combinations thereof.

20. The method according to claim 10, wherein the step of displaying the generated color data received from the computer processor on the display device includes mapping each rendered point to a screen of the display device.

\* \* \* \* \*